US012808683B2

(12) United States Patent
Huang

(10) Patent No.: US 12,808,683 B2
(45) Date of Patent: Nov. 24, 2026

(54) MAP UPDATES

(71) Applicant: NVIDIA Corporation, Santa Clara, CA (US)

(72) Inventor: Shyh-Chyuan Huang, Arcadia, CA (US)

(73) Assignee: NVIDIA Corporation, Santa Clara, CA (US)

( * ) Notice: Subject to any disclaimer, the term of this patent is extended or adjusted under 35 U.S.C. 154(b) by 423 days.

(21) Appl. No.: 18/482,318

(22) Filed: Oct. 6, 2023

(65) Prior Publication Data

US 2025/0116526 A1 Apr. 10, 2025

(51) Int. Cl.
*G01C 21/00* (2006.01)

(52) U.S. Cl.
CPC ...... *G01C 21/3811* (2020.08); *G01C 21/3833* (2020.08)

(58) Field of Classification Search
CPC ........................ G01C 21/3811; G01C 21/3833
USPC .......................................................... 701/532
See application file for complete search history.

(56) References Cited

U.S. PATENT DOCUMENTS 10,670,416 B2 6/2020 Wheeler et al.
11,594,401 B2 2/2023 Yang et al.
11,738,770 B2 8/2023 Han et al.
11,775,570 B2 10/2023 Wheeler
2019/0049964 A1* 2/2019 Jang ................ B60W 30/18154
2021/0404841 A1* 12/2021 Das .................... G01C 21/3807
2022/0185331 A1* 6/2022 Kaiser ............... B60W 50/0205
2022/0189054 A1* 6/2022 Kaiser .................. G06V 20/582
2022/0383743 A1* 12/2022 Oren .................... G06V 20/584
2023/0154127 A1* 5/2023 Martin-Bragado ..... G06T 15/20
345/419
2023/0267834 A1* 8/2023 Ansari ...................... H04L 9/30
701/2

* cited by examiner

*Primary Examiner* — Hitesh Patel
*Assistant Examiner* — John D Holman
(74) *Attorney, Agent, or Firm* — IRON SUMMIT IP LLP

(57) ABSTRACT

In various examples, associating traffic objects with traffic poles or other supporting structures in maps for autonomous systems and applications is described herein. Systems and methods are disclosed that associate traffic objects (e.g., traffic signals, traffic signs, etc.) with traffic poles within maps and/or generate structures that represent the associations within the maps. For instance, a map may indicate poses of one or more traffic objects and/or a traffic pole within an environment. As such, the poses may be used to associate the traffic object(s) with the traffic pole, such as by using one or more threshold distances. Next, the poses, the association(s), and/or general information associated with traffic poles may be used to generate a structure that represents the traffic object(s) connected to the traffic pole.

20 Claims, 29 Drawing Sheets

MAP UPDATES

BACKGROUND

For an autonomous vehicle to safely navigate through an environment, the vehicle may rely on maps, such as navigational and/or high-definition (HD) maps, corresponding to an area in which the vehicle intends to operate. Due to the detailed, three-dimensional, high precision nature of a HD map, navigating according to the HD map data has proven effective for safe navigation of environments where HD map information is available. However, in some circumstances, an HD map may be incomplete and/or inaccurately represent certain objects located within the environment. For example, a traffic pole or other structure located within the environment may include traffic objects, such as traffic signals, traffic signs, and/or the like. The traffic objects may be connected to various portions of the traffic pole, such as the traffic pole itself and/or an extender (e.g., an arm, a brace, a connector, etc.) of the traffic pole. However, the map may not indicate the associations and/or connections between the traffic objects and the traffic pole or other structure supporting the object.

This lack of association between traffic objects and poles or other structures may cause problems when performing navigation operations because the locations and/or orientations associated with these connections may be important for instructing vehicles on how to proceed within the environment. For instance, the locations and/or orientations may indicate which road, lane, and/or intersection the traffic objects belong and/or are instructing. For a first example, if a traffic pole includes an extender that is located over a road, different traffic signals attached to the extender may be used to instruct vehicles located in different lanes of the road. For a second example, if a traffic pole includes a traffic sign that provides instructions for how to navigate through an intersection, it may be important to determine which traffic pole the traffic sign is connected to within the environment and/or the orientation of the traffic sign on the traffic pole in order to correctly follow the instructions through the intersection.

SUMMARY

Embodiments of the present disclosure relate to associating traffic objects with supporting structures in maps for autonomous systems and applications. Systems and methods are disclosed that associate traffic objects (e.g., traffic signals, traffic signs, etc.) with traffic poles or other structures within maps and/or generate structures that represent the associations within the maps. For instance, a map may indicate poses (e.g., locations, orientations, etc.) of one or more traffic objects and/or a traffic pole within an environment. As such, the poses may be used to associate the traffic object(s) with the traffic pole, such as by using one or more threshold distances. Next, the poses, the association(s), and/or general information associated with traffic poles may be used to generate a structure that represents the traffic object(s) connected to the traffic pole. The map may then be updated to indicate the association(s) between the traffic object(s) and/or the traffic pole and/or the structure of the connection(s).

In contrast to conventional systems, such as those described above, the current systems, in some embodiments, are able to update the map in order to indicate the association(s) between the traffic object(s) and the traffic pole and/or indicate the structure of the connection(s) between the traffic object(s) and the traffic pole. As described herein, updating the map to indicate association(s) and/or the structure of the connection(s) may increase the accuracy of the map, such as by better indicating which roads, lanes, intersections, and/or the like that traffic objects belong. Additionally, by increasing the accuracy of the map, the safety of vehicles that then use the map may also increase since the vehicles are better able to navigate according to the instructions provided by the traffic objects. For example, vehicles navigating through an intersection may better determine which road, lane, and/or direction a traffic signal associated with the intersection is instructing.

Furthermore, in contrast to the conventional systems, the current systems, in some embodiments, are able to increase the visual realism of real and/or simulated environments by using the structures between the traffic poles and the traffic objects. As described more herein, increasing the visual realism may also increase the performance of training models that use these maps, such as by providing simulated environments that match actual environments for which vehicles will navigate when using the models.

BRIEF DESCRIPTION OF THE DRAWINGS

The present systems and methods for associating traffic objects with structures in maps for autonomous systems and applications are described in detail below with reference to the attached drawing figures, wherein.

DETAILED DESCRIPTION

Figure 1:
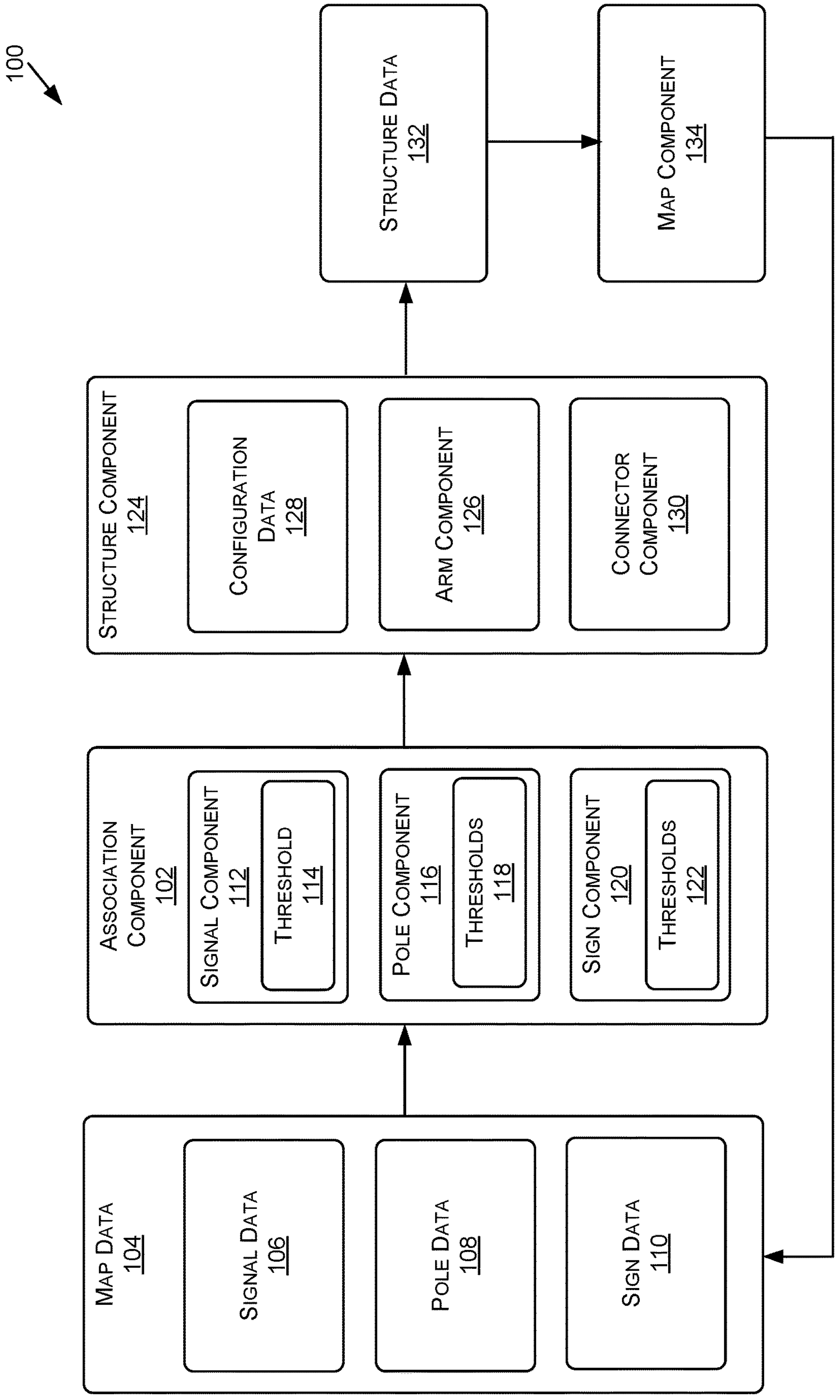
FIG. 1 illustrates an example data flow diagram for a process of associating traffic objects with traffic structures in maps, in accordance with some embodiments of the present disclosure.

Systems and methods are disclosed related to associating traffic objects with their supporting structures in maps for autonomous and semi-autonomous systems and applications. Although the present disclosure may be described with respect to an example autonomous or semi-autonomous vehicle 1600 (alternatively referred to herein as "vehicle 1600" or "ego-machine 1600," an example of which is described with respect to FIGS. 16A-16D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to generating and/or updating maps, this is not intended to be limiting, and the systems and methods described herein may be used in augmented reality, virtual reality, mixed reality, robotics, security and surveillance, autonomous or semi-autonomous machine applications, and/or any other technology spaces where generating and/or updating maps may be used.

Although primarily described with respect to traffic object and traffic poles, this is not intended to be limiting, and the systems and processes described herein may be used for any type of object to support association or correspondence. For example, in addition to or alternatively from traffic objects (signs, lights, etc.), the systems and methods described herein may be used for interior objects or features (e.g., ARtags, signage, indoor lighting, warehouse objects, etc.), exterior objects or features (e.g., walking signs, parks signs, etc.), and/or any other type of object that may be associated with or supported by a structure (such as a pole, post, barricade, wall, etc.). In addition, in addition to or alternatively from traffic poles (e.g., strain poles, mast pole arms, etc.)—or poles more generally—the systems and methods described herein may be used for any type of structure that supports one or more objects. For example, a pole, post, barricade, wall, luminaire, span wire, and/or other structure may be used without departing from the scope of the present disclosure.

For instance, a system(s) may generate, receive, retrieve, and/or obtain map data representing a map (e.g., a high-definition map, a navigation map, a standard definition (SD) map, etc.) of an environment. As described herein, the map may indicate information, such as poses (e.g., locations, orientations, etc.) and/or dimensions, associated with objects located within the environment. For example, the map may indicate at least first information associated with one or more traffic poles or other structures located within the environment as well as second information associated with one or more traffic objects located within the environment. As described herein, a traffic object may include, but is not limited to, a traffic signal, a traffic sign, a traffic control (e.g., a button for controlling a crosswalk), and/or any other type of traffic object that may be connected to a traffic pole or other structure capable of supporting one or more traffic objects. However, and as also described herein, the map may not initially indicate associations and/or connections between one or more of the traffic objects and one or more of the traffic poles and/or structures. For example, a traffic object may include a "floating" object, where the map indicates the pose of the traffic object within the environment without showing which traffic pole the traffic object is connected and/or a type of connection between the traffic object and the traffic pole.

As such, the system(s) may initially perform one or more techniques to associate the traffic object(s) with at least a traffic pole of the traffic pole(s). In some examples, to associate the traffic object(s) with the traffic pole, the system(s) may use one or more threshold distances (e.g., 1 meter, 5 meters, 10 meters, etc.) between the traffic object(s) and/or between the traffic object(s) and the traffic pole. For example, and for a first type of traffic object such as traffic signals, the system(s) may determine one or more distances between the traffic signals based at least on the poses (e.g., the locations) associated with the traffic signals. The system(s) may then use the distances to determine whether the traffic signals are associated with one another. As described herein, a traffic object may be associated with another traffic object based at least on the traffic objects being associated with and/or connected to a same traffic pole. Additionally, a traffic signal may be associated with another traffic signal based at least on the traffic signal being within a threshold distance to the other traffic signal. In some examples, and will be described in more detail herein, the system(s) may use an iterative process when associating the traffic signals with one another.

The system(s) may then use one or more threshold distances to associate the traffic signals with a traffic pole and/or other structure capable of supporting the traffic signal(s) and/or object(s). For example, the system(s) may determine a distance between a traffic signal and the traffic pole. The system(s) may then determine that the traffic signal is associated with the traffic pole based at least on the distance being within a threshold distance. In some examples, if the system(s) determines that the traffic signal is associated with the traffic pole, then the system(s) may associate one or more (e.g., each) of the other traffic signal(s) with the same traffic pole. However, if the system(s) determines that the traffic signal is not initially associated with the traffic pole (e.g., the distance is outside of the threshold distance), then the system(s) may perform similar processes to determine whether another of the traffic signals is associated with the traffic pole. In some examples, the system(s) may continue to perform these iterative processes until the system(s) associates the traffic signals with the traffic poles.

The system(s) may then use one or more threshold distances to associate a second type of object, such as traffic signs, when the traffic signals and/or the traffic pole. For instance, the system(s) may use the poses associated with the traffic signs to determine one or more distances between the traffic signs and/or one or more distances between the traffic signs and the traffic signals. The system(s) may then use the distances to associate with the traffic signs with one another and/or associate the traffic signs with one or more of the traffic signals. For a first example, if a traffic sign is within a threshold distance to another traffic sign, then the system(s) may associate the traffic sign with the other traffic sign. For a second example, if a traffic sign is within a threshold distance to a traffic signal, then the system(s) may associate the traffic sign with the traffic signal. In some examples, and will be described in more detail herein, the system(s) may use an iterative process when associating the traffic signs with one another and/or with the traffic signals.

The system(s) may then associate the traffic signs with the traffic pole. In some examples, the system(s) may use the associations between the traffic signals and the traffic pole as well as the associations between the traffic signs and the traffic signals to then associate the traffic signs with the traffic pole. For example, if the traffic signals are already associated with the traffic pole, and the traffic signs are associated the traffic signals, then the system(s) may automatically associate the traffic signs with the same traffic pole. In some examples, the system(s) may use one or more threshold distances to associate the traffic signs with the traffic pole. For example, the system(s) may determine a distance between a traffic sign and the traffic pole. The system(s) may then determine that the traffic sign is associated with the traffic pole based at least on the distance being within a threshold distance to the traffic pole. In such an example, if the system(s) determines that the traffic sign is associated with the traffic pole, then the system(s) may associate one or more (e.g., each) of the other traffic sign(s) with the same traffic pole. However, if the system(s) determines that the traffic sign is not initially associated with the traffic pole (e.g., the distance is outside of the threshold distance), then the system(s) may perform similar processes to determine whether another of the traffic signs is associated with the traffic pole. In some examples, the system(s) may continue to perform these iterative processes until the system(s) associates the traffic signs with the traffic poles.

Based at least on associating the traffic objects (e.g., the traffic signals, the traffic signs, etc.) with the traffic pole, the system(s) may then generate a structure associated with the traffic pole that indicates the connections between the traffic objects and the traffic pole. In some examples, the system(s) uses the locations associated with the traffic objects and/or the traffic pole to determine at least some of the information needed to generate the structure, such as a length of an extender (e.g., an arm), a direction of the extender, a height of a connection between the extender and the traffic pole, a rise associated with the extender, types of connections between the traffic objects and the traffic pole, and/or any other information. In some examples, the system(s) may use one or more standards associated with traffic pole structures to determine at least some of the information needed to generate the structure, such as the length of the extender, the direction of the extender, the height of the connection between the extender and the traffic pole, the rise associated with the extender, the types of connections between the traffic objects and the traffic pole, the dimensions of the traffic pole, the extender, and/or the connections, and/or any other information. The system(s) may then use this information to generate the structure that indicates the connections between the traffic objects and the traffic pole.

In some examples, the system(s) may perform similar processes to associate one or more additional traffic objects with one or more additional traffic poles. Additionally, the system(s) may then update the map to indicate the associations between the traffic objects and/or the associations between the traffic objects and the traffic poles. In some examples, the system(s) may further update the map to include the structures indicating the connections between the traffic objects and the traffic poles. As such, by performing such processes, the map may better represent the actual environment, which may increase the safety for vehicles that use the map to navigate through the environment. In some examples, similar processes may then be used to update one or more additional maps representing one or more additional environments.

In some embodiments, the map data including the associations between the traffic objects and traffic structures—including extender/connector information—may be used to generate simulation or virtual environments or worlds. For example, the traffic objects may included in a simulated environment in connection with the one or more structures—e.g., via one or more extenders or connectors—based at least on the association information in the map data. In some examples, the traffic objects, the structures, the extenders/connectors, and/or the associations therebetween may be represented in a universal scene description (USD) file format. For example, the map data may be used to generate a digital twin, or virtual world, that corresponds to a real-world environment associated with the traffic objects/structures/connectors. For example, the map data including the object information, structure information, connection information, and/or association information may be used to generate a virtual world (such as a digital twin) in a virtual simulated environment—such as the metaverse, NVIDIA's omniverse, and/or another persistent virtual world or environment. In some embodiments, the map data may be used to generate ground truth data for training one or more neural networks to identify traffic objects, traffic structures, extenders/connectors, and/or associations therebetween. In some examples, the map data may be used to generate a simulation testing environment for testing software (e.g., software in the loop (SIL), an autonomous or semi-autonomous vehicle drive stack, deep learning algorithms, etc.) and/or hardware (e.g., hardware in the loop) using one or more virtual vehicles or machines in virtual environments—such as digital twin environments. This may be performed for vehicles, robots, warehouse machinery, construction equipment, and/or the like.

For a non-limiting example, a high definition (HD) map signal, sign, and pole data may be stored in USD file format, and/or another standard for exchanging three-dimensional (3D) geometry and scene data. This information may be ingested and processed using, for example, a digital content creation (DCC) application. A number of digital assets (DAs) from the DCC may be created—e.g., one to create the signals and signs to poles connection relationships, a second one to allow user editing of the relationships, and a third to create the connection geometry. These DAs in turn also contain other more atomic DAs for smaller processing sub-operations. The output of these processes may be imported into a virtual environment (e.g., Omniverse) as USD primitives, and they may then be assigned materials or instanced with pre-built geometry assets for a final sim-ready USD format that can be used for visualization and, for example, implementation in NVIDIA's DRIVESim, and/or another simulation program or environment.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, object or actor simulation and/or digital twinning, data center processing, conversational AI, light transport simulation (e.g., ray tracing, path tracing, etc.), collaborative content creation for 3D assets, cloud computing, generative AI, (large) language models, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, systems for performing generative AI operations, systems implementing—or for performing operations using—a large language model (LLM), and/or other types of systems.

With reference to FIG. 1, FIG. 1 illustrates an example data flow diagram for a process of associating traffic objects with traffic poles in maps, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1600 of FIGS. 16A-16D, example computing device 1700 of FIG. 17, and/or example data center 1800 of FIG. 18.

The process 100 may include an association component 102 receiving map data 104 representing at least a map associated with an environment. As described herein, the map may indicate at least information (e.g., poses, types, dimensions, etc.) associated with objects located within the environment, locations of drivable free-space (e.g., roads, lanes, intersections, parking areas, etc.) within the environment, and/or any other information associated with the environment. For instance, and in the example of FIG. 1, the map data 104 may include at least signal data 106, pole data 108, and sign data 110. The signal data 106 may represent at least the poses, dimensions, and/or additional information associated with traffic signals located within the environment, the pole data 108 may represent at least the poses, dimensions, and/or additional information associated with traffic poles located within the environment, and the sign data 110 may represent at least the poses, dimensions, and/or additional information associated with traffic signs located within the environment.

As described herein, a pose associated with an object may indicate a location (e.g., a two-dimensional location, a three-dimensional location, etc.) and/or orientation associated with the object. Additionally, dimensions associated with an object may indicate at least a height, a width, a length, a radius, a shape, and/or any other dimensional information associated with the object. Furthermore, additional information associated with an object may indicate at least a type of the object (e.g., traffic signal, traffic sign, etc.), one or more characteristics (e.g., a color, a texture, etc.) associated with the object, content (e.g., text, graphics, etc.) associated with the object, and/or any other information associated with the object. While the example of FIG. 1 illustrates the map data 104 as including the signal data 106, the pole data 108, and the sign data 110, in other examples, the map data 104 may include data associated with other types of objects.

Figure 2A:
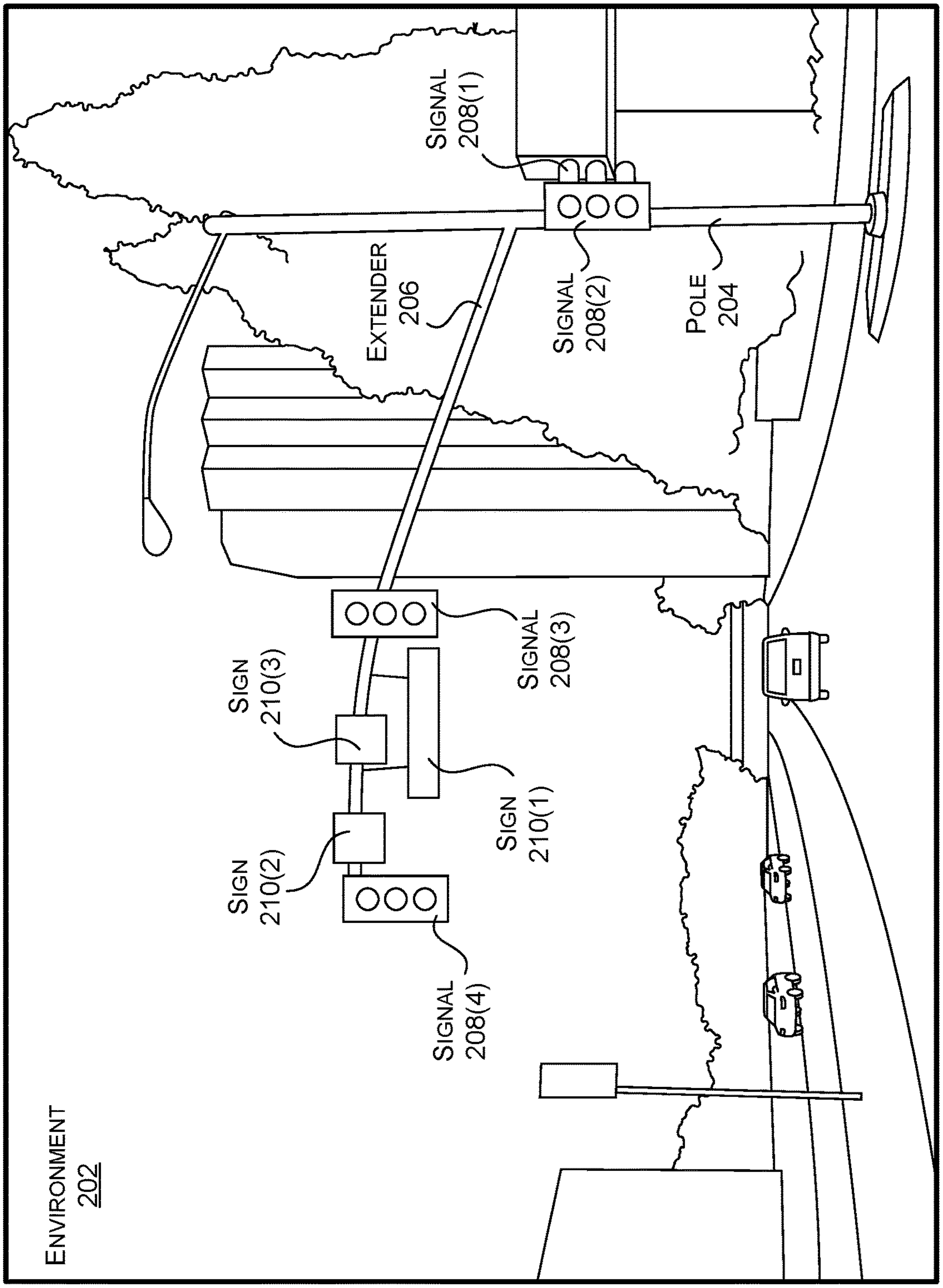
FIGS. 2A-2B illustrate an example of a map representation associated with various traffic objects located within an environment, in accordance with some embodiments of the present disclosure.
Figure 2B:
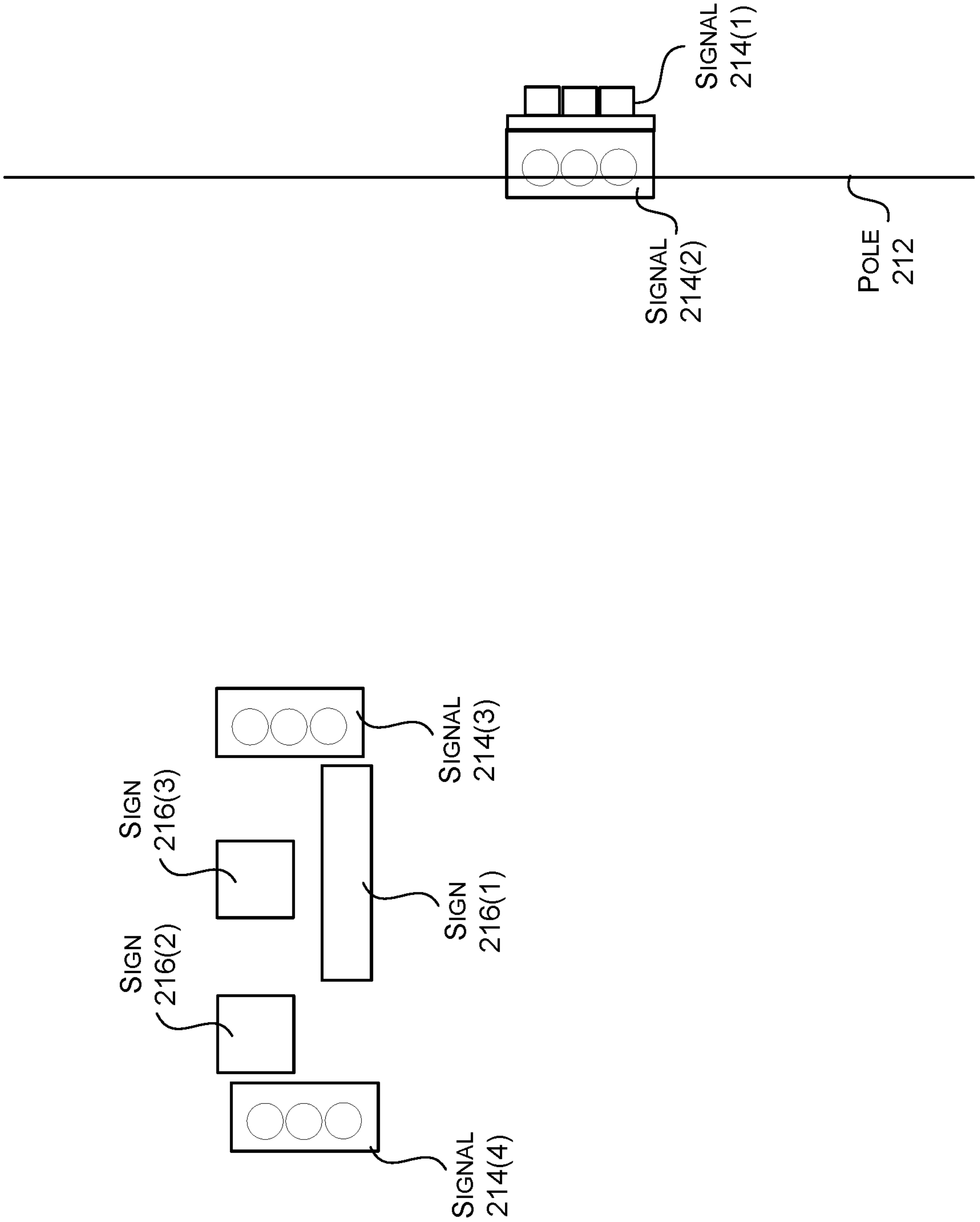

For instance, FIGS. 2A-2B illustrate an example of a map representation associated with various traffic objects located within an environment, in accordance with some embodiments of the present disclosure. As shown by the example of FIG. 2A, the environment 202 may include at least a structure that includes a traffic pole 204, an extender 206 (e.g., an arm) connected to the traffic pole 204, traffic signals 208(1)-(2) connected directly to the traffic pole 204, traffic signals 208(3)-(4) connected to the extender 206 of the traffic pole 204, and traffic signs 210(1)-(3) connected to the extender 206 of the traffic pole 204. In some examples, the structure may be associated with an intersection, where the traffic signals 208(2)-(4) and the traffic signs 210(1)-(3) are associated with a first direction of travel within the environment 202 (e.g., a current direction of travel that is towards the structure) and the traffic signal 208(1) is associated with a second, different direction of travel within the environment 202.

FIG. 2B then illustrates an example of at least the structure located within the environment 202 as represented by a map (e.g., which may be represented by the map data 104).

As shown, the map may include at least a representation 212 (e.g., a vector representation) of the traffic pole 204, representations 214(1)-(4) (e.g., vector representations) of the traffic signals 208(1)-(4), and representations 216(1)-(3) (e.g., vector representations) of the traffic signs 210(1)-(3). In some examples, the representations may further be referenced to as the traffic pole 212, the traffic signals 214(1)-(4), and the traffic signs 216(1)-(3). Additionally, while the example of FIG. 2B only illustrates the representations for the traffic pole 212, the traffic signals 214(1)-(4), and the traffic signs 216(1)-(3), in other examples, the map may further include representations for other types of objects located within the environment 202.

Referring back to the example of FIG. 1, the process 100 may include the association component 102 associating the traffic objects (e.g., the traffic signals represented by the signal data 106, the traffic signs represented by the sign data 110, etc.) with the traffic poles represented by the pole data 108. In some examples, the association component 102 may initially use a signal component 112 that is configured to determine associations between traffic signals. As described herein, a traffic signal may be associated with another traffic signal based at least on the traffic signal and the other traffic signal connecting to a same traffic pole (e.g., either directly or indirectly, which is also described herein). To determine if two traffic signals are associated with one another, the signal component 112 may use the signal data 106 to determine a distance between the traffic signals and/or determine a difference in direction between the traffic signals. In some examples, the signal component 112 determines the difference in direction by taking the dot product of the directions (e.g., orientations) associated with the traffic signals.

The signal component 112 may then determine whether the traffic signals are associated with one another using the distance and/or the difference in direction. For a first example, the signal component 112 may determine that the traffic signals are associated based at least on the distance satisfying (e.g., being is less than or equal to) a first threshold distance 114 and/or determine that the traffic signals are not associated based at least on the distance not satisfying (e.g., being greater than) the first threshold distance 114. In such an example, the signal component 112 may use a set threshold distance 114, such as 1 meter, 5 meters, 10 meters, and/or the like, or the signal component 112 may determine the first threshold distance 114 using one or more factors. For instance, the signal component 112 may determine the first threshold distance 114 based at least on a number of lanes, a width of the lanes, a type of road (e.g., rural, highway, etc.), and/or using any other factors.

For a second example, the signal component 112 may additionally, or alternatively, determine that the traffic signals are associated based at least on the difference in direction. For instance, if the signal component 112 determines that the distance between the traffic signals is small (e.g., satisfying a second, smaller threshold distance 114) or if the signal directions are similar (e.g., the dot product is greater than a threshold 114, such as 0.5, 0.75, 0.9, etc.), and the traffic signals are not directly in front or behind one another (e.g., based at least on the poses of the traffic signals), then the signal component 112 may determine that the traffic signals are associated with one another based at least on an absolute value of the dot product of the relative direction being less than another threshold 114, such as 0.5, 0.6, 0.7, and/or any other threshold. While these are just a few example techniques of how the signal component 112 may associate two traffic signals, in other examples, the signal component 112 may use additional and/or alternative techniques to associate the traffic signals.

In some examples, the signal component 112 may use one or more iterations (e.g., one iteration, three iterations, five iterations, and/or any other number of iterations) when associating traffic signals. For example, such as if there are three traffic signals, the signal component 112 may initially perform these processes to determine whether the first traffic signal is associated with the second traffic signal and/or the third traffic signal. The signal component 112 may then perform these processes again to determine whether the second traffic signal is associated with the first traffic signal and/or the third traffic signal. Additionally, the signal component 112 may again perform these processes to determine whether the third traffic signal is associated with the first traffic signal and/or the second traffic signal. In other words, the signal component 112 may use different groupings for one or more (e.g., each) of the iterations. In some examples, this may improve the overall performance of the association performed by the signal component 112.

For example, and using the example above with the three traffic signals, the signal component 112 may determine that the first traffic signal is associated with the second traffic signal, but not associated with the third traffic signal during the first iteration (e.g., the distance between the first traffic signal and the third traffic signal does not satisfy a threshold distance 114). However, the signal component 112 may determine that the second traffic signal is associated with the third traffic signal during the second iteration. As such, the signal component 112 may then determine that the first traffic signal is associated with the third traffic signal based at least on the first traffic signal being associated with the second traffic signal and the second traffic signal being associated with the third traffic signal. In other words, the second traffic signal may associate the first traffic signal with the third traffic signal.

Figure 3A:
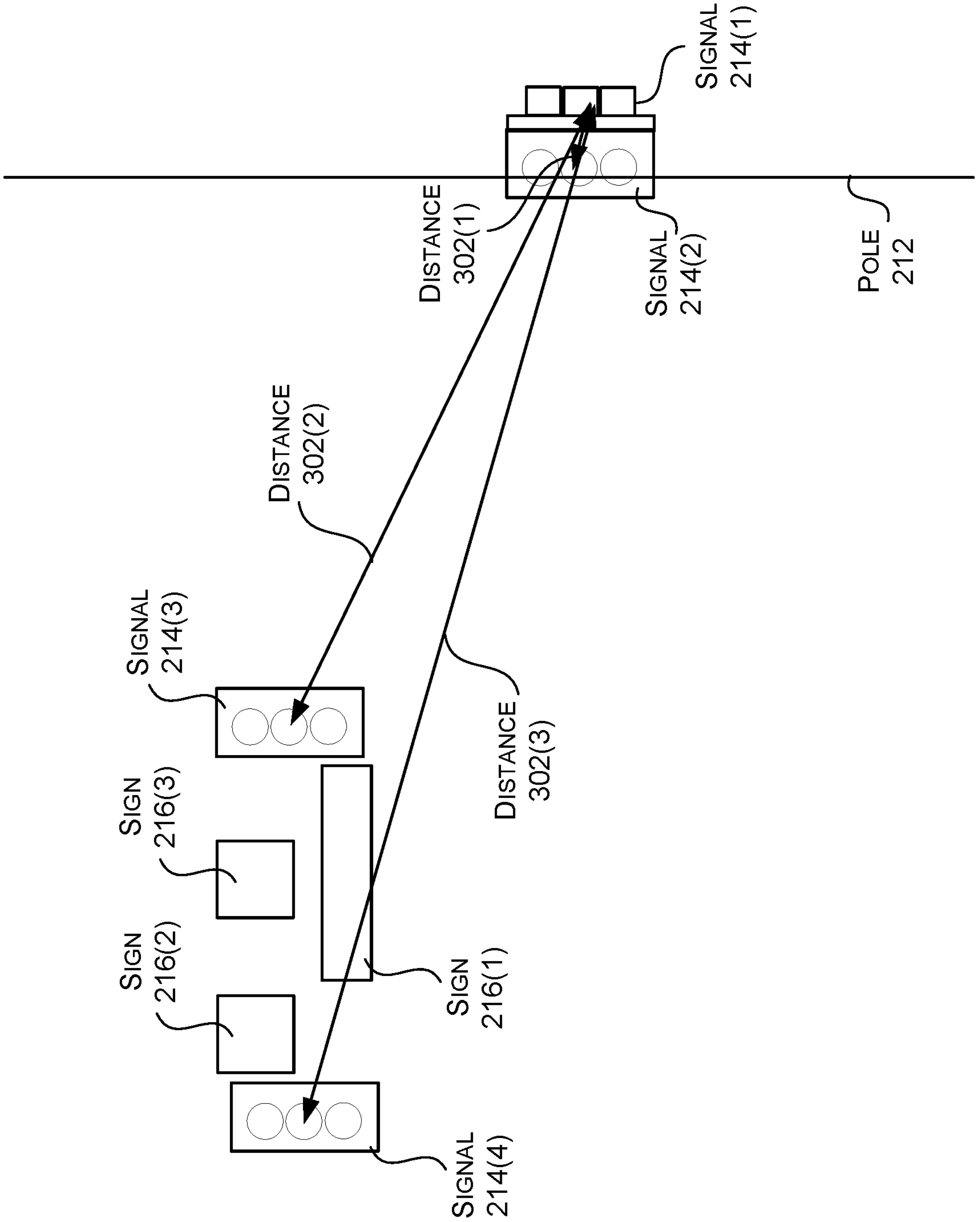
FIGS. 3A-3B illustrate examples of associating traffic signals with one another, in accordance with some embodiments of the present disclosure.
Figure 3B:
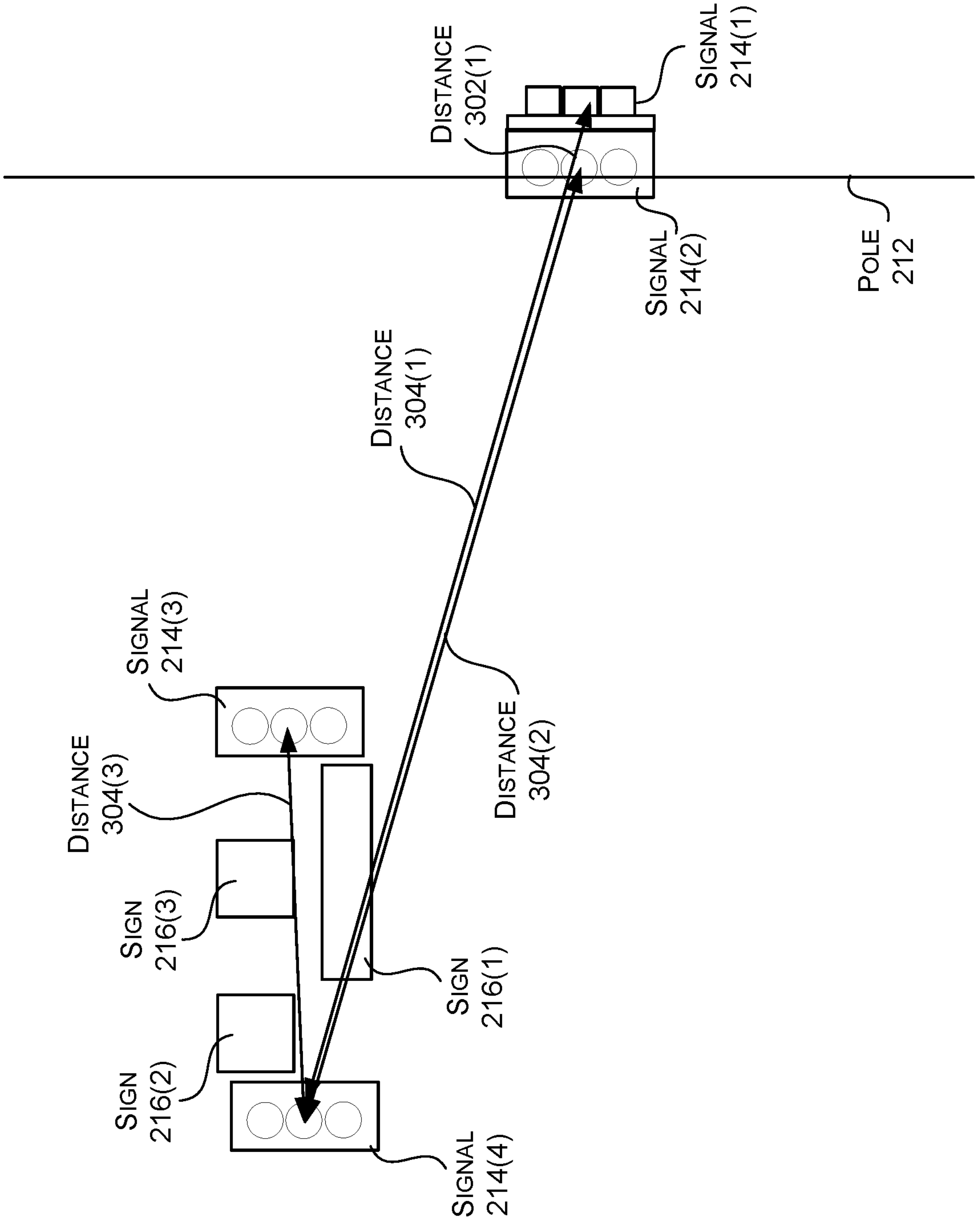

For more details, FIGS. 3A-3B illustrate examples of associating the traffic signals 214(1)-(4) with one another, in accordance with some embodiments of the present disclosure. As shown by the example of FIG. 3A, during a first iteration, the signal component 112 may determine a first distance 302(1) between the first traffic signal 214(1) and the second traffic signal 214(2), a second distance 302(2) between the first traffic signal 214(1) and the third traffic signal 214(3), and a third distance 302(3) between the first traffic signal 214(1) and the fourth traffic signal 214(4). The signal component 112 may then use the distances 302(1)-(3) to determine whether the first traffic signal 214(1) is associated with at least one of the traffic signals 214(2)-(4). For example, the signal component 112 may determine that the first traffic signal 214(1) is associated with the traffic signals 214(2)-(4) for which the respective distance 302(1)-(3) is less than or equal to a threshold distance 114.

Next, and shown by the example of FIG. 3B, during a second iteration, the signal component 112 may determine a first distance 304(1) between the fourth traffic signal 214(4) and the first traffic signal 214(1), a second distance 304(2) between the fourth traffic signal 214(4) and the second traffic signal 214(2), and a third distance 304(3) between the fourth traffic signal 214(4) and the third traffic signal 214(3). The signal component 112 may then use the distances 304(1)-(3) to determine whether the fourth traffic signal 214(4) is associated with at least one of the traffic signals 214(1)-(3). For example, the signal component 112 may determine that the fourth traffic signal 214(4) is associated with the traffic signals 214(1)-(3) for which the respective distance 304(1)-(3) is less than or equal to a threshold distance 114.

The signal component 112 may then perform similar processes during one or more additional iterations associated with the second traffic signal 214(2) and/or the third traffic signal 214(3). Additionally, the signal component 112 may use the results from one or more of the iterations to determine the final associations associated with the traffic signals 214(1)-(4). For a first example, the signal component 112 may determine, during each iteration, that each of the traffic signals 214(1)-(4) is associated with each of the other traffic signals 214(1)-(4). As such, the signal component 112 may associate each of the traffic signals 214(1)-(4) together. For a second example, the signal component 112 may determine that the first traffic signal 214(1) is associated with the second traffic signal 214(2) and the third traffic signal 214(3) during the first iteration and that the fourth traffic signal 214(4) is also associated with the third traffic signal 214(3) during the second iteration. As such, the signal component 112 may again associate each of the traffic signals 214(1)-(4) together.

While the examples of FIGS. 3A-3B illustrate the signal component 112 as using the centers of the traffic signals 214(1)-(4) when determining the distances 302(1)-(3) and 304(1)-(3), in other examples, the signal component 112 may use other locations of the traffic signals 214(1)-(4), such as the corners and/or the edges of the traffic signals 214(1)-(4).

Referring back to the example of FIG. 1, the association component 102 may use a pole component 116 to associate the traffic signals with a traffic pole. In some examples, and for a traffic signal, the pole component 116 may use a width and/or height associated with the traffic signal to determine whether the traffic signal is associated with the traffic pole. For example, if the traffic pole is within a bounding volume that is created using at least the width and/or the height of the traffic signal (e.g., along with a length), then the pole component 116 may determine that the traffic signal is associated with the traffic pole. Additionally, the pole component 116 may determine that the association between the traffic signal and the traffic pole includes a specific type of connection, such as a direct connection, which is described in more detail herein.

Additionally, or alternatively, in some examples, and for a traffic signal, the pole component 116 may use one or more threshold distances 118 to determine whether the traffic signal is associated with the traffic pole and/or determine a type of connection between the traffic signal and the traffic pole. For example, the pole component 116 may determine a distance between the traffic signal and the traffic pole, such as by using the signal data 106 (e.g., the pose of the traffic signal) and the pole data 108 (e.g., the pose of the traffic pole). The pole component 116 may then determine that the traffic signal is associated with the traffic pole based at least on the distance satisfying (e.g., being less than or equal to) a first threshold distance 118 or determine that the traffic signal is not associated with the traffic pole based at least on the distance not satisfying (e.g., being greater than) the first threshold distance 118. Additionally, such as for a traffic signal that is within the first threshold distance 118, the pole component 116 may determine that the traffic signal includes a direct connection with the traffic pole based at least on the distance satisfying (e.g., being less than or equal to) a second threshold distance 118 or determine that the traffic signal includes an indirect connection with the traffic pole based at least on the distance not satisfying (e.g., being greater than) the second threshold distance 118, where the first threshold distance 118 is greater than the second threshold distance 118.

In some examples, the pole component 116 may use one or more iterations (e.g., one iteration, three iterations, five iterations, and/or any other number of iterations) to associate traffic signals with a traffic pole. For example, such as during a first iteration of processing associated with the traffic signals, the pole component 116 may initially determine that a first traffic signal is not associated with the traffic pole based at least on a distance between the first traffic signal and the traffic pole not satisfying the first threshold distance 118. Additionally, during a second iteration of processing associated with the traffic signals, the pole component 116 may determine that a second traffic signal (e.g., a neighboring traffic signal to the first traffic signal) is associated with the traffic pole based at least on a distance between the second traffic signal and the traffic pole satisfying the first threshold distance 118. As such, if the first traffic signal is already associated with the second traffic signal, the pole component 116 may then associate the first traffic signal with the traffic pole based at least on the second traffic signal being associated with the traffic pole.

Figure 4A:
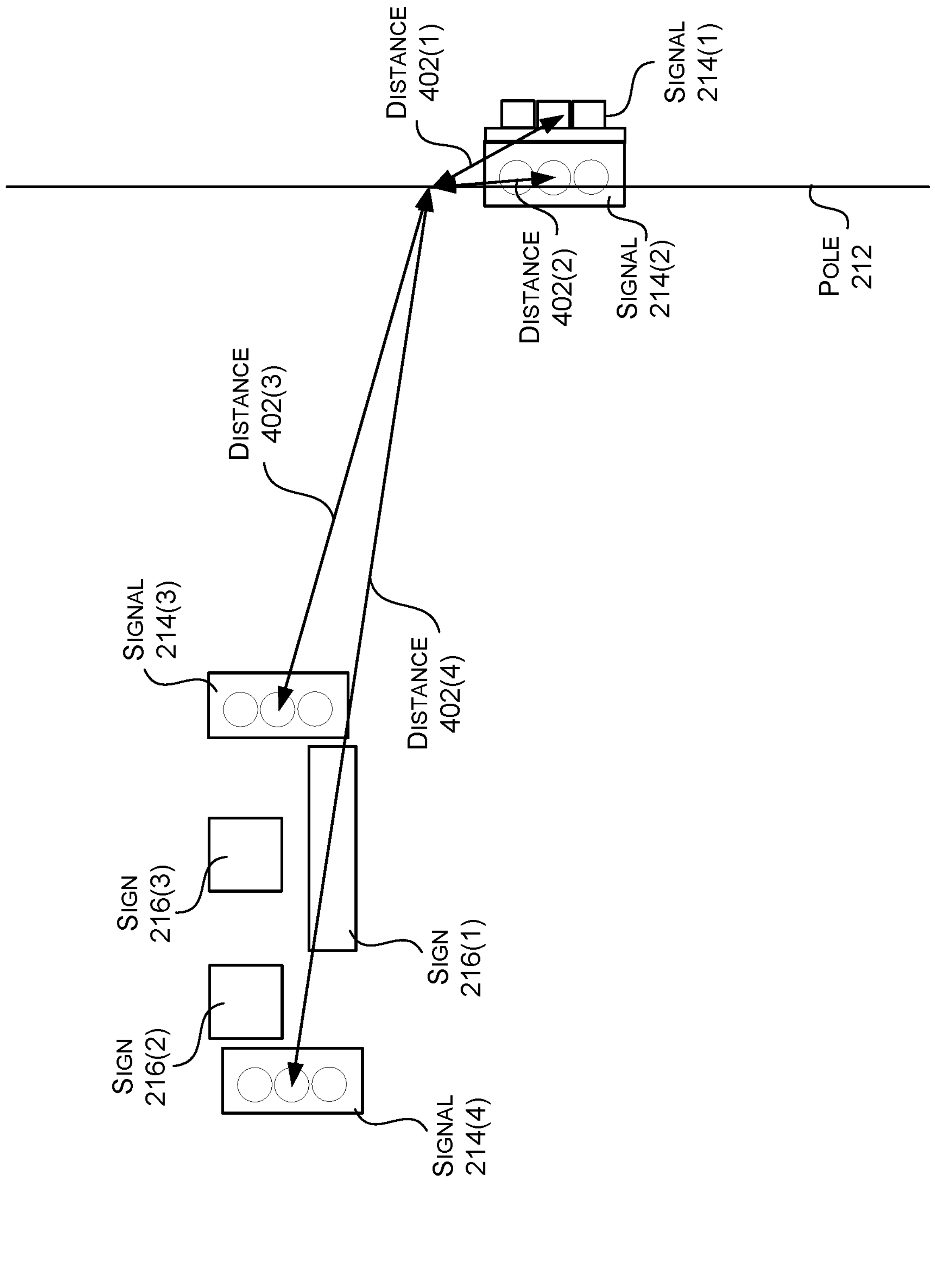
FIGS. 4A-4B illustrate examples of associating traffic signals with a traffic pole, in accordance with some embodiments of the present disclosure.
Figure 4B:
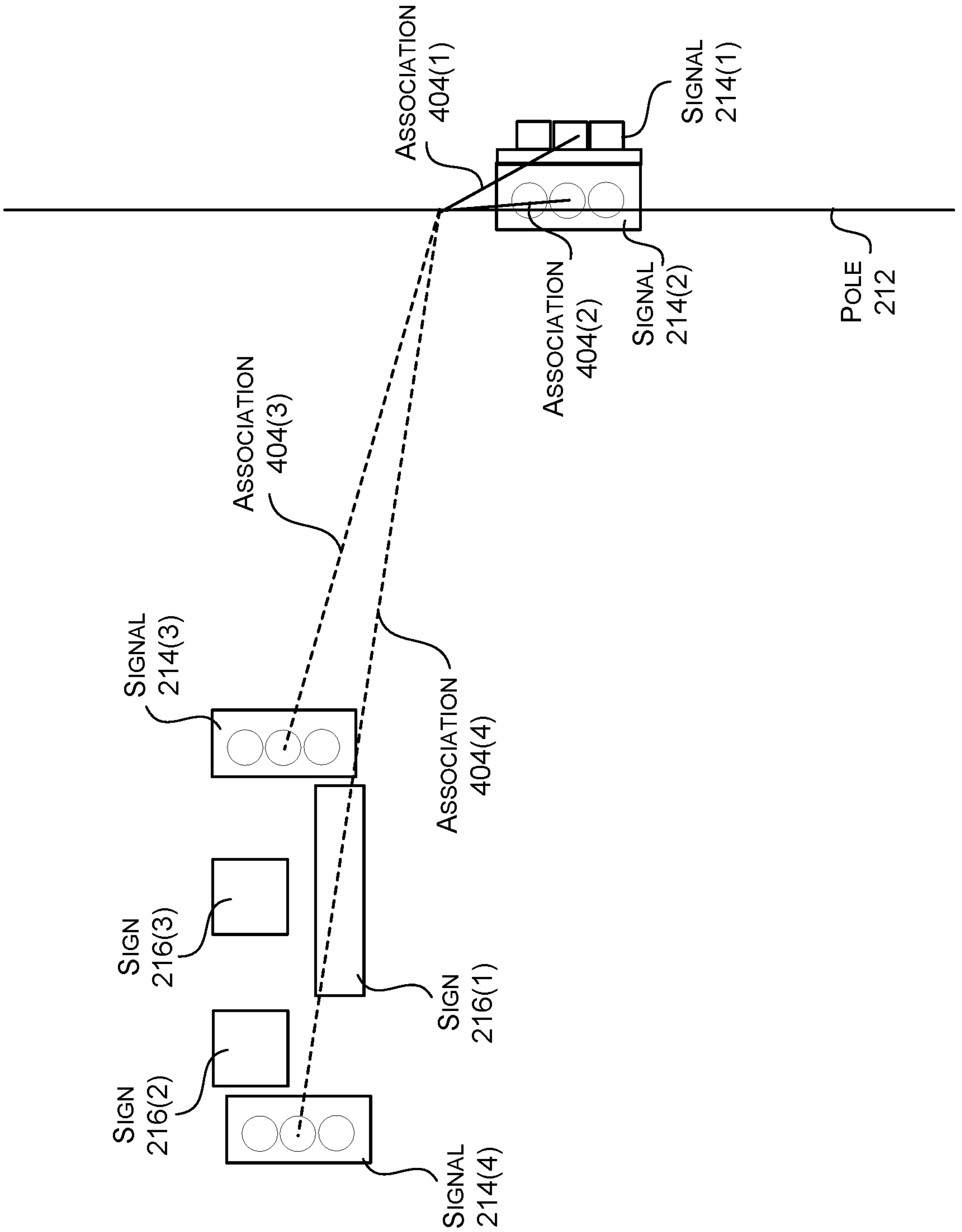

For more details, FIGS. 4A-4B illustrate examples of associating the traffic signals 214(1)-(4) with the traffic pole 212, in accordance with some embodiments of the present disclosure. As shown by the example of FIG. 4A, the pole component 116 may determine a first distance 402(1) between the first traffic signal 214(1) and the traffic pole 212, a second distance 402(2) between the second traffic signal 214(2) and the traffic pole 212, a third distance 402(3) between the third traffic signal 214(3) and the traffic pole 212, and a fourth distance 402(4) between the fourth traffic signal 214(4) and the traffic pole 212. The pole component 116 may then use the distances 402(1)-(4) to determine whether the traffic signals 214(1)-(4) are associated with the traffic pole 212. For a first example, the pole component 116 may determine that the traffic signals 214(3)-(4) are associated with the traffic pole 212 and/or include indirect connections with the traffic pole 212 based at least on the distances 402(3)-(4) satisfying a first threshold distance 118. Additionally, the pole component 116 may determine that the traffic signals 214(1)-(2) are associated with the traffic pole 212 and/or include direct connections with the traffic pole 212 based at least on the distances 402(1)-(2) satisfying a second threshold distance 118 that is less than the first threshold distance 118.

For a second example, the pole component 116 may determine that the traffic signals 214(1)-(2) include direct connections with the traffic pole 212 based at least on the traffic pole 212 being within bounding volumes associated with the traffic signals 214(1)-(2). As described herein, the pole component 116 may determine the bounding volumes based at least on the widths and/or heights associated with the traffic signals 214(1)-(2), where the widths and/or heights may be represented by the signal data 106.

Still, for a third example, the pole component 116 may initially determine that the fourth traffic signal 214(4) is not associated with the traffic pole 212 based at least on the pole component 116 determining that the fourth distance 402(4) does not satisfy (e.g., is greater than) a threshold distance 118. However, the pole component 116 may also determine, using one or more of the processes described herein, that the third traffic signal 214(3) is associated with the traffic pole 212. As such, the pole component 116 may still determine that the fourth traffic signal 214(4) is associated with the traffic pole 212 based at least on the fourth traffic signal 214(4) being associated with the third traffic signal 214(3) and the third traffic signal 214(3) being associated with the traffic pole 212.

While the example of FIG. 4A illustrates determining the distances 402(1)-(4) from a center of the traffic signals 214(1)-(4) to a point that is substantially located at a center of the traffic pole 212, in other examples, the pole component 116 may determine distances using other points on the traffic signals 214(1)-(4) and/or other points on the traffic pole 212. For example, the pole component 116 may determine the shortest distances from the traffic signals 214(1)-(4) to the traffic pole 212. Additionally, while the example of FIG. 4A describes the pole component 116 as using the distances 402(1)-(4) to associate the traffic signals 214(1)-(4) with the traffic pole 212, in other examples, the pole component 116 may use other characteristics associated with the traffic signals 214(1)-(4), such as the orientations associated with the traffic signals 214(1)-(4). For example, the pole component 116 may only search for traffic poles that are located at a specific direction with respect to the orientations of the traffic signals 214(1)-(4), such as the right of the traffic signals 214(1)-(4) (as shown in the example of FIG. 4A) or the left of the traffic signals 214(1)-(4).

As shown by the example of FIG. 4B, based at least on the processing described with respect to FIG. 4A, the pole component 116 may determine that the traffic signals 214(1)-(2) include associations 404(1)-(2) with the traffic pole 212 and/or that the associations 404(1)-(2) include direct connections, as indicated by the solid lines. Additionally, based at least on the processing described with respect to FIG. 4A, the pole component 116 may determine that the traffic signals 214(3)-(4) include associations 404(3)-(4) with the traffic pole 212 and/or that the associations 404(3)-(4) include indirect connections, as indicated by the dashed lines.

Referring back to the example of FIG. 1, the association component 102 may use a sign component 120 that is configured to determine associations between traffic signs and/or traffic signs and traffic signals. As described herein, a traffic sign may be associated with another traffic sign (and/or a traffic signal) based at least on the traffic sign and the other traffic sign attaching to a same traffic pole (e.g., either directly or indirectly, which is also described herein). To determine if a traffic sign is associated with another traffic sign, the sign component 120 may use the sign data 110 (and/or the signal data 106 when identifying associations with traffic signals) to determine a distance between the traffic signs and/or determine a difference in direction between the traffic signs. In some examples, the sign component 120 determines the difference in direction by taking the dot product of the directions (e.g., orientations) associated with the traffic signs.

The sign component 120 may then determine whether the traffic signs are associated with one another using the distance and/or the difference in direction. For a first example, the sign component 120 may determine that the traffic signs are associated based at least on the distance satisfying (e.g., being is less than or equal to) a first threshold distance 122 and/or determine that the traffic signs are not associated based at least on the distance not satisfying (e.g., being greater than) the first threshold distance 122. In such an example, the sign component 120 may use a set threshold distance 122, such as 1 meter, 5 meters, 10 meters, and/or the like, or the sign component 120 may determine the first threshold distance 122 using one or more factors. For instance, the sign component 120 may determine the first threshold distance 122 based at least on a number of lanes, a width of the lanes, a type of road (e.g., rural, highway, etc.), and/or using any other factors.

For a second example, the sign component 120 may additionally, or alternatively, determine that the traffic signs are associated based at least on the difference in direction. For instance, if the sign component 120 determines that the distance between the traffic signs is small (e.g., satisfying a second, smaller threshold distance 122) or if the sign directions are similar (e.g., the dot product is greater than a threshold 122, such as 0.5, 0.75, 0.9, etc.), and the traffic signs are not directly in front or behind one another (e.g., based at least on the poses of the traffic signs), then the sign component 120 may determine that the traffic signs are associated with one another based at least on an absolute value of the dot product of the relative direction being less than another threshold 122, such as 0.5, 0.6, 0.7, and/or any other threshold. While these are just a few example techniques of how the sign component 120 may associate two traffic signs, in other examples, the sign component 120 may use additional and/or alternative techniques to associate the traffic signs. Additionally, the sign component 120 may perform similar processes to associate the traffic signs with one or more traffic signals.

In some examples, the sign component 120 may use one or more iterations (e.g., one iteration, three iterations, five iterations, and/or any other number of iterations) when associating traffic signs. For example, such as if there are two traffic signs and a traffic signal, the sign component 120 may initially perform these processes to determine whether the first traffic sign is associated with the second traffic sign and/or the traffic signal. The sign component 120 may then perform these processes again to determine whether the second traffic sign is associated with the first traffic sign and/or the traffic signal. Additionally, the sign component 120 may again perform these processes to determine whether the traffic signal is associated with the first traffic sign and/or the second traffic sign. In other words, the sign component 120 may use different groupings for one or more (e.g., each) of the iterations. In some examples, this may improve the overall performance of the association.

For example, and using the example above, the sign component 120 may determine that the first traffic sign is associated with the second traffic sign, but not associated with the traffic signal during the first iteration (e.g., the distance between the first traffic sign and the traffic signal does not satisfy a threshold distance 122). However, the sign component 120 may determine that the second traffic sign is associated with the traffic signal during the second iteration. As such, the sign component 120 may then determine that the first traffic sign is associated with the traffic signal based at least on the first traffic sign being associated with the second traffic sign and the second traffic sign being associated with the traffic signal. In other words, the second traffic sign may associate the first traffic sign with the traffic signal.

Figure 5A:
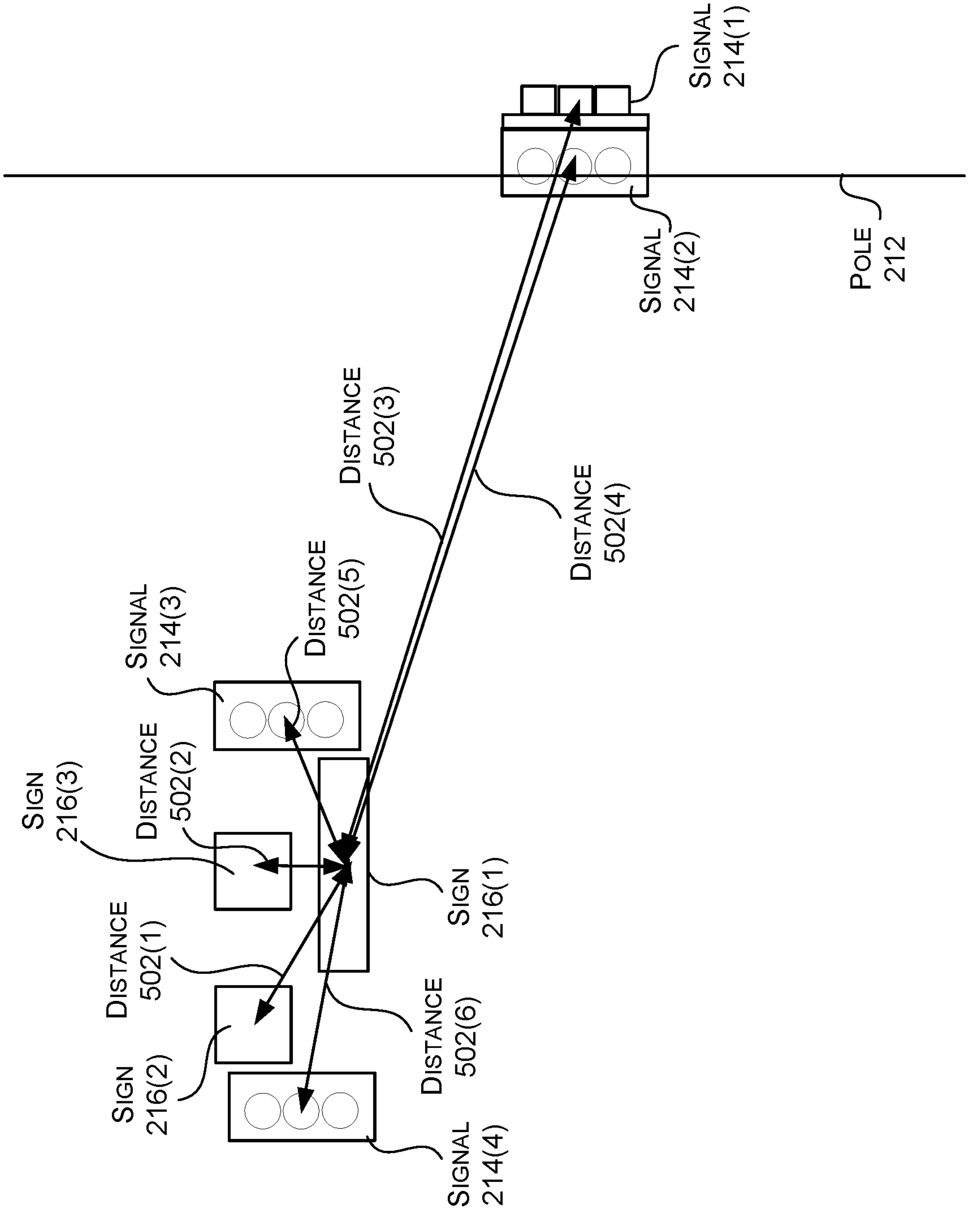
FIGS. 5A-5B illustrate examples of associating traffic signs with one another and/or with one or more traffic signals, in accordance with some embodiments of the present disclosure.
Figure 5B:
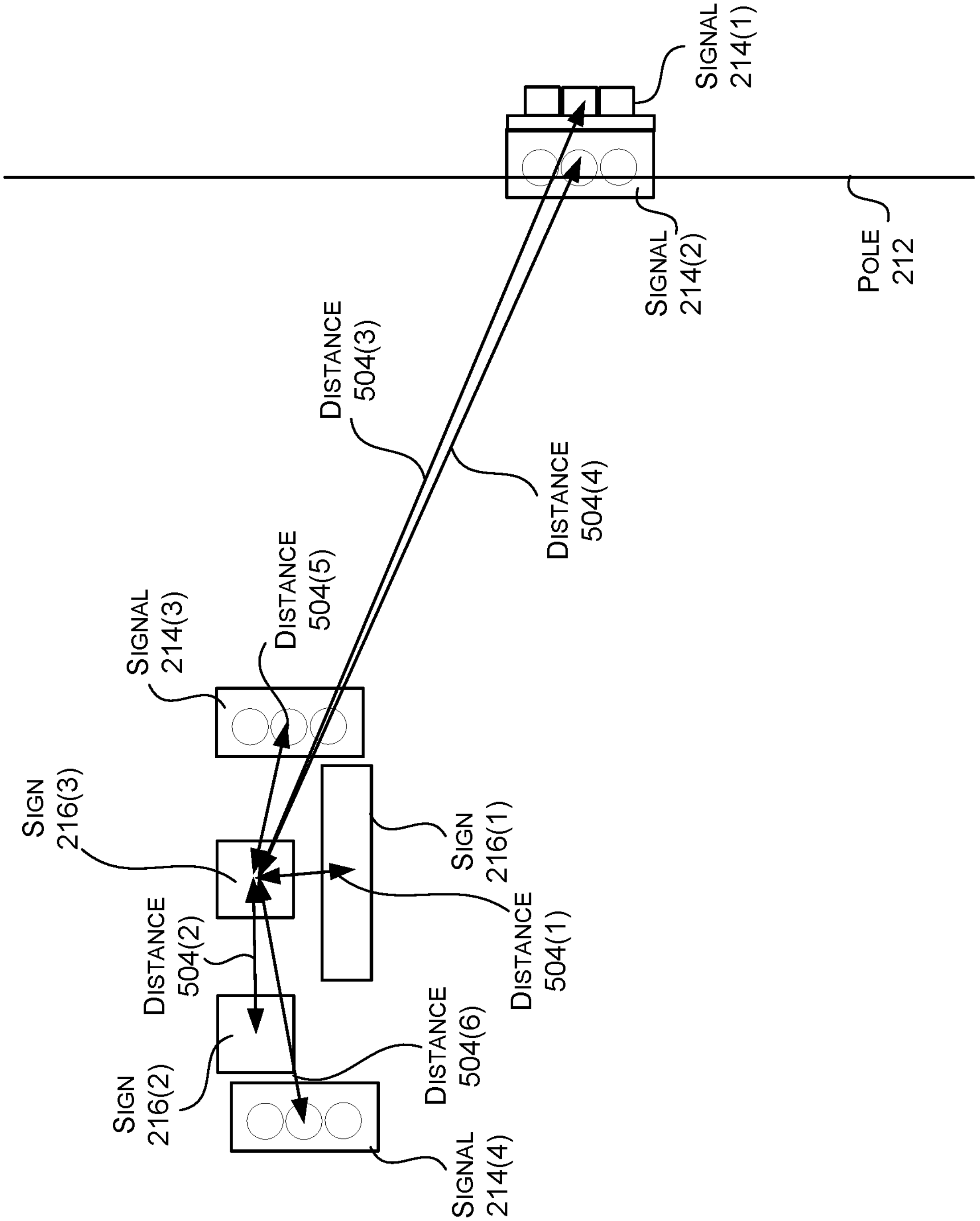

For more details, FIGS. 5A-5B illustrate examples of associating the traffic signs 216(1)-(3) with one another and/or with the traffic signals 214(1)-(4), in accordance with some embodiments of the present disclosure. As shown by the example of FIG. 5A, during a first iteration, the sign component 120 may determine a first distance 502(1) between the first traffic sign 216(1) and the second traffic sign 216(2), a second distance 502(2) between the first traffic sign 216(1) and the third traffic sign 216(3), a third distance 502(3) between the first traffic sign 216(1) and the first traffic signal 214(1), a fourth distance 502(4) between the first traffic sign 216(1) and the second traffic signal 214(2), a fifth distance 502(5) between the first traffic sign 216(1) and the third traffic signal 214(3), and a sixth distance 502(6) between the first traffic sign 216(1) and the fourth traffic signal 214(4). The sign component 120 may then use the distances 502(1)-(6) to determine whether the first traffic sign 216(1) is associated with at least one of the traffic signs 216(2)-(3) and/or at least one of the traffic signals 214(1)-(4). For example, the sign component 120 may determine that the first traffic sign 216(1) is associated with the traffic signs 216(2)-(3) and/or the traffic signals 214(1)-(4) for which the respective distance 502(1)-(6) is less than or equal to a threshold distance 122.

Next, and shown by the example of FIG. 5B, during a second iteration, the sign component 120 may determine a first distance 504(1) between the third traffic sign 216(3) and the first traffic sign 216(1), a second distance 504(2) between the third traffic sign 216(3) and the second traffic sign 216(2), a third distance 504(3) between the third traffic sign 216(3) and the first traffic signal 214(1), a fourth distance 504(4) between the third traffic sign 216(3) and the second traffic signal 214(2), a fifth distance 504(5) between the third traffic sign 216(3) and the third traffic signal 214(3), and a sixth distance 504(6) between the third traffic sign 216(3) and the fourth traffic signal 214(4). The sign component 120 may then use the distances 504(1)-(6) to determine whether the third traffic sign 216(3) is associated with at least one of the traffic signs 216(1)-(2) and/or at least one of the traffic signals 214(1)-(4). For example, the sign component 120 may determine that the third traffic sign 216(3) is associated with the traffic signs 216(1)-(2) and/or the traffic signals 214(1)-(4) for which the respective distance 504(1)-(6) is less than or equal to a threshold distance 122.

The sign component 120 may then perform similar processes during an additional iteration associated with the second traffic sign 216(2). Additionally, the sign component 120 may use the results from the iterations to determine the final associations associated with the traffic signs 216(1)-(3) and/or the traffic signals 214(1)-(4). While the example of FIGS. 5A-5B illustrates the sign component 120 as using the centers of the traffic signs 216(1)-(3) and the traffic signals 214(1)-(4) when determining the distances 302(1)-(6) and 304(1)-(6), in other examples, the sign component 120 may use other locations on the traffic signs 216(1)-(3) and/or the traffic signals 214(1)-(4), such as the corners and/or edges of the traffic signs 216(1)-(3) and/or the traffic signals 214(1)-(4).

Referring back to the example of FIG. 1, the association component 102 may use the pole component 116 to associate the traffic signs with a traffic pole. In some examples, and for a traffic sign, the pole component 116 may use a width and/or height associated with the traffic sign to determine whether the traffic sign is associated with the traffic pole. For example, if the traffic pole is within a bounding volume that is created using at least the width and/or the height of the traffic sign (e.g., along with a length), then the pole component 116 may determine that the traffic sign is associated with the traffic pole. Additionally, the pole component 116 may determine that the association between the traffic sign and the traffic pole includes a specific type of connection, such as a direct connection, which is described in more detail herein.

Additionally, or alternatively, in some examples, and for a traffic sign, the pole component 116 may use one or more threshold distances 118 to determine whether the traffic sign is associated with the traffic pole and/or determine a type of connection between the traffic sign and the traffic pole. For example, the pole component 116 may determine a distance between the traffic sign and the traffic pole, such as by using the sign data 110 (e.g., the pose of the traffic sign) and the pole data 108 (e.g., the pose of the traffic pole). The pole component 116 may then determine that the traffic sign is associated with the traffic pole based at least on the distance satisfying (e.g., being less than or equal to) a first threshold distance 118 or determine that the traffic sign is not associated with the traffic pole based at least on the distance not satisfying (e.g., being greater than) the first threshold distance 118. Additionally, such as for a traffic sign that is within the first threshold distance 118 to the traffic pole, the pole component 116 may determine that the traffic sign includes a direct connection with the traffic pole based at least on the distance satisfying (e.g., being less than or equal to) a second threshold distance 118 or determine that the traffic sign includes an indirect connection with the traffic pole based at least on the distance not satisfying (e.g., being greater than) the second threshold distance 118, where the first threshold distance 118 is greater than the second threshold distance 118.

In some examples, the pole component 116 may use one or more iterations (e.g., one iteration, three iterations, five iterations, and/or any other number of iterations) to associate traffic signs with a traffic pole. For example, such as during a first iteration of processing associated with the traffic signs, the pole component 116 may initially determine that a first traffic sign is not associated with the traffic pole based at least on a distance between the first traffic sign and the traffic pole not satisfying the first threshold distance 118. Additionally, during a second iteration of processing associated with the traffic sings, the pole component 116 may determine that a second traffic sign (and/or a traffic signal) is associated with the traffic pole based at least on a distance between the second traffic sign (and/or the traffic signal) and the traffic pole satisfying the first threshold distance 118. As such, if the first traffic sign is already associated with the second traffic sign (and/or the traffic signal), the pole component 116 may then associate the first traffic sign with the traffic pole based at least on the second traffic sign (and/or the traffic signal) being associated with the traffic pole.

Figure 6A:
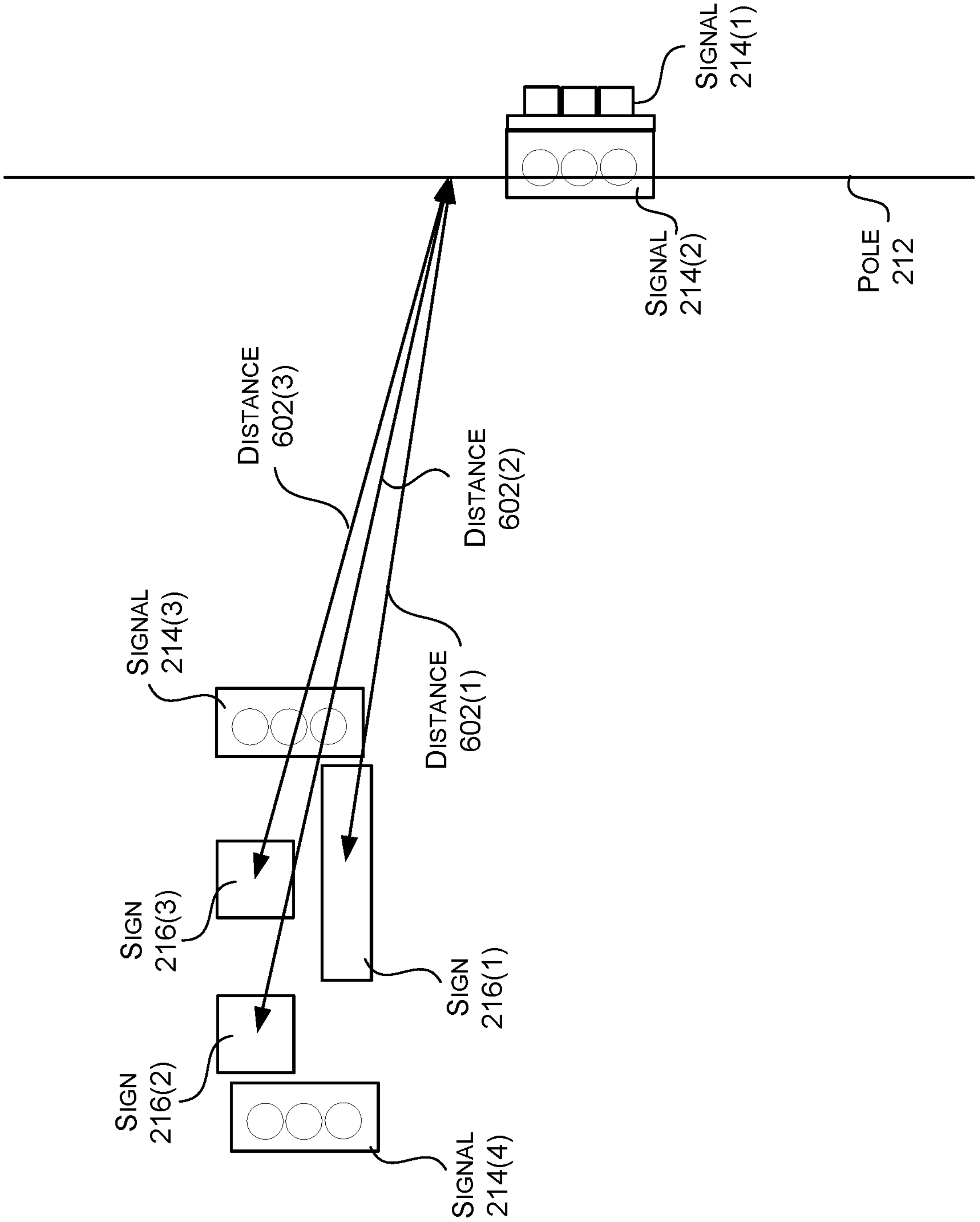
FIGS. 6A-6B illustrate examples of associating traffic signs with a traffic pole, in accordance with some embodiments of the present disclosure.
Figure 6B:
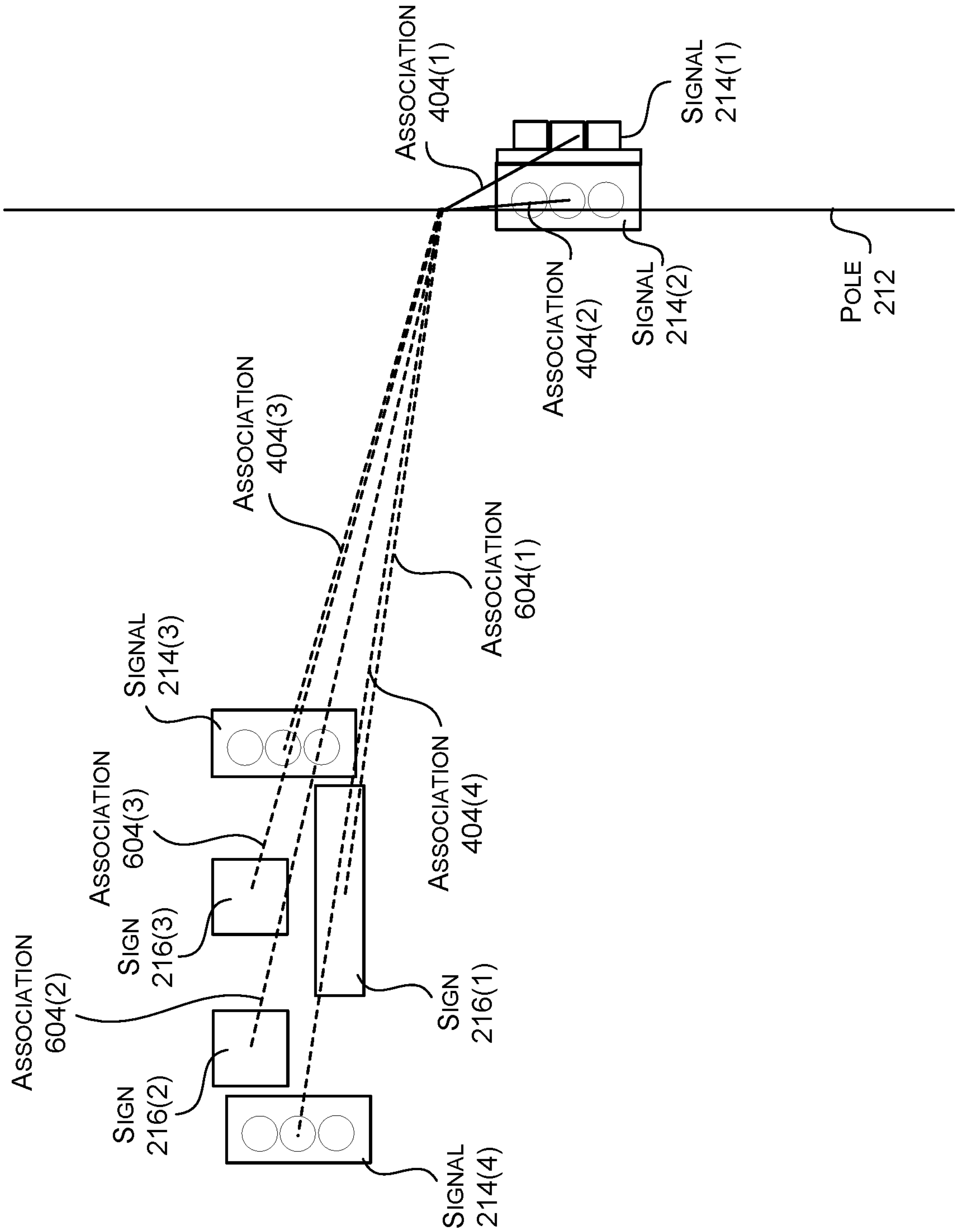

For more details, FIGS. 6A-6B illustrate examples of associating the traffic signs 216(1)-(3) with the traffic pole 212, in accordance with some embodiments of the present disclosure. As shown by the example of FIG. 6A, the pole component 116 may determine a first distance 602(1) between the first traffic sign 216(1) and the traffic pole 212, a second distance 602(2) between the second traffic sign 216(2) and the traffic pole 212, and a third distance 602(3) between the third traffic sign 216(3) and the traffic pole 212. The pole component 116 may then use the distances 602(1)-(3) to determine whether the traffic signs 216(1)-(3) are associated with the traffic pole 212. For a first example, the pole component 116 may determine that the traffic signs 216(3)-(3) are associated with the traffic pole 212 and/or include indirect connections with the traffic pole 212 based at least on the distances 602(1)-(3) satisfying a threshold distance 118 to the traffic pole.

For a second example, the pole component 116 may initially determine that the second traffic sign 216(2) is not associated with the traffic pole 212 based at least on the pole component 116 determining that the second distance 602(2) does not satisfy (e.g., is greater than) a threshold distance 118. However, the pole component 116 may also determine, using one or more of the processes described herein, that the third traffic signal 214(3) and/or the first traffic sign 216(1) is associated with the traffic pole 212. As such, the pole component 116 may still determine that the second traffic sign 216(2) is associated with the traffic pole 212 based at least on the second traffic sign 216(2) being associated with the third traffic signal 214(3) and/or the first traffic sign 216(1) and the third traffic signal 214(3) and/or the first traffic sign 216(1) being associated with the traffic pole 212.

While the example of FIG. 6A illustrates determining the distances 602(1)-(3) from a center of the traffic signs 216 (1)-(3) to a point that is substantially located at a center of the traffic pole 212, in other examples, the pole component 116 may determine distances using other points on the traffic signs 216(1)-(3) and/or other points on the traffic pole 212. For example, the pole component 116 may determine the shortest distances from the traffic signs 216(1)-(3) to the traffic pole 212. Additionally, while the example of FIG. 6A describes the pole component 116 as using the distances 602(1)-(3) to associate the traffic signs 216(1)-(3) with the traffic pole 212, in other examples, the pole component 116 may use other characteristics associated with the traffic signs 216(1)-(3), such as the orientations associated with the traffic signs 216(1)-(3). For example, the pole component 116 may only search for traffic poles that are located at a specific direction with respect to the orientations of the traffic signs 216(1)-(3), such as the right of the traffic signs 216(1)-(3) (as shown in the example of FIG. 6A) or the left of the traffic signs 216(1)-(3).

As shown by the example of FIG. 6B, based at least on the processing described with respect to FIG. 4A, the pole component 116 may determine that the traffic signals 214 (1)-(2) include the associations 404(1)-(2) with the traffic pole 212 and/or that the associations 404(1)-(2) include direct connections, as indicated by the solid lines. Additionally, based at least on the processing described with respect to FIG. 4A, the pole component 116 may determine that the traffic signals 214(3)-(4) include the associations 404(3)-(4) with the traffic pole 212 and/or that the associations 404(3)-(4) include indirect connections, as indicated by the dashed lines. Furthermore, based at least on the processing described with respect to FIG. 6A, the pole component 116 may determine that the traffic signs 216(1)-(3) include associations 604(1)-(3) with the traffic pole and/or that the associations 604(1)-(3) include indirect connections, as indicated by the dashed lines. In some examples, the associations 404(1)-(4) and/or 604(1)-(3) are presented as vectors, such as to one or more users.

Referring back to the example of FIG. 1, the process 100 may include using a structure component 124 to generate a structure that connects the traffic pole with the traffic signal(s) and/or the traffic sign(s). As shown, the structure component 124 may initially use an arm component 126 that is configured to generate an extender (e.g., arm) associated with the traffic pole. In some examples, the arm component 126 determines an initial extender using the distance(s) between the traffic pole and the traffic signal(s) and/or the traffic sign(s) and/or using the direction(s) (e.g., the offset(s)) from the traffic pole to the traffic signal(s) and/or the traffic sign(s).

For example, the arm component 126 may use the pole data 108 and the signal data 106 to determine the distance(s) between the traffic pole and the traffic signal(s) and/or use the pole data 108 and the sign data 110 to determine the distance(s) between the traffic pole and the traffic sign(s). The arm component 126 may also use the pole data 108 and the signal data 106 to determine the direction(s) (e.g., the offset(s)) between the traffic pole and the traffic signal(s) and/or use the pole data 108 and the sign data 110 to determine the direction(s) (e.g., the offset(s)) between the traffic pole and the traffic sign(s). In some examples, the arm component 126 may use additional information when determining the direction(s), such as a first set horizontal offset distance for traffic signs (e.g., 0.1 meters, 0.3 meters, etc.) and/or a second set horizontal offset distance for traffic signals (e.g., 0.1 meters, 0.3 meters . . . 0.5 meters, etc.). The arm component 126 may then determine, using the distance(s), the traffic signal and/or the traffic sign that is located the furthest distance from the traffic pole. Additionally, the arm component 126 may use that furthest distance to determine an initial length of an initial extender and/or use the offset to the furthest traffic signal and/or traffic sign as an initial offset direction for the initial extender.

The arm component 126 may then compare the offset direction(s) associated with another traffic signal(s) and/or another traffic sign(s) (e.g., in a loop) against the initial direction for the initial extender to determine whether to update the initial offset direction. In some examples, the arm component 126 performs the comparison by comparing the dot product of the initial offset direction with the dot product(s) of the additional offset direction(s). The arm component 126 may then increase the initial offset direction for the initial extender to a greatest offset direction(s) of the additional offset direction(s) if the initial offset direction is not the greatest offset direction. This way, the arm component 126 sets the initial extender based at least on a furthest distance to a traffic sign and/or a traffic signal and a greatest offset direction of a traffic sign and/or a traffic signal.

Figure 7A:
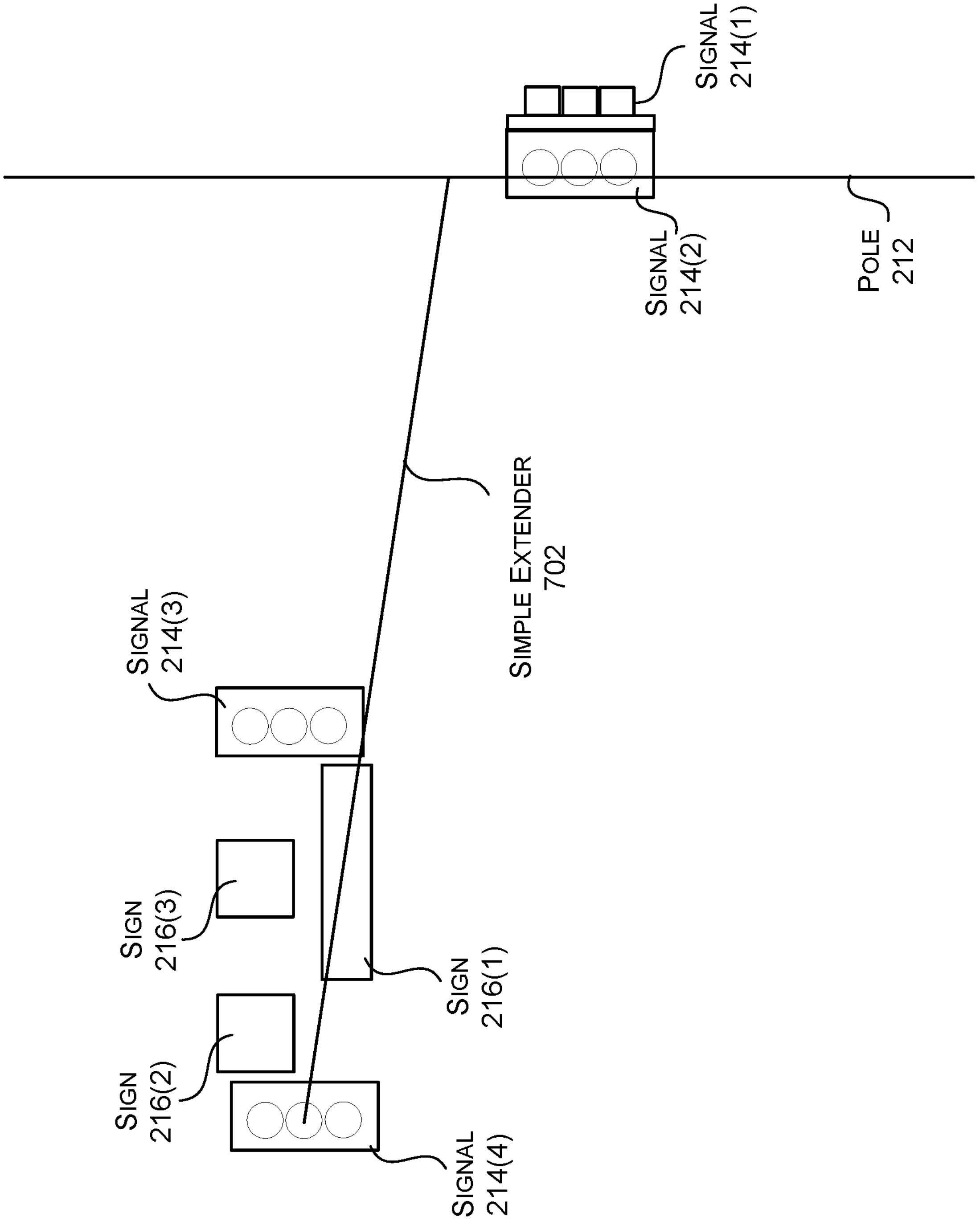
FIGS. 7A-7C illustrate examples of determining initial extenders for a traffic pole, in accordance with some embodiments of the present disclosure.
Figure 7B:
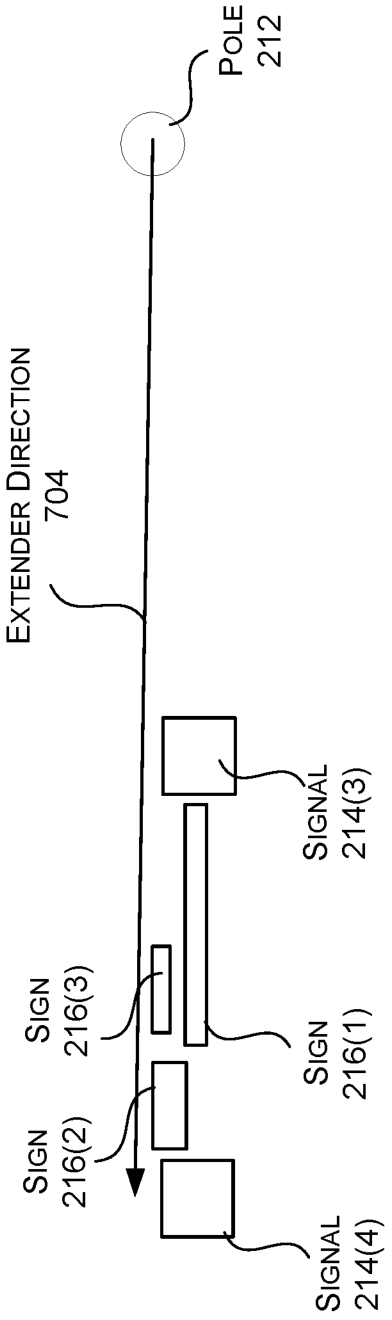
Figure 7C:
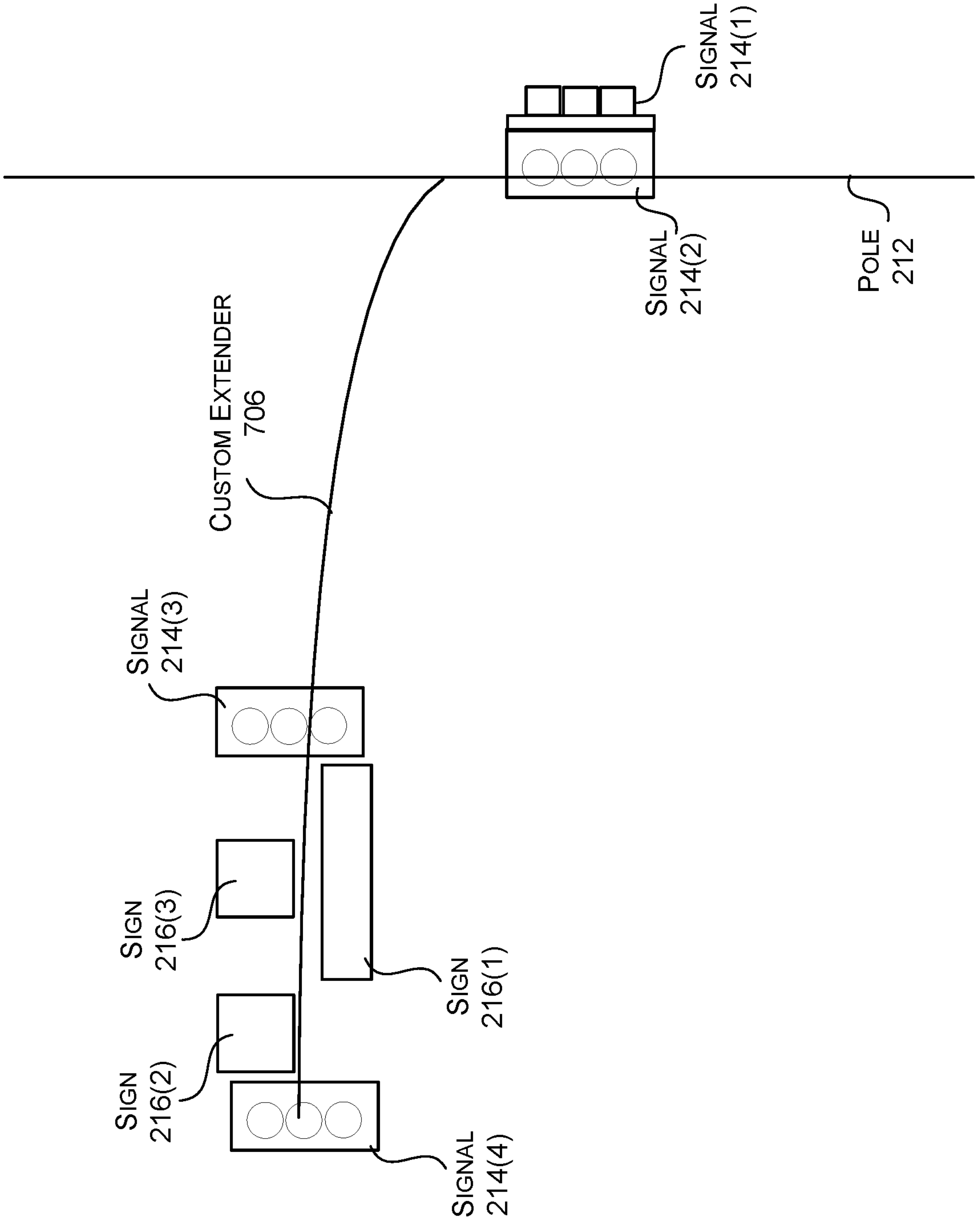

For more details, FIGS. 7A-7C illustrate examples of determining initial extenders for the traffic pole 212, in accordance with some embodiments of the present disclosure. As shown by the example of FIG. 7A, the arm component 126 may determine a simple extender 702 that extends from a point that is substantially at a center of the traffic pole 212 to the fourth traffic signal 214(4). As described herein, the simple extender 702 may extend to the fourth traffic signal 214(4) based at least on the fourth traffic signal 214(4) including a furthest traffic object from the traffic pole 212 as compared to the traffic signals 214(1)-(3) and the traffic signs 216(1)-(3). Additionally, the simple extender 702 may be considered "simple" based at least on the simple extender 702 being substantially flat.

FIG. 7B then illustrates a top-down image, where an offset direction 704 associated with the simple extender 702 is determined based at least on the offset directions of the traffic signals 214(1)-(4) and/or the traffic signs 216(1)-(3). For instance, and as illustrated, the offset direction 704 may include the offset direction associated with the third traffic sign 216(3) based at least on the offset direction associated with the third traffic sign 216(3) including a largest offset direction from among the offset directions. As such, even though the arm component 126 uses the distance associated with the fourth traffic signal 214(4) to determine the length of the simple extender 702, the arm component 126 still uses the offset direction of the third traffic sign 216(3) to determine the offset direction 704 of the simple extender 702.

Still, FIG. 7C illustrates another example of an initial extender associated with the traffic pole 212, where the initial extender in the example of FIG. 7C includes a custom extender 706. For instance, the custom extender 706 may also extend from the point that is substantially in the center of the traffic pole 212 to the fourth traffic signal 214(4) based at least on the fourth traffic signal 214(4) including a furthest traffic object from the traffic pole 212 as compared to the traffic signals 214(1)-(3) and the traffic signs 216(1)-(3). However, the custom extender 706 may include a different shape as compared to the simple extender 702, such as a curve. In some examples, the custom extender 706 may include a more realistic representation of actual extenders (e.g., arms) associated with traffic poles. While this is just one example of a custom extender that may be used for the traffic pole 212, in other examples, additional and/or alternative custom extenders may be used.

Referring back to the example of FIG. 1, the arm component 126 may further determine the geometry associated with the extender using one or more techniques. For instance, in some examples, the arm component 126 may determine the geometry using one or more custom values for one or more parameters that are defined by one or more users, where the custom value(s) may be represented by configuration data 128. Additionally, or alternatively, in some examples, the arm component 126 may determine the geometry using one or more standard values for the parameter(s), where the standard value(s) may be represented by the configuration data 128. In such examples, the standard value(s) may be determined using one or more county, city, state, country, and/or so forth standards associated with the environment for which the traffic pole is located. Additionally, the parameter(s) may include, but is not limited to, a connection height of an extender on the traffic pole, a rise of the extender, an inflection associated with the extender, an inflection point location associated with the extender, a width profile associated with the extender, a width of the traffic pole at the connection point, one or more standard lengths associated with the extender, and/or any other parameter.

Figure 8:
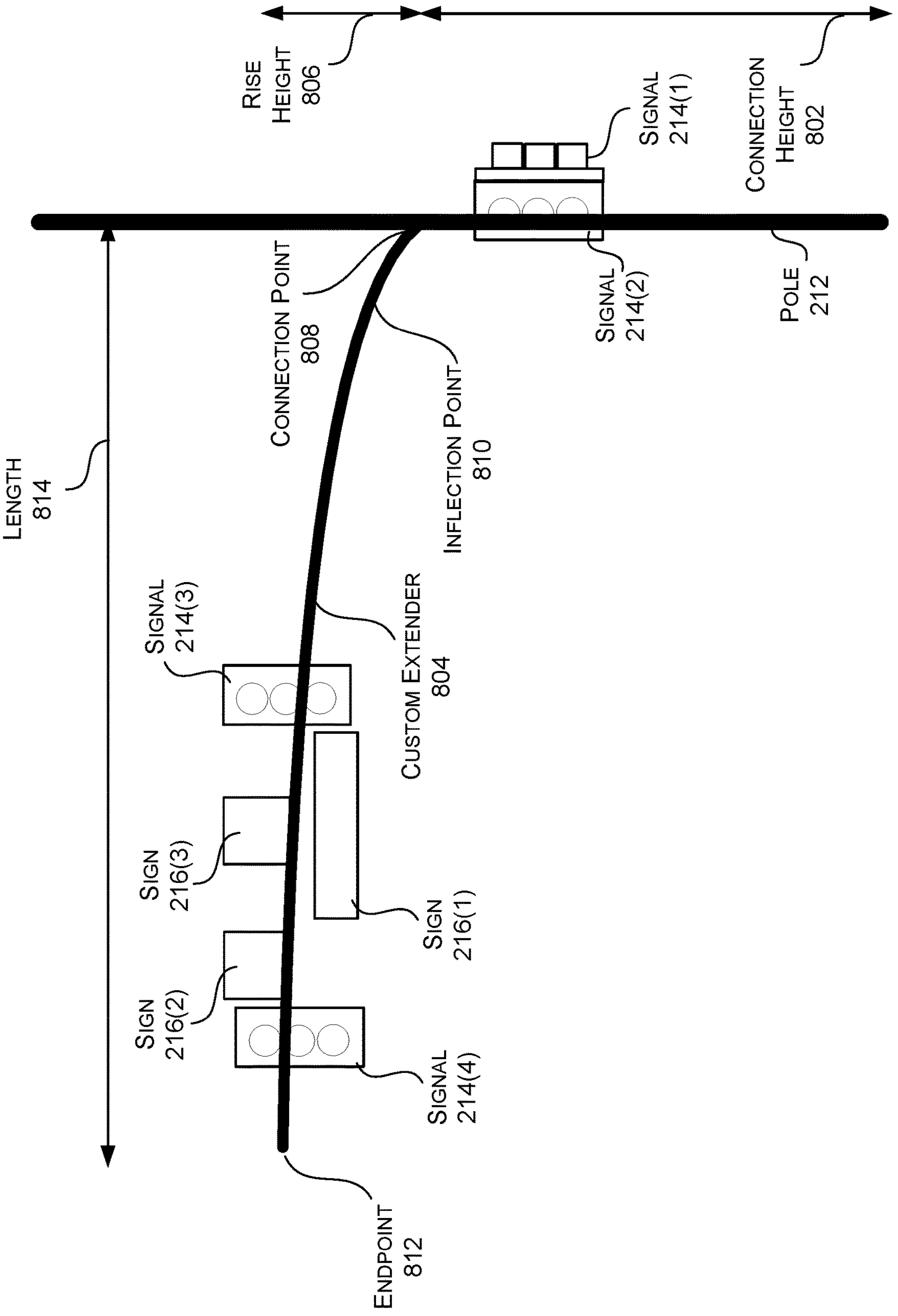
FIG. 8 illustrates an example of parameters that may be used to generate a structure associated with a traffic pole, in accordance with some embodiments of the present disclosure.

For instance, FIG. 8 illustrates an example of parameters that may be used to generate a structure associated with the traffic pole 212, in accordance with some embodiments of the present disclosure. As shown, a first parameter may be associated with a connection height 802 indicating a location at which a custom extender 804 connects to the traffic pole 212. As described herein, a value for the connection height 802 may include, but is not limited to, 1 meter, 3 meters, 5 meters, 6 meters, 10 meters, and/or any other height. A second parameter may be associated with a rise height 806 of the custom extender 804. As described herein, the rise height 806 may include the height that the custom extender 804 rises from a connection point 808 on the traffic pole 212 to a highest point associated with the custom extender 804. Additionally, a value for the rise height 806 may include, but is not limited to, 1 meter, 2 meters, 3 meters, 4 meters, and/or any other height.

A third parameter may be associated with an inflection of the custom extender 804 and indicate whether the custom extender 804 is flat, such as in the example of FIG. 7A, or includes a curve (and/or any other shape), such as in the examples of FIGS. 7C and 8. Additionally, such as when the custom extender 804 includes a curve, the third parameter may indicate whether the custom extender 804 includes an inflection point 810. In some examples, a custom extender may not include an inflection point when the custom extender includes a simple smooth curve that rises along the length of the custom extender (e.g., from the connection point 808 to an endpoint 812). Additionally, the custom extender 804 may include the inflection point 810 based on a rate of the rise of the custom extender 804 changing at the inflection point 810. In such an example where the custom extender 804 includes the inflection point 810, a fourth parameter may be associated with a location of the inflection point 810 on the custom extender 804. For example, a value for the fourth parameter may indicate a location, such as a one-dimensional location, a two-dimensional location, a three-dimensional location, and/or any other type of location on the custom extender 804 and/or within the environment for which the custom extender 804 is located.

A fifth parameter may be associated with a diameter (and/or other dimensions) of the custom extender 804 at the connection point 808 and/or a diameter (and/or other dimensions) of the custom extender 804 at the endpoint 812 (and/or at any other point along the custom extender 804). In some examples, the diameter at the connection point 808 is the same as the diameter at the endpoint 812. In some examples, the diameter at the connection point 808 is different than (e.g., larger than) the diameter at the endpoint 812. A sixth parameter may be associated with a length 814 of the custom extender 804. In some examples, the sixth parameter may include a set value for the length 814 of the custom extender 804 such as, but not limited to, 5 meters, 8 meters, 10 meters, 12 meters, and/or any other distance. However, in other examples, the sixth parameter may include values for different ranges of the length 814 of the custom extender 804. In such examples, the arm component 126 may then determine the length 814 of the custom extender 804 based at least on the initial length of the custom extender 804, as determined using one or more of the processes described herein, and the different ranges.

For instance, and as described herein, the arm component 126 may determine the initial length based at least on the distance to the fourth traffic signal 214(4) since the fourth traffic signal 214(4) includes a furthest distance from the traffic pole 212 as compared to the other traffic signals 214(2)-(4) and the traffic signs 216(1)-(3). As such, the arm component 126 may use the initial length along with the values for the different ranges to determine the length 814 of the custom extender 804. For example, the values may indicate that extenders come in lengths of 2 meters, such that an extender may include 2 meters, 4 meters, 6 meters, 8 meters, 10 meters, 12 meters, 14 meters, 16 meters, 18 meters, 20 meters, and/or so forth. As such, if the initial length is 9 meters, then the arm component 126 may determine that the length 814 of the custom extender 804 is 10 meters since it is the next length up that will still work for connecting the traffic signals 214(3)-(4) and/or the traffic signs 216(1)-(3).

Referring back to the example of FIG. 1, the process 100 may include the structure component 124 using a connector component 130 to determine one or more connection types associated with the traffic signal(s) and/or the traffic sign(s). In some examples, the connector component 130 may determine to use a first type of connector(s) for a traffic signal(s) and/or a traffic sign(s) that includes a direct connection with the traffic pole and/or a second type of connector(s) for a traffic signal(s) and/or a traffic sign(s) that includes an indirect connection with the traffic pole (e.g., attached to the extender of the traffic pole). In some examples, the connector component 130 may determine a geometry of a connection using one or more custom values for one or more parameters that are defined by one or more users, where the custom value(s) may be represented by the configuration data 128. Additionally, or alternatively, in some examples, the connector component 130 may determine the geometry of a connection using one or more standard values for the parameter(s), where the standard value(s) may be represented by the configuration data 128. As described herein, the parameter(s) for a connection of a traffic object (e.g., a traffic signal, a traffic sign, etc.) may include, but is not limited to, a radius of a bracket, a radius of a pipe, a height of an elbow, a horizontal offset of the traffic object, a vertical offset of the traffic object, a total offset of the traffic object, and/or any other parameter.

For an example of determining a connection for a traffic sign that includes an indirect connection with a traffic pole, the connector component 130 may find the closest points on the extender to two endpoints of a top edge of the traffic sign.

If the connector component 130 determines that a vertical distance between at least one of the closest points and its respective endpoint satisfies a threshold distance (e.g., 0 meters), then the connector component 130 may determine that the traffic sign is directly connected to the extender. However, if the connector component 130 determines that the vertical distances between the closest points and the endpoints do not satisfy (e.g., are greater than) the threshold distance, then the connector component 130 may determine that the traffic sign is indirectly connected to the extender. As such, the connector component 130 may determine the connection for attaching the traffic sign to the extender.

For instance, the connector component 130 may use the width of the traffic sign to determine an inset distance associated with the connection. The connector component 130 may also use the top edge of the traffic sign and the inset distance to determine one or more positions for one or more bracket connection points. In some examples, the connector component 130 may use the closest points on the extender to create a bracket geometry with a bracket radius (which may be indicated by the value(s) of the parameter(s)). The connector component 130 may then use these brackets to generate the connection between the traffic sign and the extender.

Figure 9:
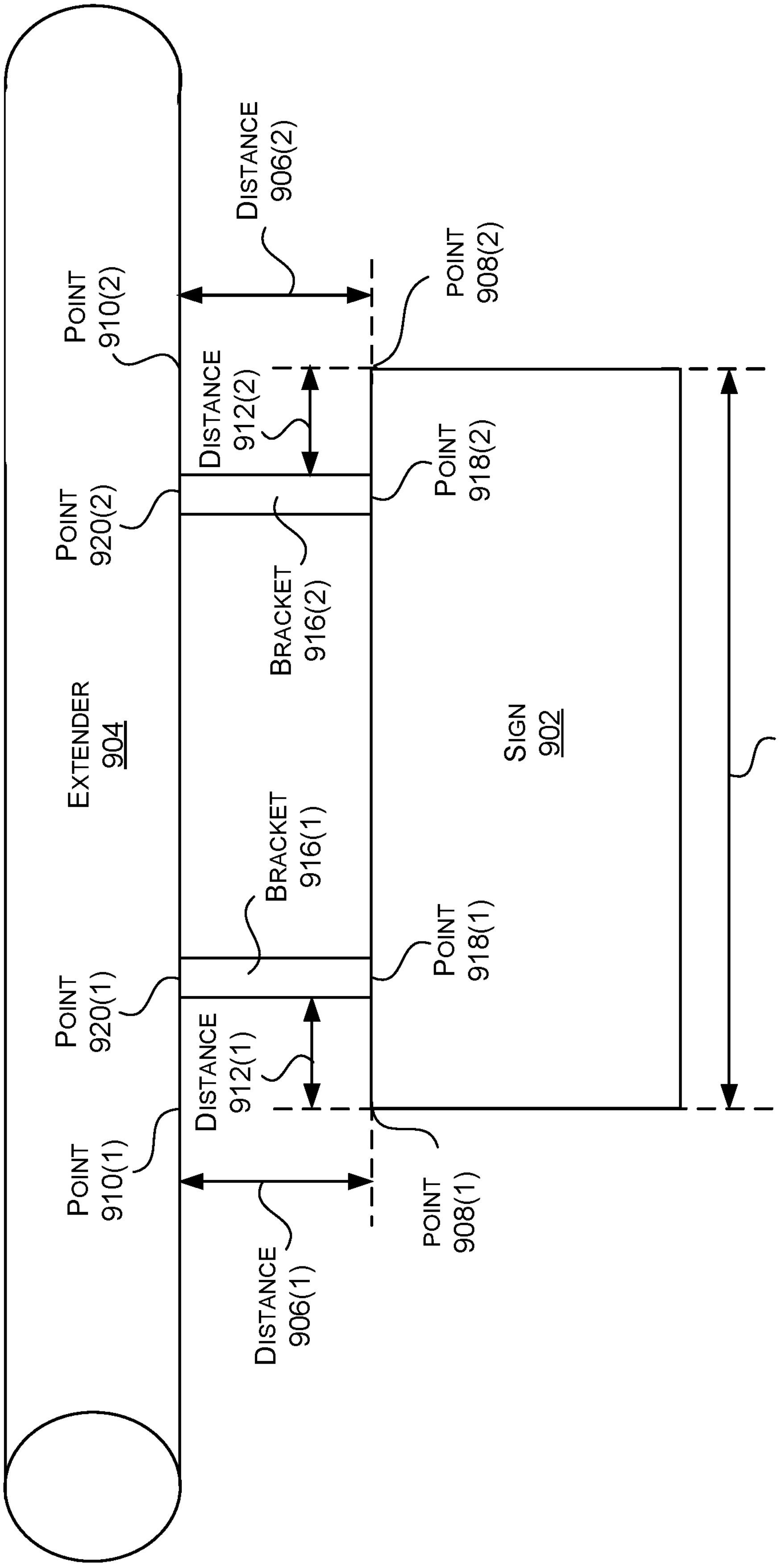
FIG. 9 illustrates an example of generating a connection between a traffic sign and an extender of a traffic pole, in accordance with some embodiments of the present disclosure.

For instance, FIG. 9 illustrates an example of generating a connection between a traffic sign 902 (which may represent, and/or include, one or more of the traffic signs 216(1)-(3)) and an extender 904 (which may represent, and/or include, the simple extender 702, the custom extender 706, and/or the custom extender 804) of a traffic pole (e.g., the traffic pole 212), in accordance with some embodiments of the present disclosure. In the example of FIG. 9, the connector component 130 may initially determine a first distance 906(1) between a point 908(1) on a top edge of the traffic sign 902 and a closest point 910(1) on the extender 904 and/or a second distance 906(2) between a point 908(2) on the top edge of the traffic sign 902 and a closest point 910(2) on the extender 904. The connector component 130 may then determine that the first distance 906(1) and/or the second distance 906(2) do not satisfy (e.g., are greater than) a threshold distance. As such, the connector component 130 may determine that brackets are needed to connect the traffic sign 902 to the extender 904.

The connector component 130 may then determine a first inset distance 912(1) from a left edge of the traffic sign 902 and a second inset distance 912(2) from a right edge of the traffic sign 902. In some examples, the connector component 130 may use one or more techniques to determine the inset distances 912(1)-(2). For example, the connector component 130 may use a first distance as the inset distances 912(1)-(2) when a width 914 of the traffic sign 902 is less than a threshold distance (e.g., 1 meter, 2 meters, 3 meters, etc.) and a second, longer distance for the inset distances 912(1)-(2) when the width 914 is equal to or greater than the threshold distance. As discussed herein, an inset distance may include, but is not limited to, 0.1 meters, 0.5 meters, 0.75 meters, 1 meter, and/or any other distance.

The connector component 130 may then generate the connection that includes at least a first bracket 916(1) and a second bracket 916(2). In some examples, and as shown by the example of FIG. 9, the first bracket 916(1) is connected to a first point 918(1) that is located at the top edge of the traffic sign 902 and associated with the first inset distance 912(1) and a corresponding closest point 920(1) on the extender 904. Additionally, the second bracket 916(2) is connected to a second point 918(2) that is located at the top edge of the traffic sign 902 and associated with the second inset distance 912(2) and a corresponding closest point 920(2) on the extender 904. However, in other examples, the brackets 916(1)-(2) may connect to different points on the traffic sign 902 and/or different points on the extender 904. Additionally, in some examples, the connector component 130 may further generate the brackets 916(1)-(2) using one or more values for the parameter(s) (e.g., a value for a radius of a bracket).

Referring back to the example of FIG. 1, and for an example of determining a connection for a traffic signal that includes an indirect connection with a traffic pole, the connector component 130 may identify a closest point on an extender of the traffic pole from a center of the traffic signal. In some examples, the connector component 130 determines the closest point from the center of the traffic signal after adding a horizontal offset and/or a vertical offset to the center of the traffic signal (e.g., using the values of the parameters above). The connector component 130 may then generate a first section of a polyline from the center of the traffic signal to a corner point that is directly below (or above, in some examples) the closest point on the extender. Additionally, the connector component 130 may generate a second section of the polyline that connects the corner point to the closest point on the extender. As such, the polyline may create the structure of the connection between the traffic signal and the extender. The connector component 130 may then add a radius (and/or other dimensions) to the polyline to complete the connection, where the radius may be determined using one or more values of the parameter(s) (e.g., a value for a radius of a pipe).

Figure 10:
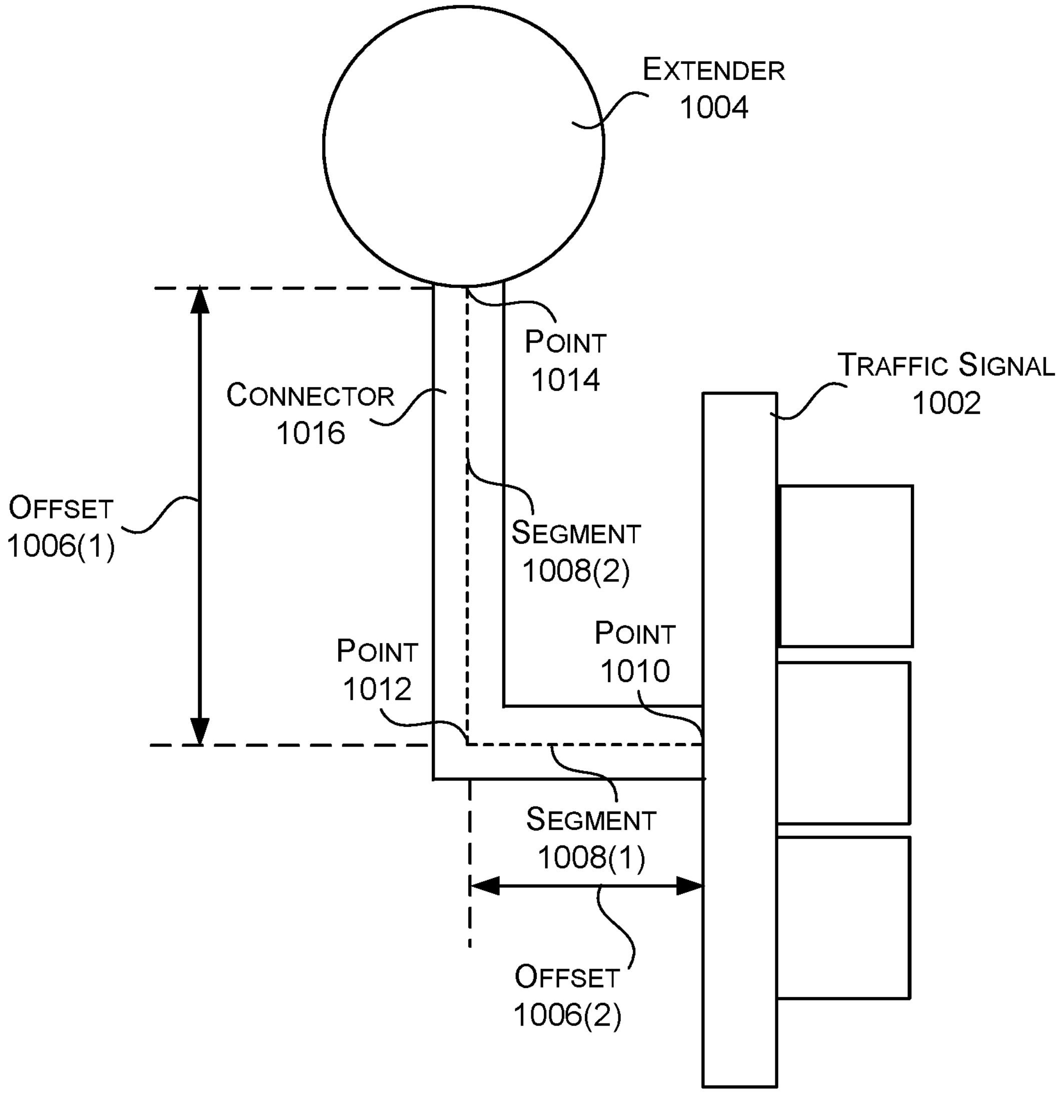
FIG. 10 illustrates an example of generating a connection between a traffic signal and an extender of a traffic pole, in accordance with some embodiments of the present disclosure.

For instance, FIG. 10 illustrates an example of generating a connection between a traffic signal 1002 (which may represent, and/or include, one or more of the traffic signals 214(3)-(4)) and an extender 1004 (which may represent, and/or include, the simple extender 702, the custom extender 706, and/or the custom extender 804) of a traffic pole (e.g., the traffic pole 212), in accordance with some embodiments of the present disclosure. As shown, the traffic signal 1002 may include both a vertical offset 1006(1) and a horizontal offset 1006(2) from the extender 1004. As such, the connector component 130 may generate a first segment 1008(1) of a polyline that extends from a point 1010 that is substantially at a center of the traffic signal 1002 to a corner point 1012. The connector component 130 may also generate a second segment 1008(2) of the polyline that extends from the corner point 1012 to a closet point 1014 on the extender 1004. Additionally, the connector component 130 may then generate a connector 1016 that connects the traffic signal 1002 to the extender 1004 by creating a geometry for the polyline using one or more values for the parameter(s) (e.g., a radius of a pipe).

Referring back to the example of FIG. 1, the connector component 130 may further generate one or more connections for one or more traffic objects (e.g., one or more traffic signals, one or more traffic signs, etc.) that are directly connected to the traffic pole. For instance, the connector component 130 may initially group traffic objects that are close and/or vertically overlapping. As described in more detail herein, the connector component 130 may initially group the traffic objects since traffic objects that are close and/or vertically overlapping may share a single type of connector, such as bracket, with one another. In some examples, to perform the grouping, the connector component 130 may generate polylines that extend from points on the traffic objects (e.g., centers of the bottom edges of the traffic objects, centers from the top edges of the traffic objects, centers of the traffic objects, etc.) to the traffic pole.

The connector component 130 may then group the traffic objects using a threshold distance, such as 0.5 meters, 1 meter, 2 meters, and/or any other distance.

For example, the connector component 130 may start at the lowest polyline and then move up the traffic pole in iterations corresponding to the threshold distance. As such, the connector component 130 may segment the traffic pole into sections, where one or more segments (e.g., each segment) includes the threshold distance. For a segment, the connector component 130 may then group one or more traffic objects that include one or more polylines that fall within the segment. The connector component 130 may then continue to perform these processes to determine one or more additional groups associated with one or more additional segments. As described herein, a group of traffic objects may include, but is not limited to, one traffic object, two traffic objects, three traffic objects, five traffic objects, and/or any other number of traffic objects.

The connector component 130 may also determine one or more values for one or more parameters that the connector component 130 uses to generate a connection for a group of traffic objects. In some examples, the connector component 130 uses one or more custom values for the parameter(s), where the custom value(s) may be represented by the configuration data 128. Additionally, or alternatively, in some examples, the connector component 130 uses one or more standard values for the parameter(s), where the standard value(s) may be represented by the configuration data 128. As described herein, the parameter(s) for a direct connection of a traffic object (e.g., a traffic signal, a traffic sign, etc.) may include, but is not limited to, a radius of a pipe, a height of an elbow, a horizontal offset of the traffic object, a vertical offset of the traffic object, a total offset of the traffic object, and/or any other parameter.

The connector component 130 may then determine, for at least a traffic object included within a group, a lowest vertical point, a highest vertical point, and a horizontal center point of the traffic object. Additionally, the connector component 130 may create a polyline that connects the lowest vertical point and the highest vertical point at the horizontal center point. The connector component 130 may then connect a pipe mount for the traffic object to a center pipe at the bottom and top. Additionally, the connector component 130 may perform similar processes for one or more (each) of the traffic objects if the group includes more than one traffic object.

The connector component 130 may then determine a connection between the center pipe and the traffic pole. In some examples, if the traffic pole is vertically higher than the traffic object(s) included in the group, then the connector component 130 may use a side mount to attach the center pipe to the traffic pole. In such examples, the center pipe may be moved horizontally such that the center pipe coincides with a center of the traffic pole with an offset at a distance (which may equal the radius of the traffic pole) that is away from the center of the traffic pole. However, in some examples, if the traffic pole is not vertically higher than the traffic object(s) included in the group, then the connector component 130 may use a top mount to attach the center pipe to the traffic pole, where the top mount may move the center pipe horizontally to coincide with the center of the traffic pole. Additionally, an extension may be added to a location on the center pipe (e.g., a bottom of the center pipe, a middle of the center pipe, a top of the center pipe, etc.) that further attaches the center pipe to the traffic pole.

In some examples, the connector component 130 generates the pipe mount, the center pipe, the side mount, the top mount, and/or the extension as polylines associated with the connection. In such examples, the connector component 130 may then generate the connection by creating a geometry using the polylines. For example, the connector component 130 may generate the structure (e.g., a tubular geometry) by adding one or more radiuses to one or more of the polylines. In some examples, a radius may be determined using one or more values of the parameter(s), such as the radius of the pipe.

Figure 11A:
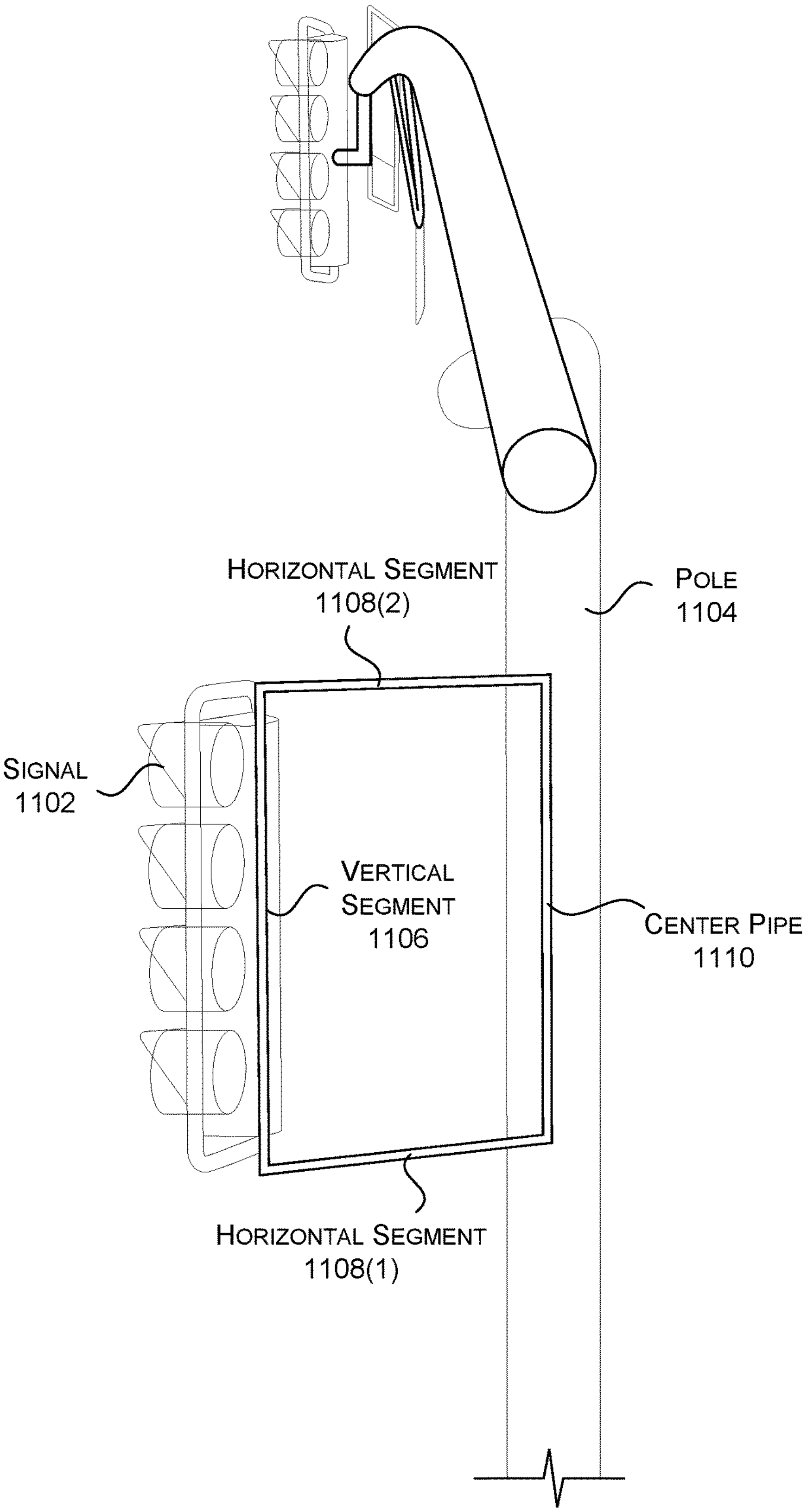
FIGS. 11A-11B illustrate examples of generating direct connections between traffic objects and traffic poles, in accordance with some embodiments of the present disclosure.
Figure 11B:
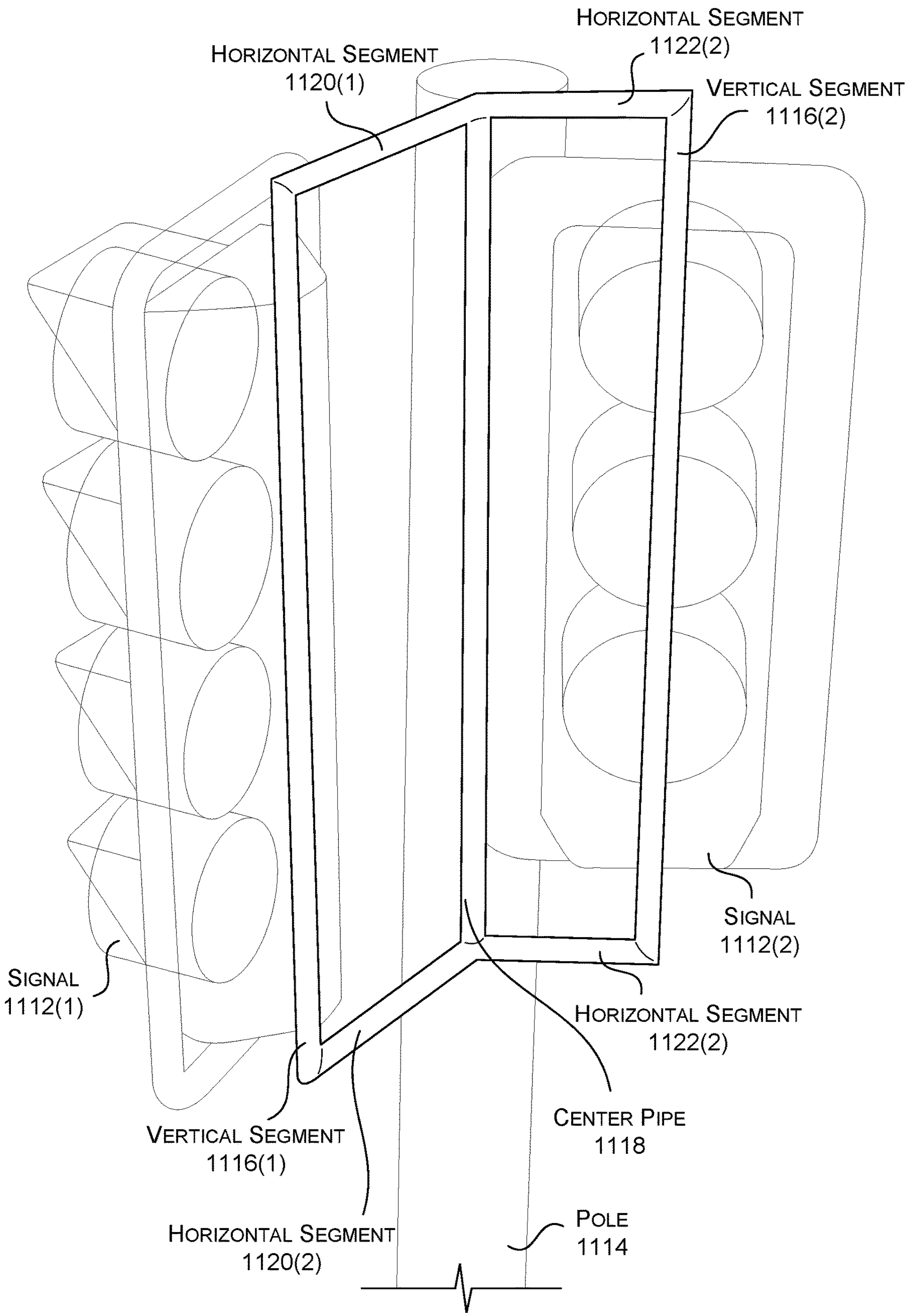

For instance, FIGS. 11A-11B illustrate examples of generating direct connections between traffic objects and traffic poles, in accordance with some embodiments of the present disclosure. As shown by the example of FIG. 11A, a traffic signal 1102 (e.g., a traffic object) (which may represent, and/or include, one or more of the traffic signals 214(1)-(2)) may include a direct connection with a traffic pole 1104 (which may represent, and/or include, the traffic pole 212). To create the direct connection, the connector component 130 may generate a first polyline that is associated with a vertical pipe segment 1106 that attaches to the traffic signal 1102. As described herein, the connector component 130 may determine the first polyline based at least on the lowest vertical point and/or the highest vertical point associated with the traffic signal 1102.

The connector component 130 may then generate a second polyline associated with a first horizontal pipe segment 1108(1) and a third polyline associated with a second horizontal pipe segment 1108(2), where the second polyline and the third polyline attach to a fourth polyline associated with a center pipe 1110. As described herein, in some examples, the second polyline and/or the third polyline attach to the fourth polyline using one or more curves, such as at corners using elbows. Additionally, the connector component 130 may then generate a geometry associated with the connection by adding a radius to the polylines. For instance, and as shown by the example of FIG. 11A, adding the radius to the polylines may create the geometries for the vertical pipe segment 1106, the horizontal pipe segments 1108(1)-(2), and/or the center pipe 1110.

As shown by the example of FIG. 11B, a first traffic signal 1112(1) (e.g., a first traffic object) (which may represent, and/or include, one or more of the traffic signals 214(1)-(2)) and a second traffic signal 1112(2) (e.g., a second traffic object) (which may represent, and/or include, one or more of the traffic signals 214(1)-(2)) may include direct connections with a traffic pole 1114 (which may represent, and/or include, the traffic pole 212). To create the direct connections, the connector component 130 may use similar processes as those described with respect to FIG. 11A to generate a first vertical pipe segment 1116(1) that connects the first traffic signal 1112(1) to a center pipe 1118 using horizontal pipe segments 1120(1)-(2) and generate a second vertical pipe segment 1116(2) that connects the second traffic signal 1112(2) to the center pipe 1118 using horizontal pipe segments 1122(1)-(2). As such, the same center pipe 1118 may be used to connect both traffic signals 1112(1)-(2) to the traffic pipe 1114.

While the example of FIG. 11B illustrates both of the traffic signals 1112(1)-(2) as including the same vertical distance dimensions, in other examples, traffic objects associated with a group may include different vertical distance dimensions. In such examples, the connector component 130 may generate a center pipe that is capable of connecting different size mounts for the traffic objects. For example, the connector component 130 may generate the center pipe in order to accommodate the traffic object with the largest vertical distance dimension. As such, the center pipe is also able to accommodate any traffic object that may include a vertical distance dimension that is smaller than the largest vertical distance dimension.

While these are just a few examples of connections that the connector component 130 may generate for traffic objects, in other examples, the connector component 130 may generate one or more additional and/or alternative types of connections for traffic objects. For example, the connector component 130 may generate connections one or more county, city, state, country, and/or so forth standards associated with the environment for which the traffic pole is located.

Referring back to the example of FIG. 1, the process 100 may include the structure component 124 outputting structure data 132 representing one or more associations between one or more traffic objects and one or more traffic poles and/or one or more structures generated by the structure component 124. For example, and for a structure, the structure data 132 may represent at least information associated with a traffic pole, information associated with one or more extenders of the traffic pole, information associated with one or more traffic objects, information associated with one or more connectors for the traffic object(s), and/or any other information that may be used to generate the structure.

As described herein, the information associated with the traffic pole may include, but is not limited to, an identifier of the traffic pole, dimensions of the traffic pole, a location of the traffic pole, and/or any other information. The information associated with an extender may include, but is not limited to, an identifier of the extender, dimensions of the extender, a location of the extender, an orientation of the extender, a shape of the extender (e.g., whether the extender includes an inflection and/or a location of an inflection point) and/or any other information. Additionally, the information associated with a traffic object may include, but is not limited to, an identifier of the traffic object, dimensions of the traffic object, a location of the traffic object, a type of connection (e.g., direct, indirect, etc.) associated with the traffic object, and/or any other information. Furthermore, the information associated with a connector may include, but is not limited to, an identifier of the connector, a type of connector (e.g., brackets, a pipe, etc.), dimensions of the connector, and/or any other information.

As described herein, an identifier associated with an object may include, but is not limited to, a name, a numerical identifier, an alphabetic identifier, an alphanumeric identifier, a string of numbers, letters, and/or characters, and/or any other type of identifier that may be used to identify the object. Additionally, dimensions associated with an object may include, but is not limited to, a first distance in a first direction (e.g., x-direction), a second distance in a second direction (e.g., y-direction), a third distance in a third direction (e.g., z-direction), one or more radiuses, and/or any other type of dimension. Furthermore, a location may include, but is not limited to, a one-dimensional location, a two-dimensional location, a three-dimensional location, and/or any other type of location.

In some examples, and as further illustrated by the example of FIG. 1, the process 100 may then include a map component 134 using the structure data 132 to update the map data 104 associated with the environment. For instance, and for a traffic pole, the map component 134 may update the map data 104 to indicate one or more associations between one or more traffic objects (e.g., one or more traffic signals, one or more traffic signs, etc.) and the traffic pole, the information associated with the traffic pole, information associated with one or more extenders of the traffic pole, the information associated with the traffic object(s), the information associated with the one or more connectors associated with the traffic pole, and/or a structure associated with the traffic pole. This way, and as described herein, the map data 104 may provide more information to vehicles that use the map data 104 to navigate around one or more environments.

Figure 12:
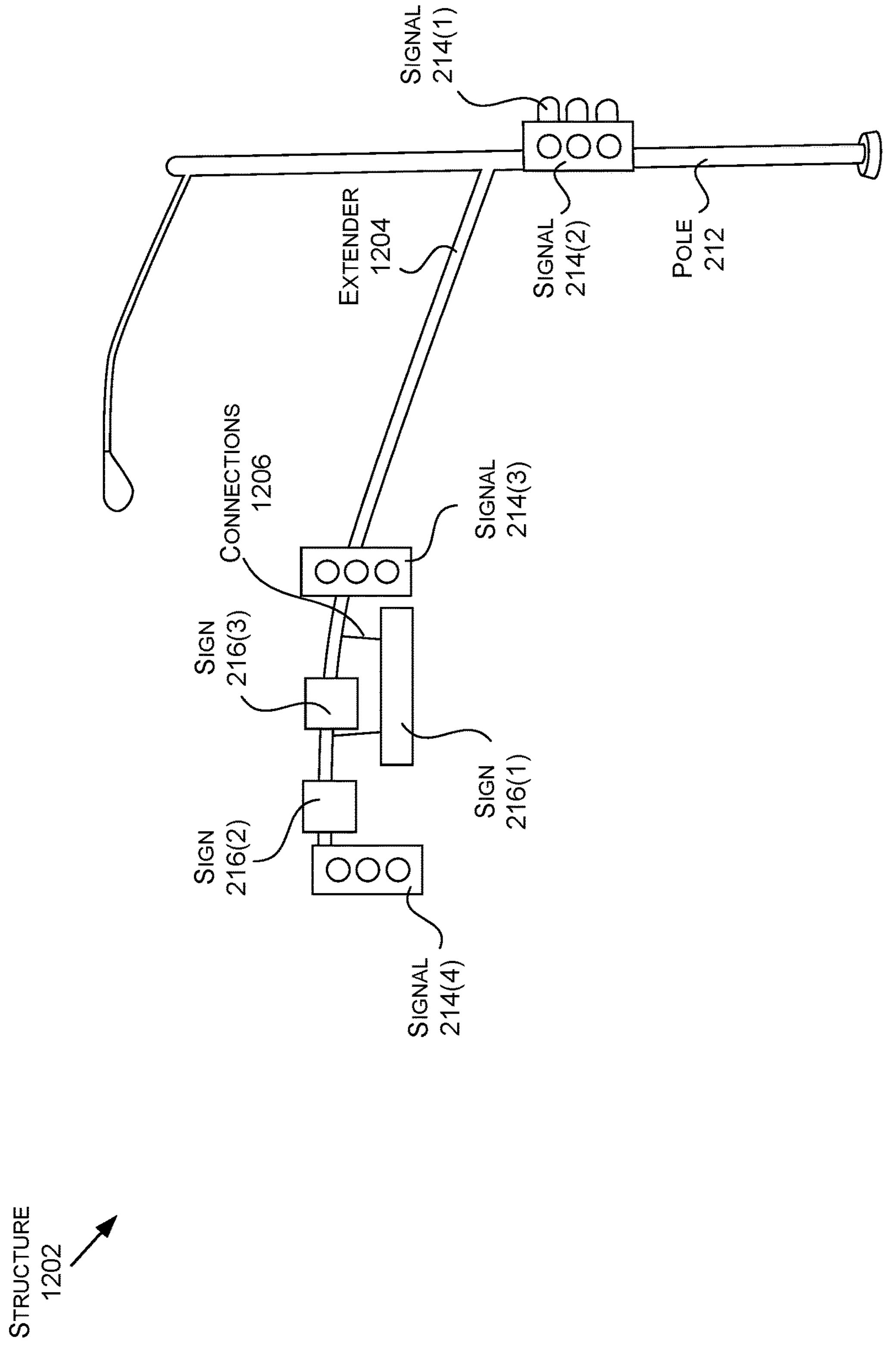
FIG. 12 illustrates an example of generating a structure associated with a traffic pole and traffic objects, in accordance with some embodiments of the present disclosure.

For instance, FIG. 12 illustrates an example of generating a structure 1202 associated with the traffic pole 212, the traffic signals 214(1)-(4), and the traffic signs 216(1)-(3), in accordance with some embodiments of the present disclosure. As shown, a map may be updated to represent the structure 1202 such that, in addition to the initial information provided by the map as represented in the example of FIG. 2B, the map also represents an extender 1204 along with connections 1206 (although only one is labeled for clarity reasons) for the traffic signals 214(1)-(4) and the traffic signs 216(1)-(3). As such, the updated map may better represent the environment 202.

While the examples herein display a single extender and a single mounting structure associated with traffic poles, in other examples, a traffic pole may include multiple extenders and/or multiple mounting structures. For a first example, a traffic pole may include multiple extenders (e.g., each similar to the extender 1204), where each extender includes a group of traffic objects (e.g., one traffic object, two traffic objects, five traffic objects, etc.). In such an example, a group of extenders associated with an extender may include a same direction, such as being associated with a same road within an environment. For a second example, a traffic pole may include multiple mounting structures (e.g., vertical pipe mounts similar to the examples of FIGS. 11A-11B), where each mounting structure includes a group of traffic objects (e.g., one traffic object, two traffic objects, five traffic objects, etc.). In such an example, the mounting structures may be mounted at different heights along the traffic pole.

Figure 13:
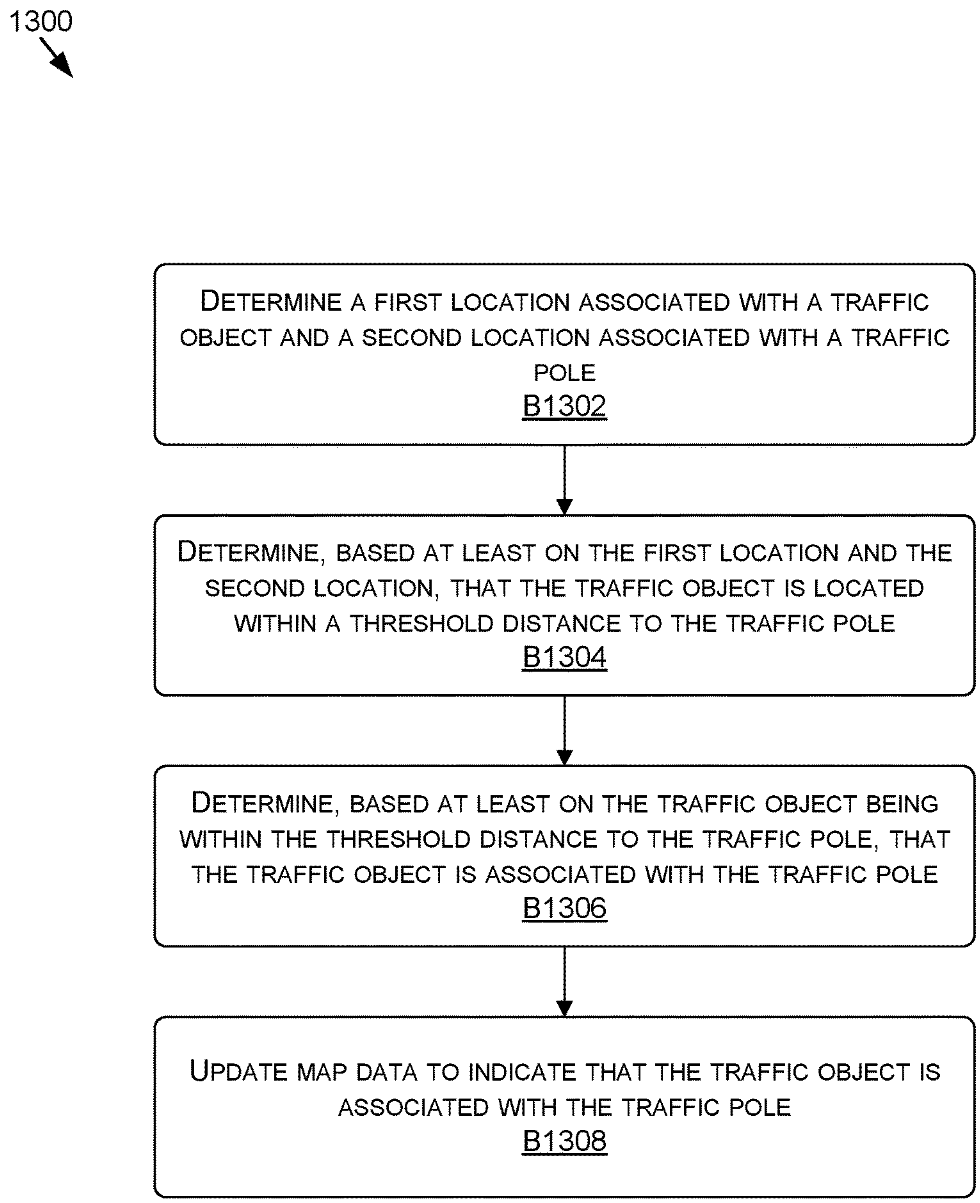
FIG. 13 illustrates a flow diagram showing a method for associating a traffic object with a traffic pole, in accordance with some embodiments of the present disclosure.
Figure 14:
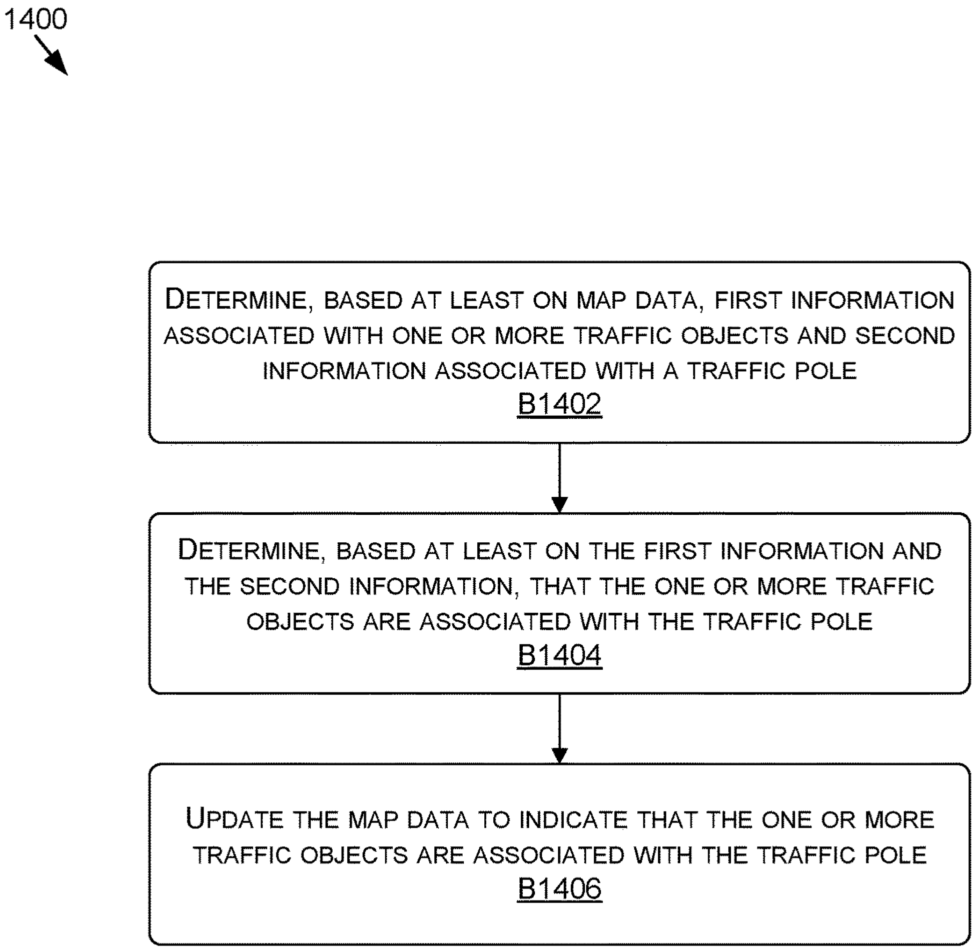
FIG. 14 illustrates a flow diagram showing a method for updating a map to indicate one or more associations between one or more traffic objects and a traffic pole, in accordance with some embodiments of the present disclosure.
Figure 15:
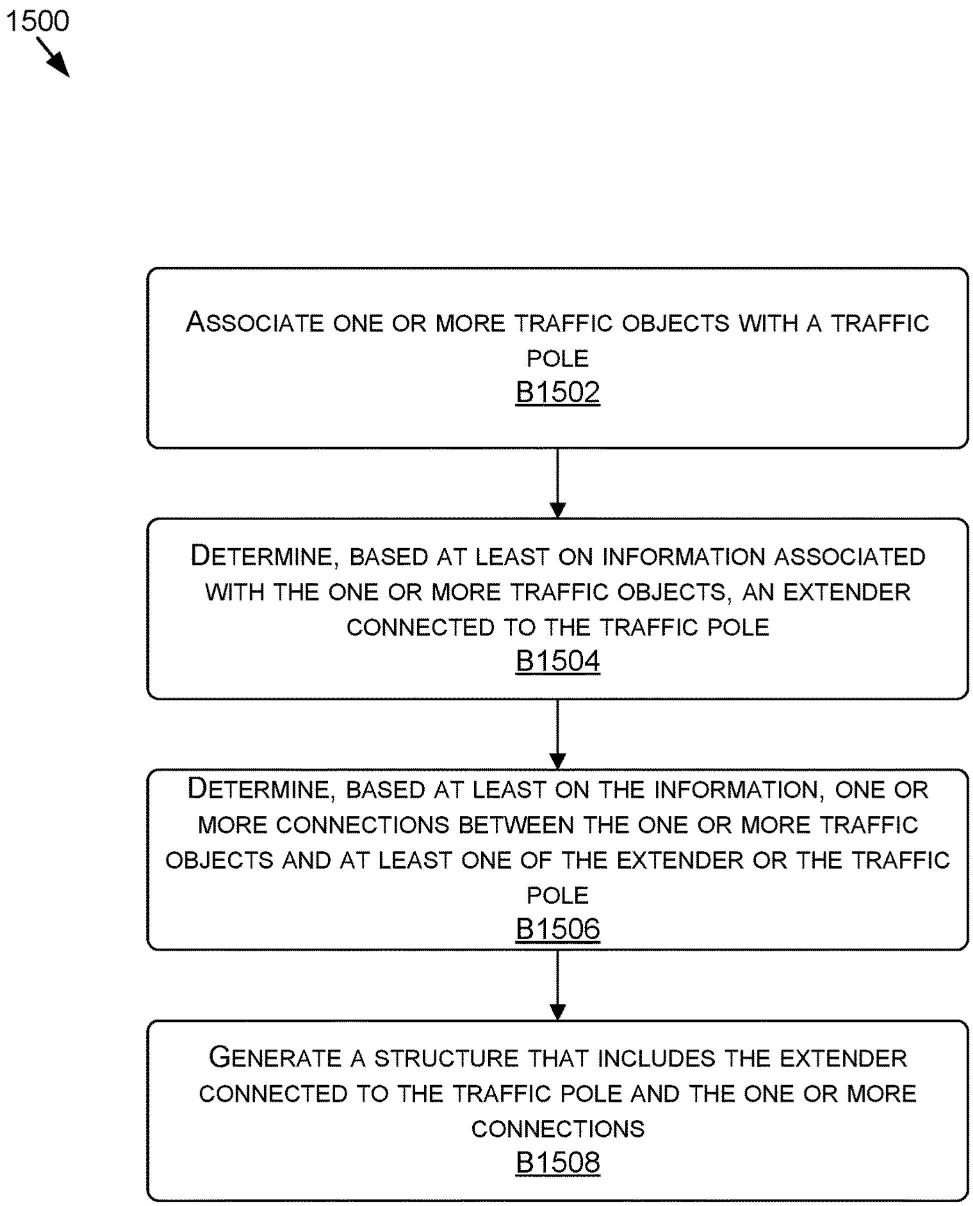
FIG. 15 illustrates a flow diagram showing a method for generating a structure indicating one or more connections between one or more traffic objects and a traffic pole, in accordance with some embodiments of the present disclosure.

Now referring to FIGS. 13-15, each block of methods, 1300, 1400, and 1500, described herein, comprises a computing process that may be performed using any combination of hardware, firmware, and/or software. For instance, various functions may be carried out by a processor executing instructions stored in memory. The methods 1300, 1400, and 1500 may also be embodied as computer-usable instructions stored on computer storage media. The methods 1300, 1400, and 1500 may be provided by a standalone application, a service or hosted service (standalone or in combination with another hosted service), or a plug-in to another product, to name a few. In addition, the methods 1300, 1400, and 1500 are described, by way of example, with respect to FIG. 1. However, these methods 1300, 1400, and 1500 may additionally or alternatively be executed by any one system, or any combination of systems, including, but not limited to, those described herein.

FIG. 13 illustrates a flow diagram showing a method 1300 for associating a traffic object with a traffic pole, in accordance with some embodiments of the present disclosure. The method 1300, at block B1302, may include determining a first location associated with a traffic object and a second location associated with a traffic pole. For instance, the association component 102 may determine the first location associated with the traffic object and the second location associated with the traffic pole. In some examples, the association component 102 determines the first location and/or the second location using the map data 104. As described herein, the traffic object may include, but is not limited to, a traffic signal, a traffic sign, a traffic control (e.g., a button for controlling a crosswalk), and/or any other type of object that may be connected, either directly or indirectly, to the traffic pole.

The method 1300, at block B1304, may include determining, based at least on the first location and the second location, that the traffic object is located within a threshold distance to the traffic pole. For instance, the association component 102 (e.g., the pole component 116) may use the first location and the second location to determine that the traffic object is located within the threshold distance 118 to the traffic pole. As described herein, in some examples, the association component 102 may determine the threshold distance 118 as including a set distance. In some examples, the association component 102 may determine the threshold distance 118 based at least on a number of lanes, a width of the lanes, a type of road (e.g., rural, highway, etc.), and/or using any other factors. Still, in some examples, the association component 102 may use more than one threshold distance 118 to determine whether the traffic object includes a direct connection or an indirect connection with the traffic pole.

The method 1300, at block B1306, may include determining, based at least on the traffic object being within the threshold distance to the traffic pole, that the traffic object is associated with the traffic pole. For instance, the association component 102 (e.g., the pole component 116) may determine that the traffic object is connected to the traffic pole based at least on the traffic object being within the threshold distance 118 to the traffic pole. In some examples, the association component 102 may use additional information to make the determination, such as the orientation of the traffic object, a direction at which the traffic pole is located with respect to the traffic object, and/or so forth. Additionally, in some examples, the association component 102 may use the association between the traffic object and the traffic pole to determine one or more additional associations between one or more additional traffic objects and the traffic pole.

The method 1300, at block B1308, may include updating map data to indicate that the traffic object is associated with the traffic pole. For instance, the map component 134 may update the map data 104 to indicate that the traffic object is associated with the traffic pole. In some examples, the map component 134 may further update the map data 104 to indicate a structure that includes the traffic object connected to the traffic pole.

FIG. 14 illustrates a flow diagram showing a method 1400 for updating a map to indicate one or more associations between one or more traffic objects and a traffic pole, in accordance with some embodiments of the present disclosure. The method 1400, at block B1402, may include determining, based at least on map data, first information associated with one or more traffic objects and second information associated with a traffic pole. For instance, the association component 102 may use the map data 104 to determine the first information associated with the traffic object(s) and the second information associated with the traffic pole. As described herein, the first information may indicate at least the pose(s) of the traffic object(s), where a pose indicates at least a location and/or orientation of a traffic object. Additionally, the second information may indicate the pose associated with the traffic pole.

The method 1400, at block B1404, may include determining, based at least on the first information and the second information, that the one or more traffic objects are associated with the traffic pole. For instance, the association component 102 (e.g., the signal component 112, the sign component 120, etc.) may determine that the traffic object(s) is associated with one another using the first information. The association component 102 (e.g., the pole component 116) may then determine that the traffic object(s) is associated with the traffic pole using the first information and the second information. In some examples, the association component 102 may make the determination based at least on one of the traffic object(s) being within a threshold distance 118 to the traffic pole.

The method 1400, at block B1406, may include updating the map data to indicate that the one or more traffic objects are associated with the traffic pole. For instance, the map component 134 may update the map data 104 to indicate that the traffic object(s) is associated with the traffic pole. In some examples, the map component 134 may further update the map data 104 to indicate a structure that includes the traffic object(s) connected to the traffic pole.

FIG. 15 illustrates a flow diagram showing a method 1500 for generating a structure indicating one or more connections between one or more traffic objects and a traffic pole, in accordance with some embodiments of the present disclosure. The method 1500, at block B1502, may include associating one or more traffic objects with a traffic pole. For instance, the association component 102 (e.g., the pole component 116) may associate the traffic object(s) with the traffic pole, such as by using one or more of the techniques described herein. For example, the association component 102 (e.g., the signal component 112, the sign component 120, etc.) may determine that the traffic object(s) is associated with one another. The association component 102 (e.g., the pole component 116) may then determine that the traffic object(s) is associated with the traffic pole. In some examples, the association component 102 may make the determination based at least on one of the traffic object(s) being within a threshold distance 118 to the traffic pole.

The method 1500, at block B1504, may include determining, based at least on information associated with the one or more traffic objects, an extender connected to the traffic pole. For instance, the structure component 124 (e.g., the arm component 126) may use the information associated with the traffic object(s), which may be represented by the signal data 106 and/or the sign data 110, to determine the geometry of the structure that is connected to the traffic pole. For example, the structure component 124 may determine an initial extender using the pose(s) associated with the traffic object(s). The structure component 124 may then use the initial structure, along with the configuration data 128 representing one or more values for one or more parameters associated with the extender, to determine the geometry of the extender.

The method 1500, at block B1506, may include determining, based at least on the information, one or more connections between the one or more traffic objects and at least one of the extender or the traffic pole. For instance, and for a traffic object, the structure component 124 (e.g., the connector component 130) may use the information to determine a type of connection, such as whether the traffic object includes a direct connection with the traffic pole or an indirect connection with the extender. Additionally, the structure component 124 may use the configuration data 128 to determine one or more values associated with one or more parameters of the connection. The structure component 124 may then use the type of connection, the type of object (e.g., traffic signal, traffic sign, etc.), and/or the value(s) to determine the connection between the traffic object and the extender and/or the traffic pole. Additionally, the structure component 124 may perform similar processes for each of the other traffic object(s).

The method 1500, at block B1508, may include generating a structure that includes the extender connected to the traffic pole and the one or more connections. For instance, the structure component 124 may generate the structure data 132 representing the structure that includes the extender connected to the traffic pole and the connection(s) between the traffic object(s) and the extender and/or the traffic pole. In some examples, the map component 134 may then use the structure data 132 to update the map data 104 in order to represent the structure.

Example Autonomous Vehicle

Figure 16A:
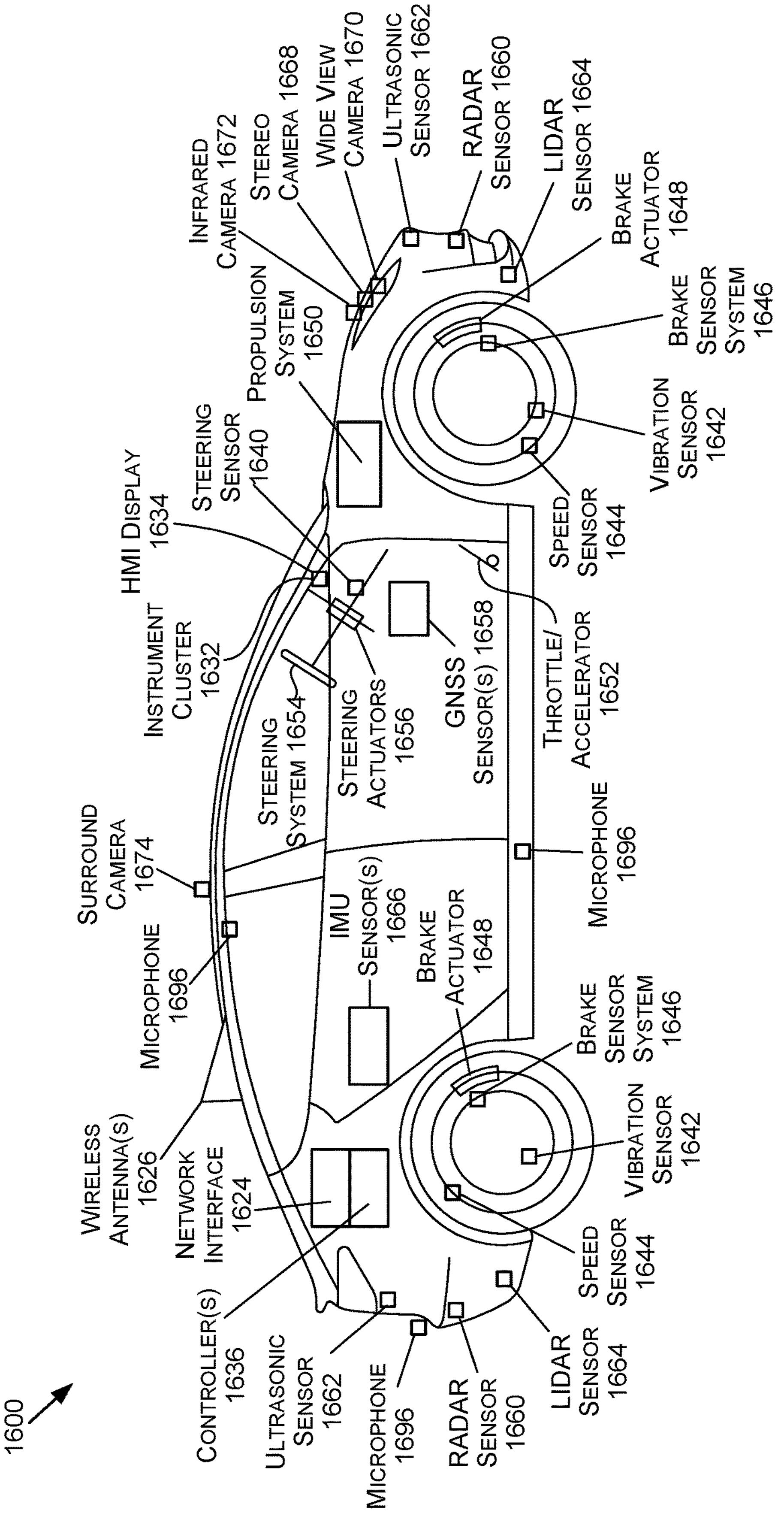
FIG. 16A is an illustration of an example autonomous vehicle, in accordance with some embodiments of the present disclosure.

FIG. 16A is an illustration of an example autonomous vehicle 1600, in accordance with some embodiments of the present disclosure. The autonomous vehicle 1600 (alternatively referred to herein as the "vehicle 1600") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1600 may be capable of functionality in accordance with one or more of Level 3-Level 5 of the autonomous driving levels. The vehicle 1600 may be capable of functionality in accordance with one or more of Level 1-Level 5 of the autonomous driving levels. For example, the vehicle 1600 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1600 or other machine, such as being fully autonomous, being highly autonomous, being conditionally autonomous, being partially autonomous, providing assistive autonomy, being semi-autonomous, being primarily autonomous, or other designation.

The vehicle 1600 may include components such as a chassis, a vehicle body, wheels (e.g., 2, 4, 6, 8, 18, etc.), tires, axles, and other components of a vehicle. The vehicle 1600 may include a propulsion system 1650, such as an internal combustion engine, hybrid electric power plant, an all-electric engine, and/or another propulsion system type. The propulsion system 1650 may be connected to a drive train of the vehicle 1600, which may include a transmission, to enable the propulsion of the vehicle 1600. The propulsion system 1650 may be controlled in response to receiving signals from the throttle/accelerator 1652.

A steering system 1654, which may include a steering wheel, may be used to steer the vehicle 1600 (e.g., along a desired path or route) when the propulsion system 1650 is operating (e.g., when the vehicle is in motion). The steering system 1654 may receive signals from a steering actuator 1656. The steering wheel may be optional for full automation (Level 5) functionality.

The brake sensor system 1646 may be used to operate the vehicle brakes in response to receiving signals from the brake actuators 1648 and/or brake sensors.

Controller(s) 1636, which may include one or more system on chips (SoCs) 1604 (FIG. 16C) and/or GPU(s), may provide signals (e.g., representative of commands) to one or more components and/or systems of the vehicle 1600. For example, the controller(s) may send signals to operate the vehicle brakes via one or more brake actuators 1648, to operate the steering system 1654 via one or more steering actuators 1656, to operate the propulsion system 1650 via one or more throttle/accelerators 1652. The controller(s) 1636 may include one or more onboard (e.g., integrated) computing devices (e.g., supercomputers) that process sensor signals, and output operation commands (e.g., signals representing commands) to enable autonomous driving and/or to assist a human driver in driving the vehicle 1600. The controller(s) 1636 may include a first controller 1636 for autonomous driving functions, a second controller 1636 for functional safety functions, a third controller 1636 for artificial intelligence functionality (e.g., computer vision), a fourth controller 1636 for infotainment functionality, a fifth controller 1636 for redundancy in emergency conditions, and/or other controllers. In some examples, a single controller 1636 may handle two or more of the above functionalities, two or more controllers 1636 may handle a single functionality, and/or any combination thereof.

The controller(s) 1636 may provide the signals for controlling one or more components and/or systems of the vehicle 1600 in response to sensor data received from one or more sensors (e.g., sensor inputs). The sensor data may be received from, for example and without limitation, global navigation satellite systems ("GNSS") sensor(s) 1658 (e.g., Global Positioning System sensor(s)), RADAR sensor(s) 1660, ultrasonic sensor(s) 1662, LIDAR sensor(s) 1664, inertial measurement unit (IMU) sensor(s) 1666 (e.g., accelerometer(s), gyroscope(s), magnetic compass(es), magnetometer(s), etc.), microphone(s) 1696, stereo camera(s) 1668, wide-view camera(s) 1670 (e.g., fisheye cameras), infrared camera(s) 1672, surround camera(s) 1674 (e.g., 360 degree cameras), long-range and/or mid-range camera(s) 1698, speed sensor(s) 1644 (e.g., for measuring the speed of the vehicle 1600), vibration sensor(s) 1642, steering sensor(s) 1640, brake sensor(s) (e.g., as part of the brake sensor system 1646), and/or other sensor types.

One or more of the controller(s) 1636 may receive inputs (e.g., represented by input data) from an instrument cluster 1632 of the vehicle 1600 and provide outputs (e.g., represented by output data, display data, etc.) via a human-machine interface (HMI) display 1634, an audible annunciator, a loudspeaker, and/or via other components of the vehicle 1600. The outputs may include information such as vehicle velocity, speed, time, map data (e.g., the High Definition ("HD") map 1622 of FIG. 16C), location data (e.g., the vehicle's 1600 location, such as on a map), direction, location of other vehicles (e.g., an occupancy grid), information about objects and status of objects as perceived by the controller(s) 1636, etc. For example, the HMI display 1634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1600 further includes a network interface 1624 which may use one or more wireless antenna(s) 1626 and/or modem(s) to communicate over one or more networks. For example, the network interface 1624 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1626 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 16B:
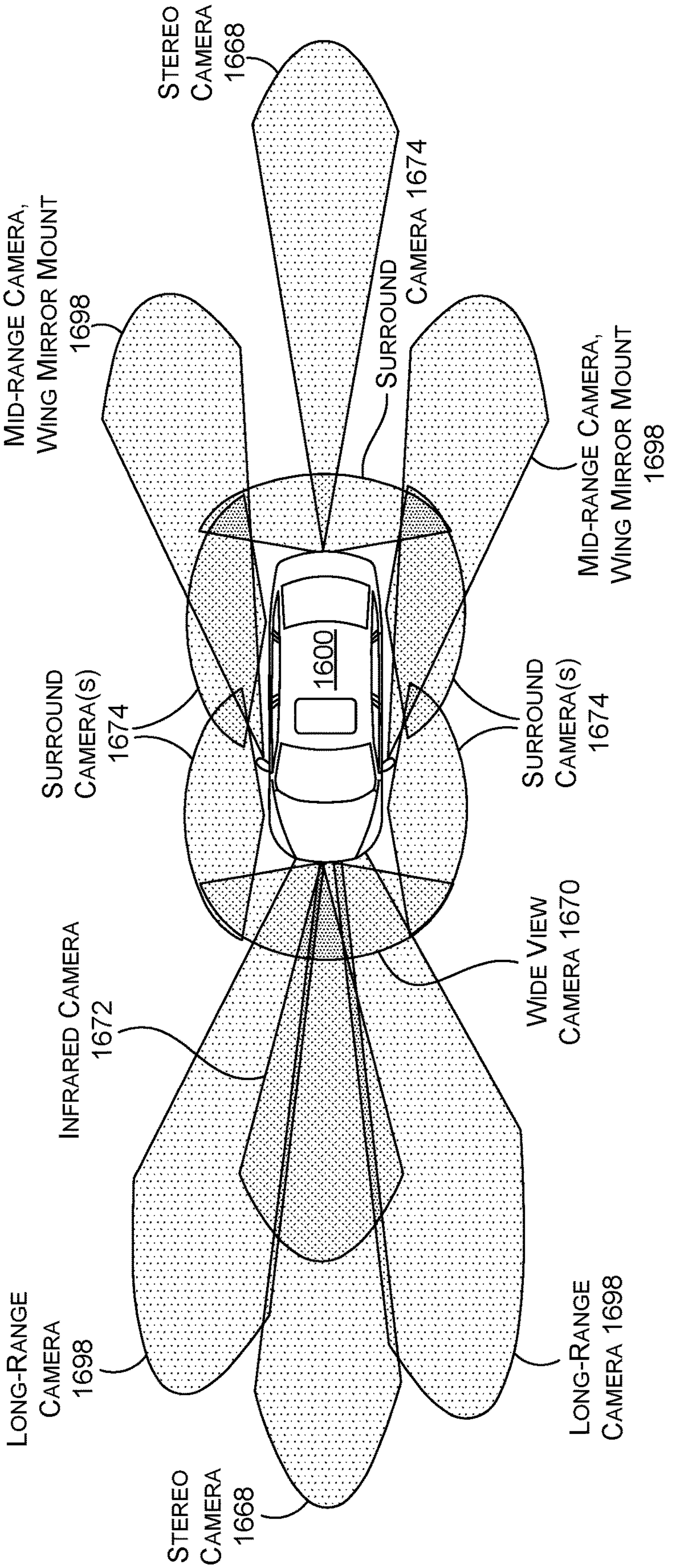
FIG. 16B is an example of camera locations and fields of view for the example autonomous vehicle of FIG. 16A, in accordance with some embodiments of the present disclosure.

FIG. 16B is an example of camera locations and fields of view for the example autonomous vehicle 1600 of FIG. 16A, in accordance with some embodiments of the present disclosure. The cameras and respective fields of view are one example embodiment and are not intended to be limiting. For example, additional and/or alternative cameras may be included and/or the cameras may be located at different locations on the vehicle 1600.

The camera types for the cameras may include, but are not limited to, digital cameras that may be adapted for use with the components and/or systems of the vehicle 1600. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1600 (e.g., front-facing cameras) may be used for surround view, to help identify forward facing paths and obstacles, as well aid in, with the help of one or more controllers 1636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1670 that may be used to perceive objects coming into view from the periphery (e.g., pedestrians, crossing traffic or bicycles). Although only one wide-view camera is illustrated in FIG. 16B, there may be any number (including zero) of wide-view cameras 1670 on the vehicle 1600. In addition, any number of long-range camera(s) 1698 (e.g., a long-view stereo camera pair) may be used for depth-based object detection, especially for objects for which a neural network has not yet been trained. The long-range camera(s) 1698 may also be used for object detection and classification, as well as basic object tracking.

Any number of stereo cameras 1668 may also be included in a front-facing configuration. In at least one embodiment, one or more of stereo camera(s) 1668 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1668 may be used in addition to, or alternatively from, those described herein.

Cameras with a field of view that include portions of the environment to the side of the vehicle 1600 (e.g., side-view cameras) may be used for surround view, providing information used to create and update the occupancy grid, as well as to generate side impact collision warnings. For example, surround camera(s) 1674 (e.g., four surround cameras 1674 as illustrated in FIG. 16B) may be positioned to on the vehicle 1600. The surround camera(s) 1674 may include wide-view camera(s) 1670, fisheye camera(s), 360 degree camera(s), and/or the like. Four example, four fisheye cameras may be positioned on the vehicle's front, rear, and sides. In an alternative arrangement, the vehicle may use three surround camera(s) 1674 (e.g., left, right, and rear), and may leverage one or more other camera(s) (e.g., a forward-facing camera) as a fourth surround view camera.

Cameras with a field of view that include portions of the environment to the rear of the vehicle 1600 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1698, stereo camera(s) 1668), infrared camera(s) 1672, etc.), as described herein.

Figure 16C:
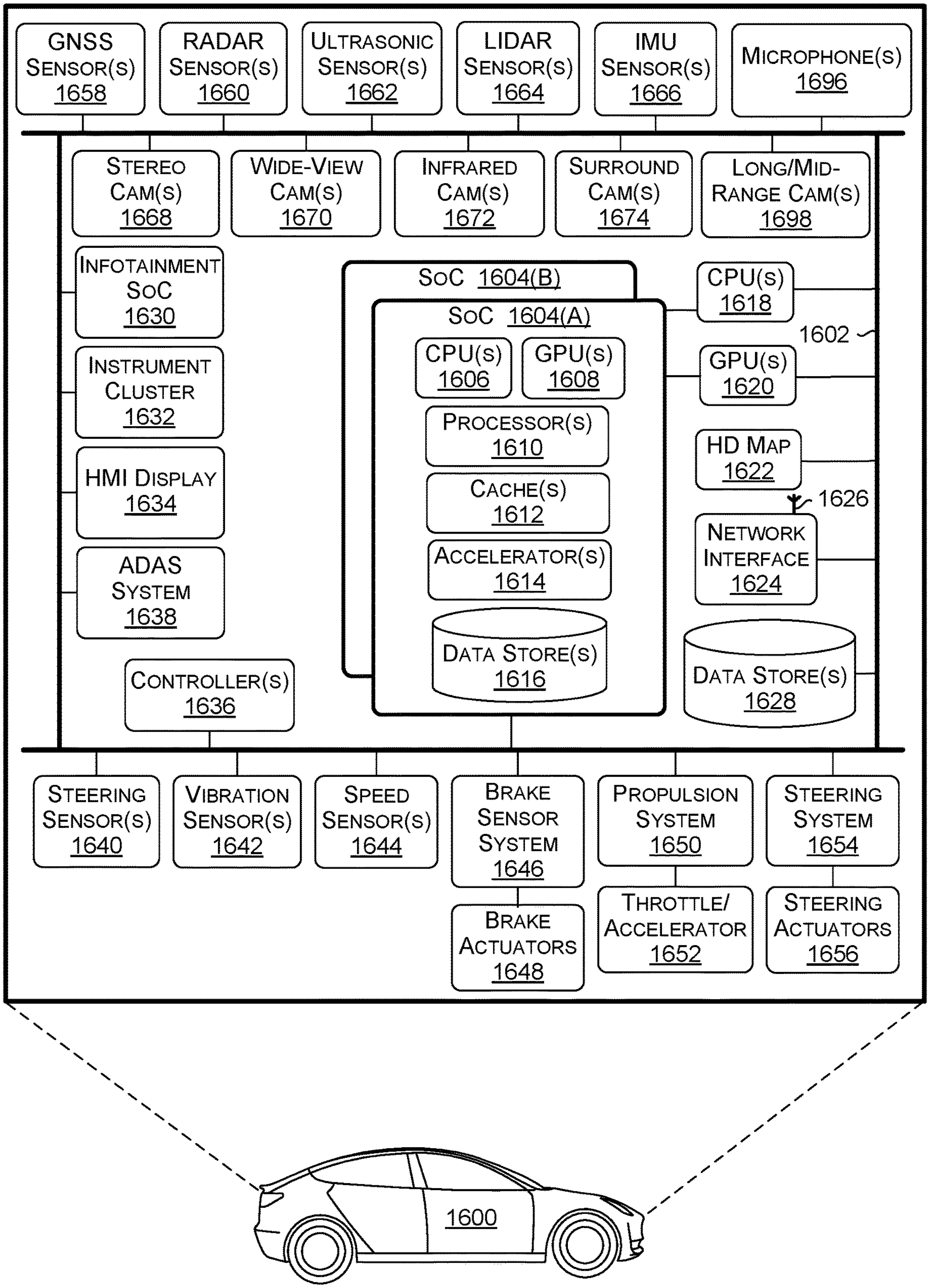
FIG. 16C is a block diagram of an example system architecture for the example autonomous vehicle of FIG. 16A, in accordance with some embodiments of the present disclosure.

FIG. 16C is a block diagram of an example system architecture for the example autonomous vehicle 1600 of FIG. 16A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1600 in FIG. 16C are illustrated as being connected via bus 1602. The bus 1602 may include a Controller Area Network (CAN) data interface (alternatively referred to herein as a "CAN bus"). A CAN may be a network inside the vehicle 1600 used to aid in control of various features and functionality of the vehicle 1600, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1602 is described herein as being a CAN bus, this is not intended to be limiting. For example, in addition to, or alternatively from, the CAN bus, FlexRay and/or Ethernet may be used. Additionally, although a single line is used to represent the bus 1602, this is not intended to be limiting. For example, there may be any number of busses 1602, which may include one or more CAN busses, one or more FlexRay busses, one or more Ethernet busses, and/or one or more other types of busses using a different protocol. In some examples, two or more busses 1602 may be used to perform different functions, and/or may be used for redundancy. For example, a first bus 1602 may be used for collision avoidance functionality and a second bus 1602 may be used for actuation control. In any example, each bus 1602 may communicate with any of the components of the vehicle 1600, and two or more busses 1602 may communicate with the same components. In some examples, each SoC 1604, each controller 1636, and/or each computer within the vehicle may have access to the same input data (e.g., inputs from sensors of the vehicle 1600), and may be connected to a common bus, such the CAN bus.

The vehicle 1600 may include one or more controller(s) 1636, such as those described herein with respect to FIG. 16A. The controller(s) 1636 may be used for a variety of functions. The controller(s) 1636 may be coupled to any of the various other components and systems of the vehicle 1600, and may be used for control of the vehicle 1600, artificial intelligence of the vehicle 1600, infotainment for the vehicle 1600, and/or the like.

The vehicle 1600 may include a system(s) on a chip (SoC) 1604. The SoC 1604 may include CPU(s) 1606, GPU(s) 1608, processor(s) 1610, cache(s) 1612, accelerator(s) 1614, data store(s) 1616, and/or other components and features not illustrated. The SoC(s) 1604 may be used to control the vehicle 1600 in a variety of platforms and systems. For example, the SoC(s) 1604 may be combined in a system (e.g., the system of the vehicle 1600) with an HD map 1622 which may obtain map refreshes and/or updates via a network interface 1624 from one or more servers (e.g., server(s) 1678 of FIG. 16D).

The CPU(s) 1606 may include a CPU cluster or CPU complex (alternatively referred to herein as a "CCPLEX"). The CPU(s) 1606 may include multiple cores and/or L2 caches. For example, in some embodiments, the CPU(s) 1606 may include eight cores in a coherent multi-processor configuration. In some embodiments, the CPU(s) 1606 may include four dual-core clusters where each cluster has a dedicated L2 cache (e.g., a 2 MB L2 cache). The CPU(s) 1606 (e.g., the CCPLEX) may be configured to support simultaneous cluster operation enabling any combination of the clusters of the CPU(s) 1606 to be active at any given time.

The CPU(s) 1606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1608 may include an integrated GPU (alternatively referred to herein as an "iGPU"). The GPU(s) 1608 may be programmable and may be efficient for parallel workloads. The GPU(s) 1608, in some examples, may use an enhanced tensor instruction set. The GPU(s) 1608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1608 may include at least eight streaming microprocessors. The GPU(s) 1608 may use compute application programming interface(s) (API(s)). In addition, the GPU(s) 1608 may use one or more parallel computing platforms and/or programming models (e.g., NVIDIA's CUDA).

The GPU(s) 1608 may be power-optimized for best performance in automotive and embedded use cases. For example, the GPU(s) 1608 may be fabricated on a Fin field-effect transistor (FinFET). However, this is not intended to be limiting and the GPU(s) 1608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1608 to access the CPU(s) 1606 page tables directly. In such examples, when the GPU(s) 1608 memory management unit (MMU) experiences a miss, an address translation request may be transmitted to the CPU(s) 1606. In response, the CPU(s) 1606 may look in its page tables for the virtual-to-physical mapping for the address and transmits the translation back to the GPU(s) 1608. As such, unified memory technology may allow a single unified virtual address space for memory of both the CPU(s) 1606 and the GPU(s) 1608, thereby simplifying the GPU(s) 1608 programming and porting of applications to the GPU(s) 1608.

In addition, the GPU(s) 1608 may include an access counter that may keep track of the frequency of access of the GPU(s) 1608 to memory of other processors. The access counter may help ensure that memory pages are moved to the physical memory of the processor that is accessing the pages most frequently.

The SoC(s) 1604 may include any number of cache(s) 1612, including those described herein. For example, the cache(s) 1612 may include an L3 cache that is available to both the CPU(s) 1606 and the GPU(s) 1608 (e.g., that is connected both the CPU(s) 1606 and the GPU(s) 1608). The cache(s) 1612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1604 may include an arithmetic logic unit(s) (ALU(s)) which may be leveraged in performing processing with respect to any of the variety of tasks or operations of the vehicle 1600—such as processing DNNs. In addition, the SoC(s) 1604 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1606 and/or GPU(s) 1608.

The SoC(s) 1604 may include one or more accelerators 1614 (e.g., hardware accelerators, software accelerators, or a combination thereof). For example, the SoC(s) 1604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1608 and to off-load some of the tasks of the GPU(s) 1608 (e.g., to free up more cycles of the GPU(s) 1608 for performing other tasks). As an example, the accelerator(s) 1614 may be used for targeted workloads (e.g., perception, convolutional neural networks (CNNs), etc.) that are stable enough to be amenable to acceleration. The term “CNN,” as used herein, may include all types of CNNs, including region-based or regional convolutional neural networks (RCNNs) and Fast RCNNs (e.g., as used for object detection).

The accelerator(s) 1614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1608, and by using an inference accelerator, for example, a designer may target either the DLA(s) or the GPU(s) 1608 for any function. For example, the designer may focus processing of CNNs and floating point operations on the DLA(s) and leave other functions to the GPU(s) 1608 and/or other accelerator(s) 1614.

The accelerator(s) 1614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1614 (e.g., the hardware acceleration cluster) may include a computer vision network on-chip and SRAM, for providing a high-bandwidth, low latency SRAM for the accelerator(s) 1614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1666 output that correlates with the vehicle 1600 orientation, distance, 3D location estimates of the object obtained from the neural network and/or other sensors (e.g., LIDAR sensor(s) 1664 or RADAR sensor(s) 1660), among others.

The SoC(s) 1604 may include data store(s) 1616 (e.g., memory). The data store(s) 1616 may be on-chip memory of the SoC(s) 1604, which may store neural networks to be executed on the GPU and/or the DLA. In some examples, the data store(s) 1616 may be large enough in capacity to store multiple instances of neural networks for redundancy and safety. The data store(s) 1612 may comprise L2 or L3 cache(s) 1612. Reference to the data store(s) 1616 may include reference to the memory associated with the PVA, DLA, and/or other accelerator(s) 1614, as described herein.

The SoC(s) 1604 may include one or more processor(s) 1610 (e.g., embedded processors). The processor(s) 1610 may include a boot and power management processor that may be a dedicated processor and subsystem to handle boot power and management functions and related security enforcement. The boot and power management processor may be a part of the SoC(s) 1604 boot sequence and may provide runtime power management services. The boot power and management processor may provide clock and voltage programming, assistance in system low power state transitions, management of SoC(s) 1604 thermals and temperature sensors, and/or management of the SoC(s) 1604 power states. Each temperature sensor may be implemented as a ring-oscillator whose output frequency is proportional to temperature, and the SoC(s) 1604 may use the ring-oscillators to detect temperatures of the CPU(s) 1606, GPU(s) 1608, and/or accelerator(s) 1614. If temperatures are determined to exceed a threshold, the boot and power management processor may enter a temperature fault routine and put the SoC(s) 1604 into a lower power state and/or put the vehicle 1600 into a chauffeur to safe stop mode (e.g., bring the vehicle 1600 to a safe stop).

The processor(s) 1610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1610 may further include a real-time camera engine that may include a dedicated processor subsystem for handling real-time camera management.

The processor(s) 1610 may further include a high-dynamic range signal processor that may include an image signal processor that is a hardware engine that is part of the camera processing pipeline.

The processor(s) 1610 may include a video image compositor that may be a processing block (e.g., implemented on a microprocessor) that implements video post-processing functions needed by a video playback application to produce the final image for the player window. The video image compositor may perform lens distortion correction on wide-view camera(s) 1670, surround camera(s) 1674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1608 is not required to continuously render new surfaces. Even when the GPU(s) 1608 is powered on and active doing 3D rendering, the video image compositor may be used to offload the GPU(s) 1608 to improve performance and responsiveness.

The SoC(s) 1604 may further include a mobile industry processor interface (MIPI) camera serial interface for receiving video and input from cameras, a high-speed interface, and/or a video input block that may be used for camera and related pixel input functions. The SoC(s) 1604 may further include an input/output controller(s) that may be controlled by software and may be used for receiving I/O signals that are uncommitted to a specific role.

The SoC(s) 1604 may further include a broad range of peripheral interfaces to enable communication with peripherals, audio codecs, power management, and/or other devices. The SoC(s) 1604 may be used to process data from cameras (e.g., connected over Gigabit Multimedia Serial Link and Ethernet), sensors (e.g., LIDAR sensor(s) 1664, RADAR sensor(s) 1660, etc. that may be connected over Ethernet), data from bus 1602 (e.g., speed of vehicle 1600, steering wheel position, etc.), data from GNSS sensor(s) 1658 (e.g., connected over Ethernet or CAN bus). The SoC(s) 1604 may further include dedicated high-performance mass storage controllers that may include their own DMA engines, and that may be used to free the CPU(s) 1606 from routine data management tasks.

The SoC(s) 1604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1604 may be faster, more reliable, and even more energy-efficient and space-efficient than conventional systems. For example, the accelerator(s) 1614, when combined with the CPU(s) 1606, the GPU(s) 1608, and the data store(s) 1616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1608.

In some examples, a CNN for facial recognition and vehicle owner identification may use data from camera sensors to identify the presence of an authorized driver and/or owner of the vehicle 1600. The always on sensor processing engine may be used to unlock the vehicle when the owner approaches the driver door and turn on the lights, and, in security mode, to disable the vehicle when the owner leaves the vehicle. In this way, the SoC(s) 1604 provide for security against theft and/or carjacking.

In another example, a CNN for emergency vehicle detection and identification may use data from microphones 1696 to detect and identify emergency vehicle sirens. In contrast to conventional systems, that use general classifiers to detect sirens and manually extract features, the SoC(s) 1604 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1662, until the emergency vehicle(s) passes.

The vehicle may include a CPU(s) 1618 (e.g., discrete CPU(s), or dCPU(s)), that may be coupled to the SoC(s) 1604 via a high-speed interconnect (e.g., PCIe). The CPU(s) 1618 may include an X86 processor, for example. The CPU(s) 1618 may be used to perform any of a variety of functions, including arbitrating potentially inconsistent results between ADAS sensors and the SoC(s) 1604, and/or monitoring the status and health of the controller(s) 1636 and/or infotainment SoC 1630, for example.

The vehicle 1600 may include a GPU(s) 1620 (e.g., discrete GPU(s), or dGPU(s)), that may be coupled to the SoC(s) 1604 via a high-speed interconnect (e.g., NVIDIA's NVLINK). The GPU(s) 1620 may provide additional artificial intelligence functionality, such as by executing redundant and/or different neural networks, and may be used to train and/or update neural networks based on input (e.g., sensor data) from sensors of the vehicle 1600.

The vehicle 1600 may further include the network interface 1624 which may include one or more wireless antennas 1626 (e.g., one or more wireless antennas for different communication protocols, such as a cellular antenna, a Bluetooth antenna, etc.). The network interface 1624 may be used to enable wireless connectivity over the Internet with the cloud (e.g., with the server(s) 1678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1600 information about vehicles in proximity to the vehicle 1600 (e.g., vehicles in front of, on the side of, and/or behind the vehicle 1600). This functionality may be part of a cooperative adaptive cruise control functionality of the vehicle 1600.

The network interface 1624 may include a SoC that provides modulation and demodulation functionality and enables the controller(s) 1636 to communicate over wireless networks. The network interface 1624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1600 may further include data store(s) 1628 which may include off-chip (e.g., off the SoC(s) 1604)

storage. The data store(s) 1628 may include one or more storage elements including RAM, SRAM, DRAM, VRAM, Flash, hard disks, and/or other components and/or devices that may store at least one bit of data.

The vehicle 1600 may further include GNSS sensor(s) 1658. The GNSS sensor(s) 1658 (e.g., GPS, assisted GPS sensors, differential GPS (DGPS) sensors, etc.), to assist in mapping, perception, occupancy grid generation, and/or path planning functions. Any number of GNSS sensor(s) 1658 may be used, including, for example and without limitation, a GPS using a USB connector with an Ethernet to Serial (RS-232) bridge.

The vehicle 1600 may further include RADAR sensor(s) 1660. The RADAR sensor(s) 1660 may be used by the vehicle 1600 for long-range vehicle detection, even in darkness and/or severe weather conditions. RADAR functional safety levels may be ASIL B. The RADAR sensor(s) 1660 may use the CAN and/or the bus 1602 (e.g., to transmit data generated by the RADAR sensor(s) 1660) for control and to access object tracking data, with access to Ethernet to access raw data in some examples. A wide variety of RADAR sensor types may be used. For example, and without limitation, the RADAR sensor(s) 1660 may be suitable for front, rear, and side RADAR use. In some example, Pulse Doppler RADAR sensor(s) are used.

The RADAR sensor(s) 1660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1600 surroundings at higher speeds with minimal interference from traffic in adjacent lanes. The other two antennae may expand the field of view, making it possible to quickly detect vehicles entering or leaving the vehicle's 1600 lane.

Mid-range RADAR systems may include, as an example, a range of up to 1660 m (front) or 80 m (rear), and a field of view of up to 42 degrees (front) or 1650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1600 may further include ultrasonic sensor(s) 1662. The ultrasonic sensor(s) 1662, which may be positioned at the front, back, and/or the sides of the vehicle 1600, may be used for park assist and/or to create and update an occupancy grid. A wide variety of ultrasonic sensor(s) 1662 may be used, and different ultrasonic sensor(s) 1662 may be used for different ranges of detection (e.g., 2.5 m, 4 m). The ultrasonic sensor(s) 1662 may operate at functional safety levels of ASIL B.

The vehicle 1600 may include LIDAR sensor(s) 1664. The LIDAR sensor(s) 1664 may be used for object and pedestrian detection, emergency braking, collision avoidance, and/or other functions. The LIDAR sensor(s) 1664 may be functional safety level ASIL B. In some examples, the vehicle 1600 may include multiple LIDAR sensors 1664 (e.g., two, four, six, etc.) that may use Ethernet (e.g., to provide data to a Gigabit Ethernet switch).

In some examples, the LIDAR sensor(s) 1664 may be capable of providing a list of objects and their distances for a 360-degree field of view. Commercially available LIDAR sensor(s) 1664 may have an advertised range of approximately 1600 m, with an accuracy of 2 cm-3 cm, and with support for a 1600 Mbps Ethernet connection, for example. In some examples, one or more non-protruding LIDAR sensors 1664 may be used. In such examples, the LIDAR sensor(s) 1664 may be implemented as a small device that may be embedded into the front, rear, sides, and/or corners of the vehicle 1600. The LIDAR sensor(s) 1664, in such examples, may provide up to a 120-degree horizontal and 35-degree vertical field-of-view, with a 200 m range even for low-reflectivity objects. Front-mounted LIDAR sensor(s) 1664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1600. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1664 may be less susceptible to motion blur, vibration, and/or shock.

The vehicle may further include IMU sensor(s) 1666. The IMU sensor(s) 1666 may be located at a center of the rear axle of the vehicle 1600, in some examples. The IMU sensor(s) 1666 may include, for example and without limitation, an accelerometer(s), a magnetometer(s), a gyroscope(s), a magnetic compass(es), and/or other sensor types. In some examples, such as in six-axis applications, the IMU sensor(s) 1666 may include accelerometers and gyroscopes, while in nine-axis applications, the IMU sensor(s) 1666 may include accelerometers, gyroscopes, and magnetometers.

In some embodiments, the IMU sensor(s) 1666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1666 may enable the vehicle 1600 to estimate heading without requiring input from a magnetic sensor by directly observing and correlating the changes in velocity from GPS to the IMU sensor(s) 1666. In some examples, the IMU sensor(s) 1666 and the GNSS sensor(s) 1658 may be combined in a single integrated unit.

The vehicle may include microphone(s) 1696 placed in and/or around the vehicle 1600. The microphone(s) 1696 may be used for emergency vehicle detection and identification, among other things.

The vehicle may further include any number of camera types, including stereo camera(s) 1668, wide-view camera(s) 1670, infrared camera(s) 1672, surround camera(s) 1674, long-range and/or mid-range camera(s) 1698, and/or other camera types. The cameras may be used to capture image data around an entire periphery of the vehicle 1600. The types of cameras used depends on the embodiments and requirements for the vehicle 1600, and any combination of camera types may be used to provide the necessary coverage around the vehicle 1600. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 16A and FIG. 16B.

The vehicle 1600 may further include vibration sensor(s) 1642. The vibration sensor(s) 1642 may measure vibrations of components of the vehicle, such as the axle(s). For example, changes in vibrations may indicate a change in road surfaces. In another example, when two or more vibration sensors 1642 are used, the differences between the vibrations may be used to determine friction or slippage of the road surface (e.g., when the difference in vibration is between a power-driven axle and a freely rotating axle).

The vehicle 1600 may include an ADAS system 1638. The ADAS system 1638 may include a SoC, in some examples. The ADAS system 1638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1660, LIDAR sensor(s) 1664, and/or a camera(s). The ACC systems may include longitudinal ACC and/or lateral ACC. Longitudinal ACC monitors and controls the distance to the vehicle immediately ahead of the vehicle 1600 and automatically adjust the vehicle speed to maintain a safe distance from vehicles ahead. Lateral ACC performs distance keeping, and advises the vehicle 1600 to change lanes when necessary. Lateral ACC is related to other ADAS applications such as LCA and CWS.

CACC uses information from other vehicles that may be received via the network interface 1624 and/or the wireless antenna(s) 1626 from other vehicles via a wireless link, or indirectly, over a network connection (e.g., over the Internet). Direct links may be provided by a vehicle-to-vehicle (V2V) communication link, while indirect links may be infrastructure-to-vehicle (12V) communication link. In general, the V2V communication concept provides information about the immediately preceding vehicles (e.g., vehicles immediately ahead of and in the same lane as the vehicle 1600), while the 12V communication concept provides information about traffic further ahead. CACC systems may include either or both I2V and V2V information sources. Given the information of the vehicles ahead of the vehicle 1600, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1600 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1600 if the vehicle 1600 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1600 is backing up. Some RCTW systems include AEB to ensure that the vehicle brakes are applied to avoid a crash. RCTW systems may use one or more rear-facing RADAR sensor(s) 1660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1600, the vehicle 1600 itself must, in the case of conflicting results, decide whether to heed the result from a primary computer or a secondary computer (e.g., a first controller 1636 or a second controller 1636). For example, in some embodiments, the ADAS system 1638 may be a backup and/or secondary computer for providing perception information to a backup computer rationality module. The backup computer rationality monitor may run a redundant diverse software on hardware components to detect faults in perception and dynamic driving tasks. Outputs from the ADAS system 1638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1604.

In other examples, ADAS system 1638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1638 may be fed into the primary computer's perception block and/or the primary computer's dynamic driving task block. For example, if the ADAS system 1638 indicates a forward crash warning due to an object immediately ahead, the perception block may use this information when identifying objects. In other examples, the secondary computer may have its own neural network which is trained and thus reduces the risk of false positives, as described herein.

The vehicle 1600 may further include the infotainment SoC 1630 (e.g., an in-vehicle infotainment system (IVI)). Although illustrated and described as a SoC, the infotainment system may not be a SoC, and may include two or more discrete components. The infotainment SoC 1630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1600. For example, the infotainment SoC 1630 may radios, disk players, navigation systems, video players, USB and Bluetooth connectivity, carputers, in-car entertainment, Wi-Fi, steering wheel audio controls, hands free voice control, a heads-up display (HUD), an HMI display 1634, a telematics device, a control panel (e.g., for controlling and/or interacting with various components, features, and/or systems), and/or other components. The infotainment SoC 1630 may further be used to provide information (e.g., visual and/or audible) to a user(s) of the vehicle, such as information from the ADAS system 1638, autonomous driving information such as planned vehicle maneuvers, trajectories, surrounding environment information (e.g., intersection information, vehicle information, road information, etc.), and/or other information.

The infotainment SoC 1630 may include GPU functionality. The infotainment SoC 1630 may communicate over the bus 1602 (e.g., CAN bus, Ethernet, etc.) with other devices, systems, and/or components of the vehicle 1600. In some examples, the infotainment SoC 1630 may be coupled to a supervisory MCU such that the GPU of the infotainment system may perform some self-driving functions in the event that the primary controller(s) 1636 (e.g., the primary and/or backup computers of the vehicle 1600) fail. In such an example, the infotainment SoC 1630 may put the vehicle 1600 into a chauffeur to safe stop mode, as described herein.

The vehicle 1600 may further include an instrument cluster 1632 (e.g., a digital dash, an electronic instrument cluster, a digital instrument panel, etc.). The instrument cluster 1632 may include a controller and/or supercomputer (e.g., a discrete controller or supercomputer). The instrument cluster 1632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1630 and the instrument cluster 1632. In other words, the instrument cluster 1632 may be included as part of the infotainment SoC 1630, or vice versa.

Figure 16D:
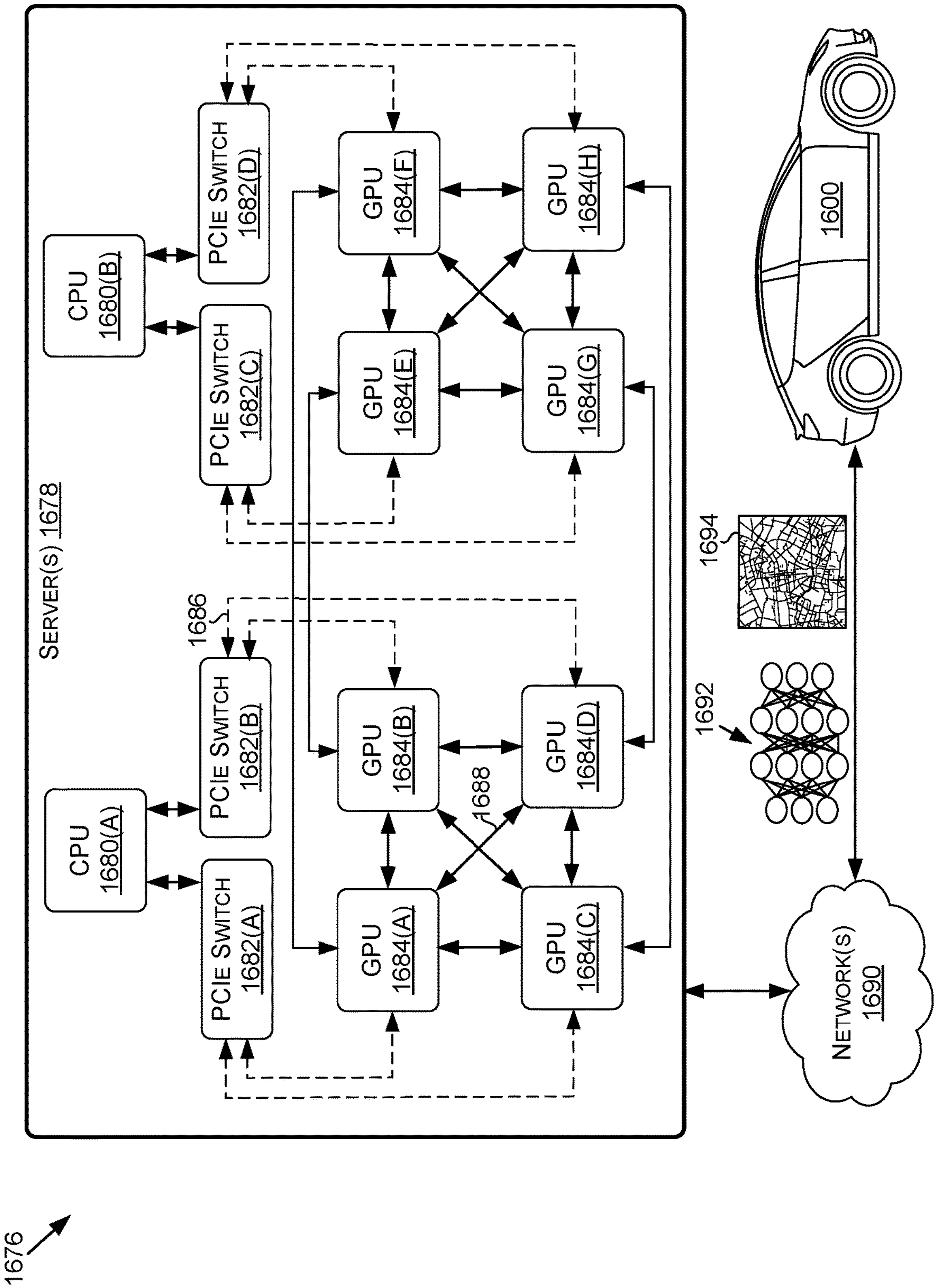
FIG. 16D is a system diagram for communication between cloud-based server(s) and the example autonomous vehicle of FIG. 16A, in accordance with some embodiments of the present disclosure.

FIG. 16D is a system diagram for communication between cloud-based server(s) and the example autonomous vehicle 1600 of FIG. 16A, in accordance with some embodiments of the present disclosure. The system 1676 may include server(s) 1678, network(s) 1690, and vehicles, including the vehicle 1600. The server(s) 1678 may include a plurality of GPUs 1684(A)-1684 (H) (collectively referred to herein as GPUs 1684), PCIe switches 1682(A)-1682(H) (collectively referred to herein as PCIe switches 1682), and/or CPUs 1680(A)-1680(B) (collectively referred to herein as CPUs 1680). The GPUs 1684, the CPUs 1680, and the PCIe switches may be interconnected with high-speed interconnects such as, for example and without limitation, NVLink interfaces 1688 developed by NVIDIA and/or PCIe connections 1686. In some examples, the GPUs 1684 are connected via NVLink and/or NVSwitch SoC and the GPUs 1684 and the PCIe switches 1682 are connected via PCIe interconnects. Although eight GPUs 1684, two CPUs 1680, and two PCIe switches are illustrated, this is not intended to be limiting. Depending on the embodiment, each of the server(s) 1678 may include any number of GPUs 1684, CPUs 1680, and/or PCIe switches. For example, the server(s) 1678 may each include eight, sixteen, thirty-two, and/or more GPUs 1684.

The server(s) 1678 may receive, over the network(s) 1690 and from the vehicles, image data representative of images showing unexpected or changed road conditions, such as recently commenced road-work. The server(s) 1678 may transmit, over the network(s) 1690 and to the vehicles, neural networks 1692, updated neural networks 1692, and/or map information 1694, including information regarding traffic and road conditions. The updates to the map information 1694 may include updates for the HD map 1622, such as information regarding construction sites, potholes, detours, flooding, and/or other obstructions. In some examples, the neural networks 1692, the updated neural networks 1692, and/or the map information 1694 may have resulted from new training and/or experiences represented in data received from any number of vehicles in the environment, and/or based on training performed at a datacenter (e.g., using the server(s) 1678 and/or other servers).

The server(s) 1678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1690, and/or the machine learning models may be used by the server(s) 1678 to remotely monitor the vehicles.

In some examples, the server(s) 1678 may receive data from the vehicles and apply the data to up-to-date real-time neural networks for real-time intelligent inferencing. The server(s) 1678 may include deep-learning supercomputers and/or dedicated AI computers powered by GPU(s) 1684, such as a DGX and DGX Station machines developed by NVIDIA. However, in some examples, the server(s) 1678 may include deep learning infrastructure that use only CPU-powered datacenters.

The deep-learning infrastructure of the server(s) 1678 may be capable of fast, real-time inferencing, and may use that capability to evaluate and verify the health of the processors, software, and/or associated hardware in the vehicle 1600. For example, the deep-learning infrastructure may receive periodic updates from the vehicle 1600, such as a sequence of images and/or objects that the vehicle 1600 has located in that sequence of images (e.g., via computer vision and/or other machine learning object classification techniques). The deep-learning infrastructure may run its own neural network to identify the objects and compare them with the objects identified by the vehicle 1600 and, if the results do not match and the infrastructure concludes that the AI in the vehicle 1600 is malfunctioning, the server(s) 1678 may transmit a signal to the vehicle 1600 instructing a fail-safe computer of the vehicle 1600 to assume control, notify the passengers, and complete a safe parking maneuver.

For inferencing, the server(s) 1678 may include the GPU(s) 1684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 17:
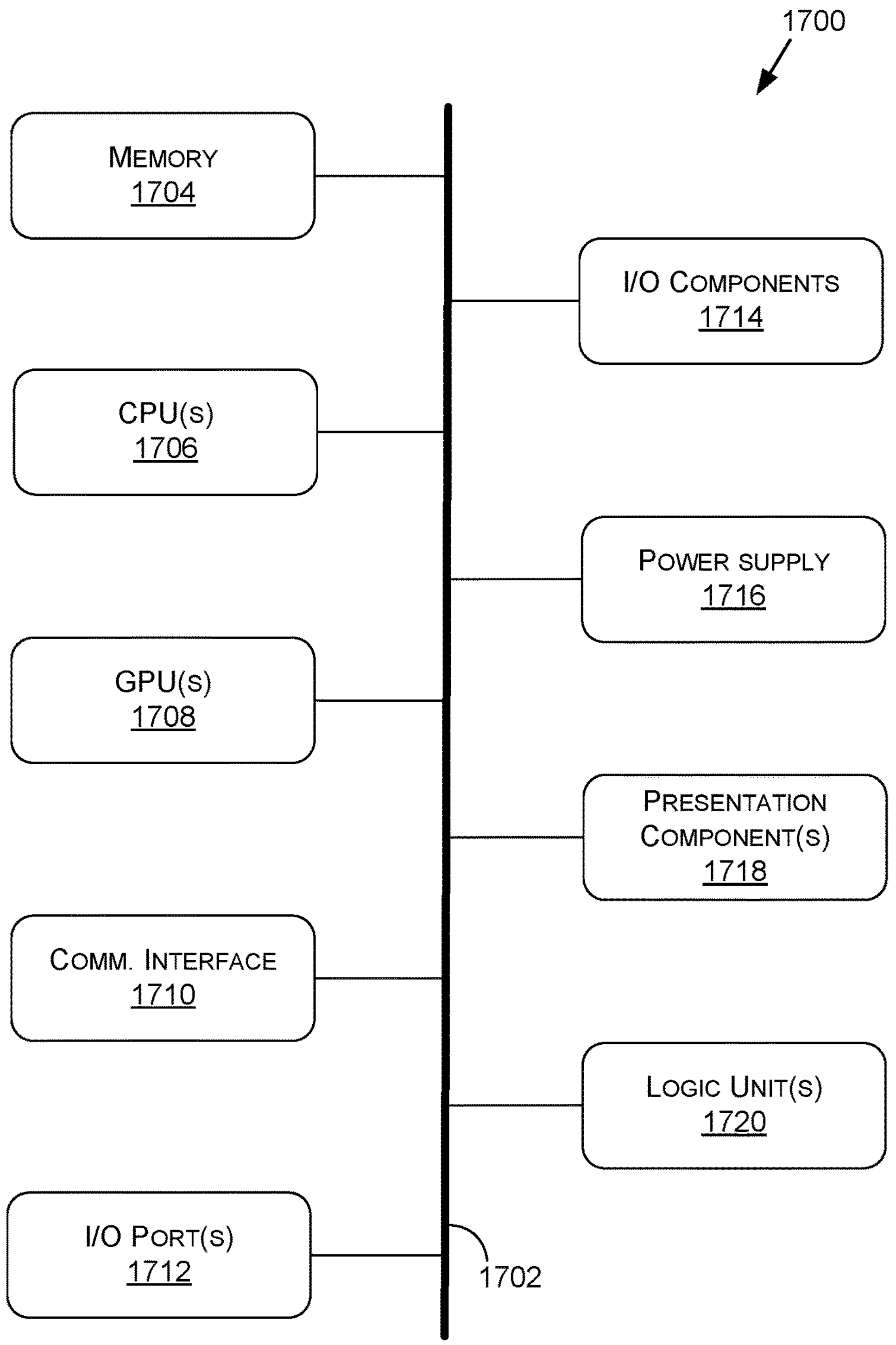
FIG. 17 is a block diagram of an example computing device suitable for use in implementing some embodiments of the present disclosure.

FIG. 17 is a block diagram of an example computing device(s) 1700 suitable for use in implementing some embodiments of the present disclosure. Computing device 1700 may include an interconnect system 1702 that directly or indirectly couples the following devices: memory 1704, one or more central processing units (CPUs) 1706, one or more graphics processing units (GPUs) 1708, a communication interface 1710, input/output (I/O) ports 1712, input/output components 1714, a power supply 1716, one or more presentation components 1718 (e.g., display(s)), and one or more logic units 1720. In at least one embodiment, the computing device(s) 1700 may comprise one or more virtual machines (VMs), and/or any of the components thereof may comprise virtual components (e.g., virtual hardware components). For non-limiting examples, one or more of the GPUs 1708 may comprise one or more vGPUs, one or more of the CPUs 1706 may comprise one or more vCPUs, and/or one or more of the logic units 1720 may comprise one or more virtual logic units. As such, a computing device(s) 1700 may include discrete components (e.g., a full GPU dedicated to the computing device 1700), virtual components (e.g., a portion of a GPU dedicated to the computing device 1700), or a combination thereof.

Although the various blocks of FIG. 17 are shown as connected via the interconnect system 1702 with lines, this is not intended to be limiting and is for clarity only. For example, in some embodiments, a presentation component 1718, such as a display device, may be considered an I/O component 1714 (e.g., if the display is a touch screen). As another example, the CPUs 1706 and/or GPUs 1708 may include memory (e.g., the memory 1704 may be representative of a storage device in addition to the memory of the GPUs 1708, the CPUs 1706, and/or other components). In other words, the computing device of FIG. 17 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 17.

The interconnect system 1702 may represent one or more links or busses, such as an address bus, a data bus, a control bus, or a combination thereof. The interconnect system 1702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1706 may be directly connected to the memory 1704. Further, the CPU 1706 may be directly connected to the GPU 1708. Where there is direct, or point-to-point connection between components, the interconnect system 1702 may include a PCIe link to carry out the connection. In these examples, a PCI bus need not be included in the computing device 1700.

The memory 1704 may include any of a variety of computer-readable media. The computer-readable media may be any available media that may be accessed by the computing device 1700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1706 may be configured to execute at least some of the computer-readable instructions to control one or more components of the computing device 1700 to perform one or more of the methods and/or processes described herein. The CPU(s) 1706 may each include one or more cores (e.g., one, two, four, eight, twenty-eight, seventy-two, etc.) that are capable of handling a multitude of software threads simultaneously. The CPU(s) 1706 may include any type of processor, and may include different types of processors depending on the type of computing device 1700 implemented (e.g., processors with fewer cores for mobile devices and processors with more cores for servers). For example, depending on the type of computing device 1700, the processor may be an Advanced RISC Machines (ARM) processor implemented using Reduced Instruction Set Computing (RISC) or an x86 processor implemented using Complex Instruction Set Computing (CISC). The computing device 1700 may include one or more CPUs 1706 in addition to one or more microprocessors or supplementary co-processors, such as math co-processors.

In addition to or alternatively from the CPU(s) 1706, the GPU(s) 1708 may be configured to execute at least some of the computer-readable instructions to control one or more components of the computing device 1700 to perform one or more of the methods and/or processes described herein. One or more of the GPU(s) 1708 may be an integrated GPU (e.g., with one or more of the CPU(s) 1706 and/or one or more of the GPU(s) 1708 may be a discrete GPU. In embodiments, one or more of the GPU(s) 1708 may be a coprocessor of one or more of the CPU(s) 1706. The GPU(s) 1708 may be used by the computing device 1700 to render graphics (e.g., 3D graphics) or perform general purpose computations. For example, the GPU(s) 1708 may be used for General-Purpose computing on GPUs (GPGPU). The GPU(s) 1708 may include hundreds or thousands of cores that are capable of handling hundreds or thousands of software threads simultaneously. The GPU(s) 1708 may generate pixel data for output images in response to rendering commands (e.g., rendering commands from the CPU(s) 1706 received via a host interface). The GPU(s) 1708 may include graphics memory, such as display memory, for storing pixel data or any other suitable data, such as GPGPU data. The display memory may be included as part of the memory 1704. The GPU(s) 1708 may include two or more GPUs operating in parallel (e.g., via a link). The link may directly connect the GPUs (e.g., using NVLINK) or may connect the GPUs through a switch (e.g., using NVSwitch). When combined together, each GPU 1708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1706 and/or the GPU(s) 1708, the logic unit(s) 1720 may be configured to execute at least some of the computer-readable instructions to control one or more components of the computing device 1700 to perform one or more of the methods and/or processes described herein. In embodiments, the CPU(s) 1706, the GPU(s) 1708, and/or the logic unit(s) 1720 may discretely or jointly perform any combination of the methods, processes and/or portions thereof. One or more of the logic units 1720 may be part of and/or integrated in one or more of the CPU(s) 1706 and/or the GPU(s) 1708 and/or one or more of the logic units 1720 may be discrete components or otherwise external to the CPU(s) 1706 and/or the GPU(s) 1708. In embodiments, one or more of the logic units 1720 may be a coprocessor of one or more of the CPU(s) 1706 and/or one or more of the GPU(s) 1708.

Examples of the logic unit(s) 1720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1710 may include one or more receivers, transmitters, and/or transceivers that enable the computing device 1700 to communicate with other computing devices via an electronic communication network, included wired and/or wireless communications. The communication interface 1710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1720 and/or communication interface 1710 may include one or more data processing units (DPUs) to transmit data received over a network and/or through interconnect system 1702 directly to (e.g., a memory of) one or more GPU(s) 1708.

The I/O ports 1712 may enable the computing device 1700 to be logically coupled to other devices including the I/O components 1714, the presentation component(s) 1718, and/or other components, some of which may be built in to (e.g., integrated in) the computing device 1700. Illustrative I/O components 1714 include a microphone, mouse, keyboard, joystick, game pad, game controller, satellite dish, scanner, printer, wireless device, etc. The I/O components 1714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1700. The computing device 1700 may be include depth cameras, such as stereoscopic camera systems, infrared camera systems, RGB camera systems, touchscreen technology, and combinations of these, for gesture detection and recognition. Additionally, the computing device 1700 may include accelerometers or gyroscopes (e.g., as part of an inertia measurement unit (IMU)) that enable detection of motion. In some examples, the output of the accelerometers or gyroscopes may be used by the computing device 1700 to render immersive augmented reality or virtual reality.

The power supply 1716 may include a hard-wired power supply, a battery power supply, or a combination thereof. The power supply 1716 may provide power to the computing device 1700 to enable the components of the computing device 1700 to operate.

The presentation component(s) 1718 may include a display (e.g., a monitor, a touch screen, a television screen, a heads-up-display (HUD), other display types, or a combination thereof), speakers, and/or other presentation components. The presentation component(s) 1718 may receive data from other components (e.g., the GPU(s) 1708, the CPU(s) 1706, DPUs, etc.), and output the data (e.g., as an image, video, sound, etc.).

Example Data Center

Figure 18:
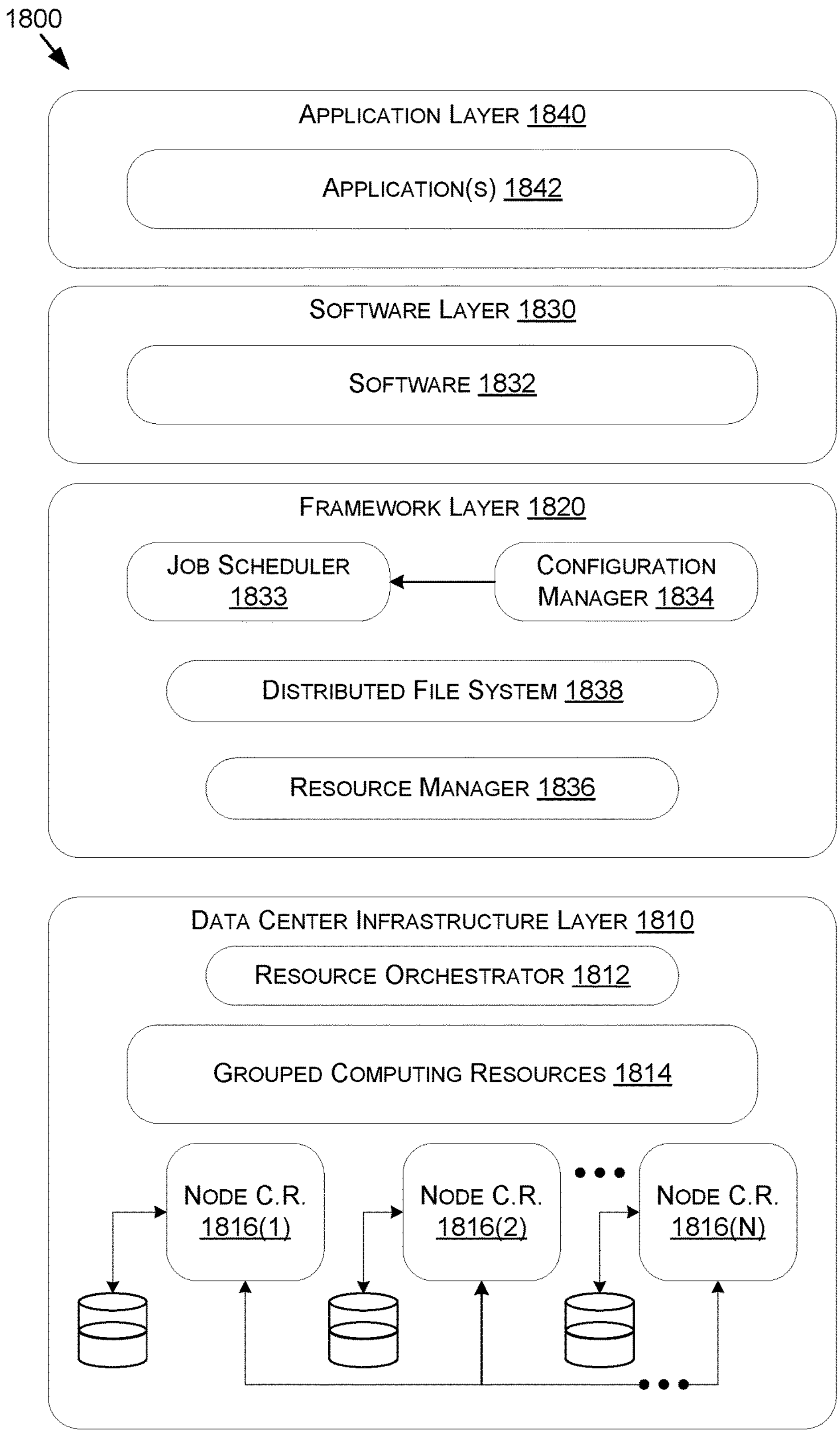
FIG. 18 is a block diagram of an example data center suitable for use in implementing some embodiments of the present disclosure.

FIG. 18 illustrates an example data center 1800 that may be used in at least one embodiments of the present disclosure. The data center 1800 may include a data center infrastructure layer 1810, a framework layer 1820, a software layer 1830, and/or an application layer 1840.

As shown in FIG. 18, the data center infrastructure layer 1810 may include a resource orchestrator 1812, grouped computing resources 1814, and node computing resources ("node C.R.s") 1816(1)-1816(N), where "N" represents any whole, positive integer. In at least one embodiment, node C.R.s 1816(1)-1816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1816(1)-1816(N) may correspond to a server having one or more of the above-mentioned computing resources. In addition, in some embodiments, the node C.R.s 1816(1)-18161 (N) may include one or more virtual components, such as vGPUs, vCPUs, and/or the like, and/or one or more of the node C.R.s 1816(1)-1816(N) may correspond to a virtual machine (VM).

In at least one embodiment, grouped computing resources 1814 may include separate groupings of node C.R.s 1816 housed within one or more racks (not shown), or many racks housed in data centers at various geographical locations (also not shown). Separate groupings of node C.R.s 1816 within grouped computing resources 1814 may include grouped compute, network, memory or storage resources that may be configured or allocated to support one or more workloads. In at least one embodiment, several node C.R.s 1816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1812 may configure or otherwise control one or more node C.R.s 1816(1)-1816(N) and/or grouped computing resources 1814. In at least one embodiment, resource orchestrator 1812 may include a software design infrastructure (SDI) management entity for the data center 1800. The resource orchestrator 1812 may include hardware, software, or some combination thereof.

In at least one embodiment, as shown in FIG. 18, framework layer 1820 may include a job scheduler 1833, a configuration manager 1834, a resource manager 1836, and/or a distributed file system 1838. The framework layer 1820 may include a framework to support software 1832 of software layer 1830 and/or one or more application(s) 1842 of application layer 1840. The software 1832 or application(s) 1842 may respectively include web-based service software or applications, such as those provided by Amazon Web Services, Google Cloud and Microsoft Azure. The framework layer 1820 may be, but is not limited to, a type of free and open-source software web application framework such as Apache Spark™ (hereinafter "Spark") that may utilize distributed file system 1838 for large-scale data processing (e.g., "big data"). In at least one embodiment, job scheduler 1833 may include a Spark driver to facilitate scheduling of workloads supported by various layers of data center 1800. The configuration manager 1834 may be capable of configuring different layers such as software layer 1830 and framework layer 1820 including Spark and distributed file system 1838 for supporting large-scale data processing. The resource manager 1836 may be capable of managing clustered or grouped computing resources mapped to or allocated for support of distributed file system 1838 and job scheduler 1833. In at least one embodiment, clustered or grouped computing resources may include grouped computing resource 1814 at data center infrastructure layer 1810. The resource manager 1836 may coordinate with resource orchestrator 1812 to manage these mapped or allocated computing resources.

In at least one embodiment, software 1832 included in software layer 1830 may include software used by at least portions of node C.R.s 1816(1)-1816(N), grouped computing resources 1814, and/or distributed file system 1838 of framework layer 1820. One or more types of software may include, but are not limited to, Internet web page search software, e-mail virus scan software, database software, and streaming video content software.

In at least one embodiment, application(s) 1842 included in application layer 1840 may include one or more types of applications used by at least portions of node C.R.s 1816 (1)-1816(N), grouped computing resources 1814, and/or distributed file system 1838 of framework layer 1820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1834, resource manager 1836, and resource orchestrator 1812 may implement any number and type of self-modifying actions based on any amount and type of data acquired in any technically feasible fashion. Self-modifying actions may relieve a data center operator of data center 1800 from making possibly bad configuration decisions and possibly avoiding underutilized and/or poor performing portions of a data center.

The data center 1800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1800. In at least one embodiment, trained or deployed machine learning models corresponding to one or more neural networks may be used to infer or predict information using resources described above with respect to the data center 1800 by using weight parameters calculated through one or more training techniques, such as but not limited to those described herein.

In at least one embodiment, the data center 1800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1700 of FIG. 17—e.g., each device may include similar components, features, and/or functionality of the computing device(s) 1700. In addition, where backend devices (e.g., servers, NAS, etc.) are implemented, the backend devices may be included as part of a data center 1800, an example of which is described in more detail herein with respect to FIG. 18.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1700 described herein with respect to FIG. 17. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
- causing a machine to navigate within an environment based at least on map data representative of the environment, wherein the map data is updated, at least, by:
  - determining that the map data does not indicate a physical connection between a traffic object and a traffic pole;
  - determining, based at least on the map data not indicating the physical connection between the traffic object and the traffic pole and using the map data, a first location associated with the traffic object and a second location associated with the traffic pole;
  - determining, based at least on the first location and the second location, that the traffic object is located within a threshold distance to the traffic pole;
  - determining, based at least on the traffic object being located within the threshold distance to the traffic pole, that the traffic object includes the physical connection to the traffic pole; and
  - updating the map data to indicate the physical connection between the traffic object and the traffic pole.

2. The method of claim 1, wherein the map data is further updated by:
- determining a third location associated with a second traffic object;
- determining, based at least on the third location and at least one of the first location or the second location, that the second traffic object is associated with the traffic pole; and
- updating the map data to indicate that the second traffic object is associated with the traffic pole.

3. The method of claim 2, wherein the determining that the second traffic object is associated with the traffic pole comprises:
- determining, based at least on the third location and the second location, that the second traffic object is also located within the threshold distance to the traffic pole; and
- determining, based at least on the second traffic object being located within the threshold distance to the traffic pole, that the second traffic object is associated with the traffic pole.

4. The method of claim 2, wherein the determining that the second traffic object is associated with the traffic pole comprises;
- determining, based at least on the third location and the second location, that the second traffic object is located outside of the threshold distance to the traffic pole;
- determining, based at least on the third location and the first location, that the second traffic object is located within a second threshold distance to the traffic object; and
- determining, based at least on the second traffic object being located within the second threshold distance to the traffic object, that the second traffic object is also associated with the traffic pole.

5. The method of claim 1, wherein the physical connection indicates one of:
- first connection with the traffic pole; or
- a second connection with an extender of the traffic pole.

6. The method of claim 1, wherein the map data is further updated by:
- determining one or more dimensions associated with a second traffic object; and
- determining, based at least on the one or more dimensions and the second location, that the second traffic object includes a direct connection with the traffic pole.

7. The method of claim 1, wherein the traffic object is a traffic signal, and wherein the map data is further updated by:
- determining that a traffic sign is located within a second threshold distance to at least one of the traffic signal or the traffic pole;
- determining, based at least on the traffic sign being located within the second threshold distance to the at least one of the traffic signal or the traffic pole, that the traffic sign is associated with the traffic pole; and
- updating the map data to indicate that the traffic sign is associated with the traffic pole.

8. The method of claim 1, wherein the map data is further updated by:

determining, based at least on the first location and the second location, a first distance between the traffic object and the traffic pole;

determining, based at least on the first distance, a second distance associated with an extender of the traffic pole; and updating the map data to indicate the second distance associated with the extender of the traffic pole.

9. The method of claim 1, wherein the map data is further updated by determining the threshold distance based on at least one of a number of one or more lanes or one or more widths of the one or more lanes.

10. One or more processors comprising processing circuitry to cause a machine to navigate within an environment based at least on map data representative of the environment, wherein the map data is updated, at least, by:

determining that the map data does not indicate a connection between a traffic object and a traffic structure;

determining, based at least on the map data not indicating the connection between the traffic object and the traffic structure and using the map data, a first location associated with the traffic object and a second location associated with the traffic structure;

determining, based at least on the first location and the second location, that the traffic object is located within a threshold distance to the traffic structure;

determining, based at least on the traffic object being located within the threshold distance to the traffic structure, that the traffic object includes the connection to the traffic structure; and updating the map data to indicate that the traffic object includes the connection with the traffic structure.

11. The one or more processors of claim 10, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing generative AI operations;

a system for performing operations using a large language model;

a system for performing conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

12. The one or more processors of claim 10, wherein the map data is further updated by:

determining a third location associated with a second traffic object;

determining, based at least on the third location and the second location, that the second traffic object is located outside of the threshold distance to the traffic structure;

determining, based at least on the third location and the first location, that the second traffic object is located within a second threshold distance to the traffic object; and determining, based at least on the second traffic object being within the second threshold distance to the traffic object, that the second traffic object is also connected to the traffic structure.

13. A system comprising:

one or more processors to cause a machine to navigate based at least on map data representative of an environment, wherein the map data is updated, at least, by:

determining that the map data does not indicate a connection between a traffic object and a traffic pole within the environment;

determining, based at least on the map data, a first location associated with the traffic object and a second location associated with the traffic pole;

, determining, based at least on the first location and the second location, that the traffic object is located within a threshold distance to the traffic pole;

determining, based at least on the traffic object being located within the threshold distance to the traffic pole, that the traffic object includes the connection with the traffic pole within the environment; and updating the map data to indicate that the traffic object includes the connection with the traffic pole within the environment.

14. The system of claim 13, wherein the map data is further updated by:

determining a third location associated with a second traffic object;

determining, based at least on the third location and at least one of the first location or the second location, that the second traffic object is associated with the traffic pole; and updating the map data to indicate that the second traffic object is associated with the traffic pole.

15. The system of claim 14, wherein the determining that the second traffic object is associated with the traffic pole comprises:

determining, based at least on the third location and the second location, that the second traffic object is also located within the threshold distance to the traffic pole; and determining, based at least on the second traffic object being located within the threshold distance to the traffic pole, that the second traffic object is associated with the traffic pole.

16. The system of claim 14, wherein the determining that the second traffic object is associated with the traffic pole comprises;

determining, based at least on the third location and the second location, that the second traffic object is located outside of the threshold distance to the traffic pole;

determining, based at least on the third location and the first location, that the second traffic object is located within a second threshold distance to the traffic object; and determining, based at least on the second traffic object being located within the second threshold distance to the traffic object, that the second traffic object is associated with the traffic pole.

17. The system of claim 13, wherein the map data is further updated by:

determining that the traffic object includes a direct connection with the traffic pole based at least on the threshold distance including a first distance; or determining that the traffic object includes an indirect connection with the traffic pole based at least on the threshold distance including a second distance that is larger than the first distance.

18. The system of claim 13, wherein the map data is further updated by:

determining one or more dimensions associated with a second traffic object; and determining, based at least on the one or more dimensions and the second location, that the second traffic object includes a direct connection with the traffic pole.

19. The system of claim 13, wherein the traffic object is a traffic signal, and wherein the map data is further updated by:

determining that a traffic sign is located within a second threshold distance to at least one of the traffic signal or the traffic pole;

determining, based at least on the traffic sign being located within the second threshold distance to the at least one of the traffic signal or the traffic pole, that the traffic sign is associated with the traffic pole; and updating the map data to indicate that the traffic sign is associated with the traffic pole.

20. The system of claim 13, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing generative AI operations;

a system for performing operations using a large language model;

a system for performing conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

* * * * *